US011215837B2

(12) United States Patent
Lanman et al.

(10) Patent No.: US 11,215,837 B2
(45) Date of Patent: Jan. 4, 2022

(54) EYE TRACKING FOR PUPIL STEERING IN HEAD-MOUNTED DISPLAYS USING EYE TRACKING SENSORS

(71) Applicant: Facebook Technologies, LLC, Menlo Park, CA (US)

(72) Inventors: Douglas Robert Lanman, Bellevue, WA (US); Robert Konrad, Bellevue, WA (US); Robert Dale Cavin, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/537,181

(22) Filed: Aug. 9, 2019

(65) Prior Publication Data
US 2019/0361250 A1  Nov. 28, 2019

Related U.S. Application Data

(63) Continuation of application No. 16/222,789, filed on Dec. 17, 2018.
(Continued)

(51) Int. Cl.
*G02B 27/14* (2006.01)
*G09G 5/00* (2006.01)
(Continued)

(52) U.S. Cl.
CPC ..... *G02B 27/0179* (2013.01); *G02B 27/0172* (2013.01); *G06F 1/163* (2013.01);
(Continued)

(58) Field of Classification Search
CPC ............ G02B 27/0179; G02B 27/0172; G02B 2027/0178; G02B 2027/0187; G06F 1/163; G06F 3/011; G06F 3/013
(Continued)

(56) References Cited

U.S. PATENT DOCUMENTS 9,116,337 B1  8/2015  Miao
9,341,850 B1  5/2016  Cakmakci et al.
(Continued)

FOREIGN PATENT DOCUMENTS

| CN | 106104353 | 11/2016 |
|---|---|---|
| JP | 2017078756 A | 4/2017 |
| WO | WO2014/155288 A2 | 10/2014 |

OTHER PUBLICATIONS

Facebook Technologies, LLC, International Search Report and Written Opinion, PCT/US2018/066206, dated Apr. 19, 2019, 9 pgs.
(Continued)

*Primary Examiner* — William Choi
(74) *Attorney, Agent, or Firm* — Morgan, Lewis & Bockius LLP

(57) ABSTRACT

A method for providing augmented reality contents to a wearer using a head-mounted display device that includes an eye tracking sensor, a light projector, a beam steerer, and a combiner includes determining, with the eye tracking sensor, a position of a pupil of an eye of the wearer. The method also includes projecting, with the light projector, light for rendering images based at least on the augmented reality contents, and changing, with the beam steerer, a direction of the light from the light projector based on the position of the pupil. The light from the beam steerer is directed toward the combiner and the light from the beam steerer and light from an outside of the head-mounted display device are combined, by the combiner, to provide an overlap of a rendered image and a real image that corresponds to the light from the outside of the head-mounted display device.

10 Claims, 41 Drawing Sheets

Related U.S. Application Data

(60) Provisional application No. 62/599,793, filed on Dec. 18, 2017.

(51) Int. Cl.
*G02B 27/01* (2006.01)
*G06F 3/01* (2006.01)
*G06F 1/16* (2006.01)

(52) U.S. Cl.
CPC .............. *G06F 3/011* (2013.01); *G06F 3/013* (2013.01); *G02B 2027/0178* (2013.01); *G02B 2027/0187* (2013.01)

(58) Field of Classification Search
USPC .......................................... 359/630; 345/7–9
See application file for complete search history.

(56) References Cited

U.S. PATENT DOCUMENTS

| | | | |
|---|---|---|---|
| 2008/0002262 | A1 | 1/2008 | Chirieleison |
| 2014/0362446 | A1 | 12/2014 | Bickerstaff et al. |
| 2016/0238845 | A1 | 8/2016 | Alexander et al. |
| 2016/0377868 | A1 | 12/2016 | Ouderkirk et al. |
| 2017/0115483 | A1 | 4/2017 | Aleem et al. |
| 2017/0255020 | A1 | 9/2017 | Tam et al. |
| 2018/0003972 | A1 | 1/2018 | Kress et al. |
| 2018/0157908 | A1 | 6/2018 | Sahisten et al. |
| 2018/0311515 | A1 | 11/2018 | Wilson et al. |
| 2019/0019023 | A1 | 1/2019 | Konttori et al. |
| 2019/0285897 | A1* | 9/2019 | Topliss ................. G06T 19/006 |

OTHER PUBLICATIONS

Jang, Changwon et al. "Retinal 3D: augmented reality near-eye display via pupil-tracked light field projection on retina." ACM Transactions on Graphics, vol. 36, No. 6, Article 190, Nov. 2017, 190:1-190:13.

Lanman, Office Action, U.S. Appl. No. 16/222,789, dated Jun. 19, 2020, 9 pgs.

Facebook Technologies, LLC, Extended European Search Report, EP18890568.1, dated Jan. 22, 2021, 10 pgs.

Lanman, Final Office Action, U.S. Appl. No. 16/222,789, dated Nov. 5, 2020, 9 pgs.

Lanman, Office Action, U.S. Appl. No. 16/222,789, dated Jan. 19, 2021, 10 pgs.

Lanman, Office Action, U.S. Appl. No. 16/537,135, dated Oct. 6, 2020, 7 pgs.

Lanman, Office Action, U.S. Appl. No. 16/537,145, dated Oct. 6, 2020, 9 pgs.

Lanman, Office Action, U.S. Appl. No. 16/537,163, dated Oct. 6, 2020, 10 pgs.

Lanman, Office Action, U.S. Appl. No. 16/537,168, dated Oct. 6, 2020, 8 pgs.

Lanman, Notice of Allowance, U.S. Appl. No. 16/537,145, dated Mar. 17, 2021, 8 pgs.

Lanman, Office Action, U.S. Appl. No. 16/537,163, dated Apr. 7, 2021, 12 pgs.

Notice of Allowance dated Aug. 9, 2021 for U.S. Appl. No. 16/537,163, filed Aug. 9, 2019, 3 pages.

Notice of Allowance dated Sep. 15, 2021 for U.S. Appl. No. 16/537,173, filed Aug. 9, 2019, 8 pages.

Notice of Allowance dated Sep. 30, 2021 for U.S. Appl. No. 16/537,173, filed Aug. 9, 2019, 2 pages.

Notification of the First Office Action dated Sep. 15, 2021 for Chinese Application No. 201880089712.1, filed Dec. 18, 2018, 17 pages.

International Preliminary Report Patentability for International Application No. PCT/US2018/066206, dated Jul. 2, 2020, 7 Pages.

Non-Final Office Action dated Apr. 6, 2021 for U.S. Appl. No. 16/537,135, filed Aug. 9, 2019, 10 pages.

Notice of Allowance dated Apr. 29, 2021 for U.S. Appl. No. 16/222,789, filed Dec. 17, 2018, 8 pages.

Non-Final Office Action dated Apr. 7, 2021 for U.S. Appl. No. 16/537,168, filed Aug. 9, 2019, 10 pages.

Notice of Allowance dated Jul. 27, 2021 for U.S. Appl. No. 16/537,168, filed Aug. 9, 2019, 9 pages.

Non-Final Office Action dated Jun. 11, 2021 for U.S. Appl. No. 16/537,173, 09, filed Aug. 2019, 13 pages.

* cited by examiner

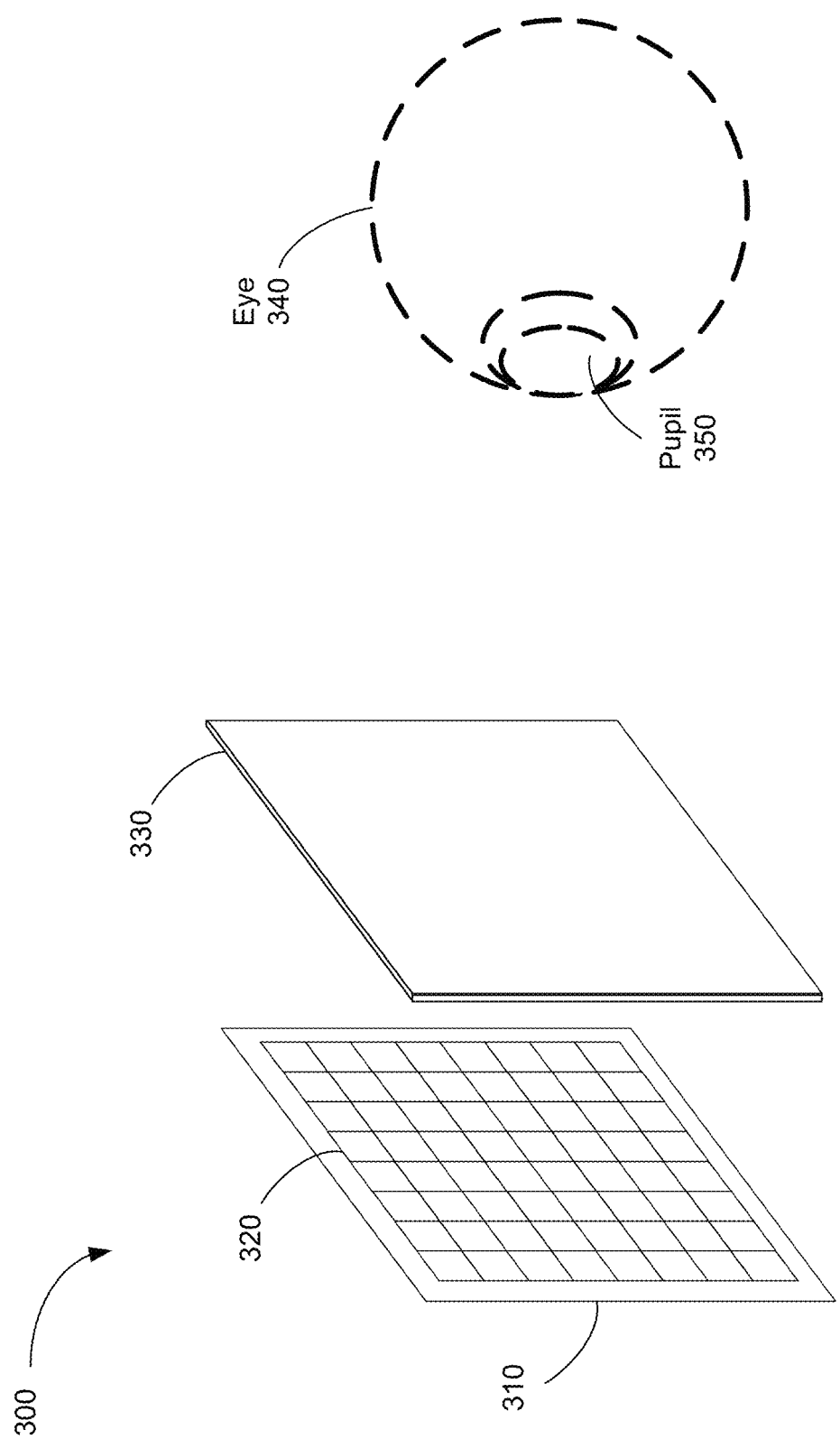

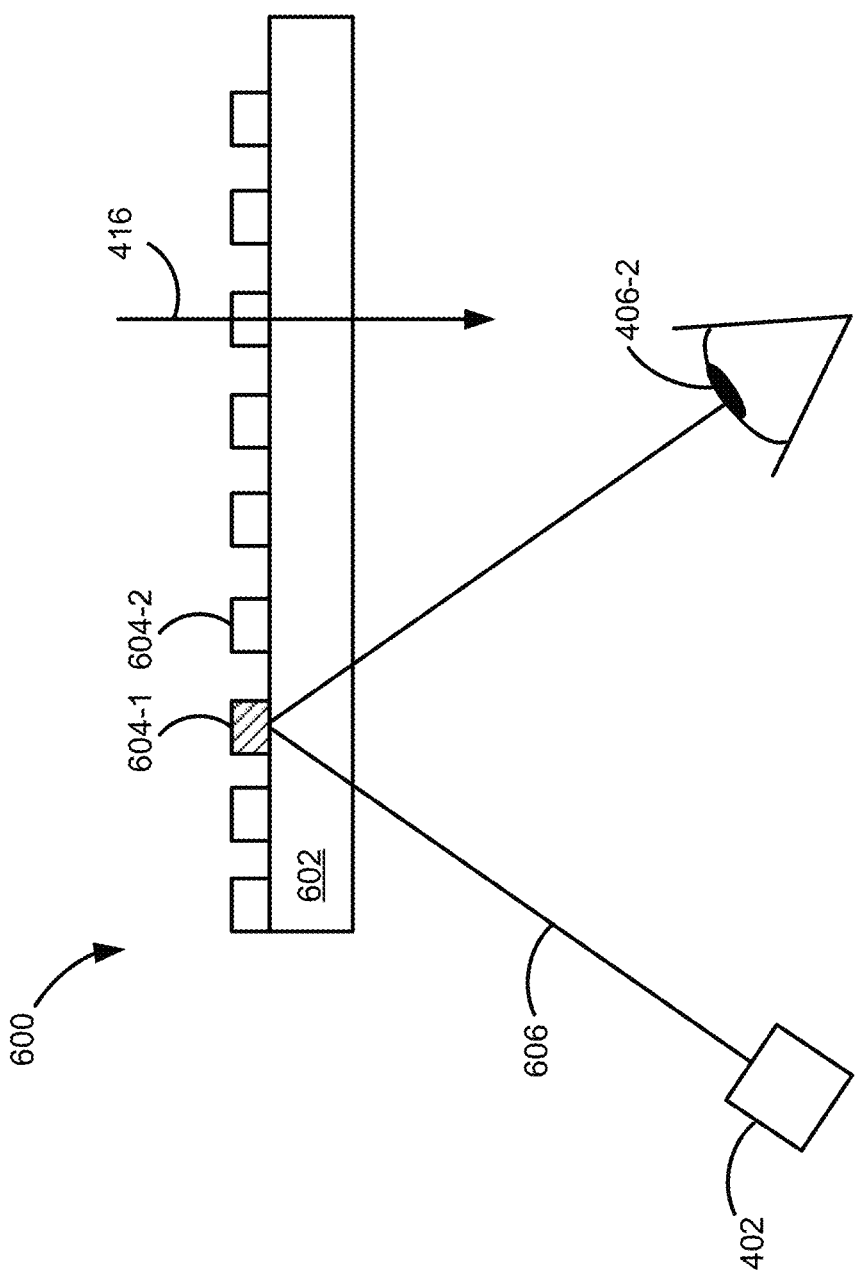

EYE TRACKING FOR PUPIL STEERING IN HEAD-MOUNTED DISPLAYS USING EYE TRACKING SENSORS

RELATED APPLICATIONS

This application is a continuation application of U.S. patent application Ser. No. 16/222,789, entitled "Integrated Augmented Reality Head-Mounted Display for Pupil Steering" filed Dec. 17, 2018, which claims the benefit of, and the priority to, U.S. Provisional Patent Application Ser. No. 62/599,793, entitled "Integrated Augmented Reality Head-Mounted Display for Pupil Steering" filed Dec. 18, 2017, both of which are incorporated by reference herein in their entireties. This application is related to U.S. patent application Ser. No. 16/537,135, entitled "Augmented Reality Head-Mounted Display with a Fresnel Combiner and Pupil Steering" filed Aug. 9, 2019, U.S. patent application Ser. No. 16/537,145, entitled "Augmented Reality Head-Mounted Display with a Pancake Combiner and Pupil Steering" filed Aug. 9, 2019, U.S. patent application Ser. No. 16/537,163, entitled "Augmented Reality Head-Mounted Display with Eye Tracking for Pupil Steering" filed Aug. 9, 2019, U.S. patent application Ser. No. 16/537,168, entitled "Augmented Reality Head-Mounted Display with Beam Shifter for Pupil Steering" filed Aug. 9, 2019, and U.S. patent application Ser. No. 16/537,173, entitled "Augmented Reality Head-Mounted Display with a Focus-Supporting Projector for Pupil Steering" filed Aug. 9, 2019. All of these applications are incorporated by reference herein in their entireties.

TECHNICAL FIELD

This relates generally to display devices, and more specifically to head-mounted display devices.

BACKGROUND

Head-mounted display devices (also called herein head-mounted displays) are gaining popularity as means for providing visual information to a user. For example, the head-mounted display devices are used for virtual reality and augmented reality operations.

However, the size and weight of conventional head-mounted displays have limited applications of head-mounted displays.

SUMMARY

Accordingly, there is a need for head-mounted displays that are compact and light, thereby enhancing the user's virtual-reality and/or augmented reality experience.

In particular, conventional head-mounted display devices (e.g., conventional head-mounted display devices configured for augmented reality operations) project images over a large area around an eye of a user in order to provide a wide field of view in all gaze-directions (e.g., in order to deal with pupil steering). However, projecting images over a large area leads to reduced brightness of the projected images. Compensating for the reduced brightness typically requires a high intensity light source, which is typically large and heavy, and has high power consumption.

The above deficiencies and other problems associated with conventional head-mounted displays are reduced or eliminated by the disclosed display devices. In accordance with some embodiments, a position of a pupil of an eye of a user is determined (e.g., using an eye tracker) and images are projected over a reduced area toward the pupil of the eye. By reducing the area over which the images are projected, the need for a high intensity light source is reduced or eliminated. This, in turn, allows compact, light, and low power-consumption head-mounted displays.

In accordance with some embodiments, a head-mounted display device for providing augmented reality contents to a wearer includes an eye tracker, a light projector, a beam steerer and a combiner. The eye tracker is configured to determine a position of a pupil of an eye of the wearer, the light projector is configured to project light for rendering images based at least on the augmented reality contents, the beam steerer is configured to change a direction of the light from the light projector based on the position of the pupil, and the combiner is configured to combine the light from the light projector and light from an outside of the head-mounted display device for providing an overlap of the rendered image and a real image that corresponds to the light from the outside of the head-mounted display device.

In accordance with some embodiments, a method providing augmented reality contents to a wearer using a head-mounted display device that includes an eye tracker, a light projector, a beam steerer, and a combiner includes determining a position of a pupil of an eye with the eye tracker. The method also includes projecting, with the light projector, light for rendering images based at least on the augmented reality contents and changing, with the beam steerer, a direction of the light from the light projector based on the position of the pupil. The method further includes combining, with the combiner, the light from the light projector and light from an outside of the head-mounted display device for providing an overlap of the rendered image and a real image that corresponds to the light from the outside of the head-mounted display device.

In accordance with some embodiments, a method for providing images to a wearer using a head-mounted display device including a light projector and a beam shifter includes projecting, with the light projector, light for rendering images based at least on virtual reality contents and/or augmented reality contents and changing, with a beam shifter, a path of the light projected from the light projector based on a position of a pupil of an eye of the wearer.

In accordance with some embodiments, a head-mounted display device for providing images to a wearer includes a light projector configured to project light for rendering images based at least on virtual reality contents and/or augmented reality contents and a beam shifter configured to change a path of the light projected from the light projector based on a position of a pupil of an eye of the wearer.

In accordance with some embodiments, a head-mounted display device for providing augmented reality contents to a wearer includes a first light projector configured to project light for rendering images based at least on the augmented reality contents, and a first Fresnel combiner configured to combine the light from the first light projector and light from an outside of the head-mounted display device for providing an overlap of the rendered image and a real image that corresponds to the light from the outside of the head-mounted display device.

In accordance with some embodiments, a method providing augmented reality contents to a wearer using a head-mounted display device that includes a first light projector and a first Fresnel combiner includes projecting, with the first light projector, light for rendering an image based at least on the augmented reality contents and combining, with the first Fresnel combiner, the light from the first light projector and light from an outside of the head-mounted display device for providing an overlap of the rendered image and a real image that corresponds to the light from the outside of the head-mounted display device.

In accordance with some embodiments, a head-mounted display device for providing augmented reality contents to a wearer includes a light projector and a pancake combiner. The light projector is configured to project a light having a first polarization for rendering images based at least on the augmented reality contents. The pancake combiner is configured to combine the light from the light projector and light from an outside of the head-mounted display device for providing an overlap of the rendered image and a real image that corresponds to the light from the outside of the head-mounted display device. The pancake combiner is also configured to direct the light from the light projector toward a pupil of an eye the wearer.

In accordance with some embodiments, a method providing augmented reality contents to a wearer using a head-mounted display device including a light projector and a pancake combiner includes projecting, with the light projector, a light having a first polarization for rendering an image based at least on the augmented reality contents and combining, with the pancake combiner, the light from the light projector and light from an outside of the head-mounted display device for providing an overlap of the rendered image and a real image that corresponds to the light from the outside of the head-mounted display device. The pancake combiner is configured to direct the light from the light projector toward a pupil of an eye the wearer.

In accordance with some embodiments, a head-mounted display device for providing augmented reality contents to a wearer includes a light projector configured to project light for rendering images based at least on the augmented reality contents, an eye tracker configured to determine a position of a pupil of an eye of the wearer, and a beam steerer configured to change a direction of the light from the light projector based on the position of the pupil.

In accordance with some embodiments, a method for providing augmented reality contents to a wearer using a head-mounted display device that includes an eye tracker, a light projector, and a beam steerer includes determining, with the eye tracker, a position of a pupil of an eye of the wearer and projecting, with the light projector, light for rendering images based at least on the augmented reality contents. The method also includes changing, with the beam steerer, a direction of the light from the light projector based on the position of the pupil.

In accordance with some embodiments, a method for providing augmented reality contents to a wearer using a head-mounted display device that includes an eye tracking sensor, a light projector, a beam steerer, and a combiner, includes determining, with the eye tracking sensor, a position of a pupil of an eye of the wearer and projecting, with the light projector, light for rendering images based at least on the augmented reality contents. The method also includes changing, with the beam steerer, a direction of the light from the light projector based on the position of the pupil. The light from the beam steerer is directed toward the combiner, and the light from the beam steerer and light from an outside of the head-mounted display device are combined, by the combiner, to provide an overlap of a rendered image and a real image that corresponds to the light from the outside of the head-mounted display device.

In accordance with some embodiments, a head-mounted display device for providing augmented reality contents to a wearer, the device includes an eye tracking sensor configured to determine a position of a pupil of an eye of the wearer, a light projector configured to project light for rendering images based at least on the augmented reality contents, a beam steerer configured to change a direction of the light from the light projector based on the position of the pupil, and a combiner configured to combine the light from the light projector and light from an outside of the head-mounted display device for providing an overlap of the rendered image and a real image that corresponds to the light from the outside of the head-mounted display device.

In accordance with some embodiments, a head-mounted display device for providing images to a wearer includes a focus-supporting light projector configured to project light for rendering images. The light projected from the focus-supporting light projector corresponds to an image plane that is selected based at least in part on a position of a pupil of an eye of the wearer. The device also includes a beam steerer configured to change a path of the light projected from the focus-supporting light projector based on the position of the pupil of the eye of the wearer.

In accordance with some embodiments, a method for providing images to a wearer is performed using a head-mounted display device that includes a focus-supporting light projector and a beam steerer. The method includes projecting, with the focus-supporting light projector, light for rendering images based at least on virtual reality contents and/or augmented reality contents. The light projected from the focus-supporting light projector corresponds to an image plane that is selected based at least in part on a position of a pupil of an eye of the wearer. The method also includes changing, with the beam steerer, a path of the light projected from the focus-supporting light projector based on the position of the pupil of the eye of the wearer.

Thus, the disclosed embodiments provide compact and light display devices that can be used for augmented reality and/or virtual reality operations.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 3 is an isometric view of a display device in accordance with some embodiments.

FIGS. 6A-6C are schematic diagrams illustrating a tunable waveguide in accordance with some embodiments.

Figure 1:
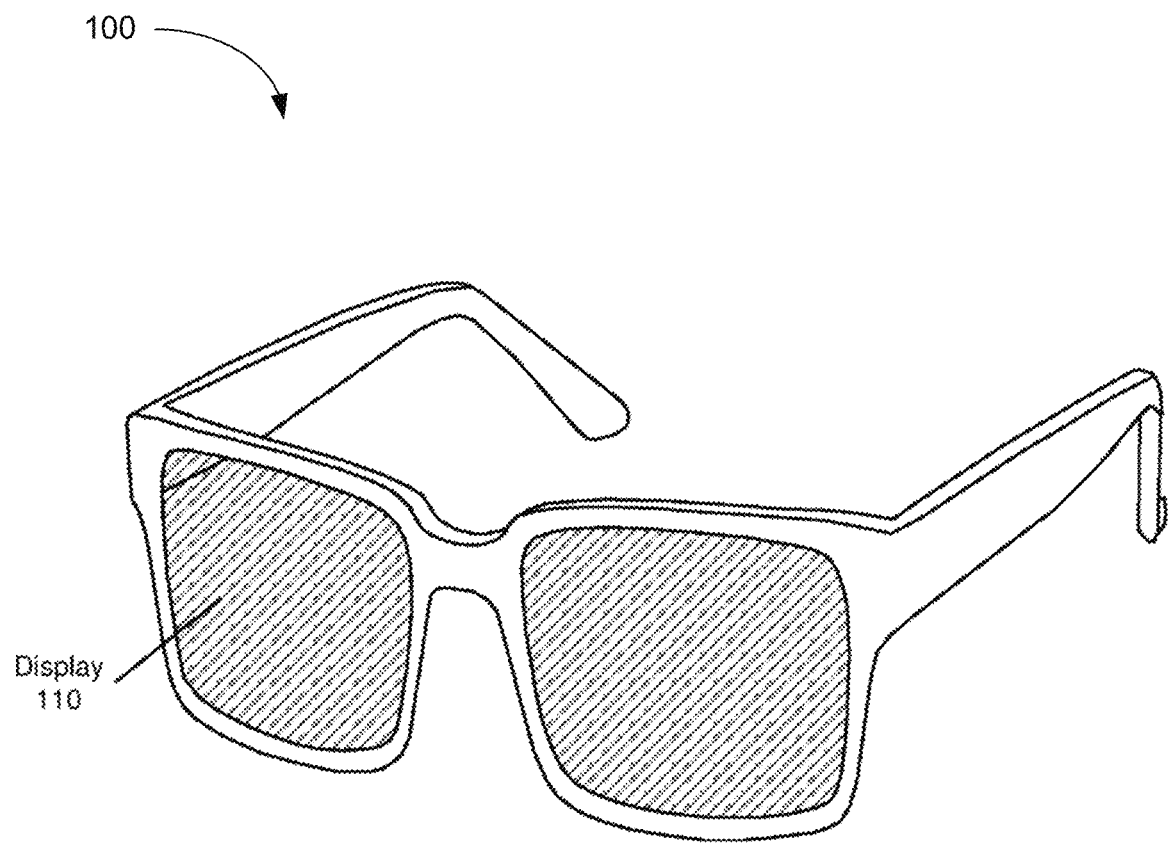
FIG. 1 is a perspective view of a display device in accordance with some embodiments.

These figures are not drawn to scale unless indicated otherwise.

DETAILED DESCRIPTION

Utilizing optical elements (e.g., combiners) that transmit real-world images and reflect computer-generated images allows augmented reality operations without requiring a separate high-resolution high frame rate camera, thereby reducing the size and the weight of head-mounted displays. In order to provide images to a pupil regardless of a movement of the pupil, conventional combiners project images onto a large eyebox (e.g., an eyebox having a characteristic dimension, such as a diameter or a width, of at least 1 cm). A large eyebox can be achieved, for example, by a pupil replication technique that expands the size of a beam transmitted to the eyebox. For example, conventional combiners may include a waveguide coupled with an optical element (e.g., a grating) to expand the size of the beam. However, when light is projected onto a large eyebox, a significant portion of the light lands on an area outside the pupil and, hence, is not detected. This leads to decreased brightness of the projected images. Instead of increasing the power of displays, which increases the size, weight, and power consumption of head-mounted displays, images are projected onto a small eyebox (e.g., an eyebox that corresponds to a size of the pupil), thereby improving the brightness of the projected images. To accommodate for the movement of the pupil and reduce vignetting of the projected light, a position of the pupil is determined using an eye tracker and the projected light is steered toward the pupil.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first light projector could be termed a second light projector, and, similarly, a second light projector could be termed a first light projector, without departing from the scope of the various described embodiments. The first light projector and the second light projector are both light projectors, but they are not the same light projector.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual contents (e.g., augmented reality contents, virtual reality contents, mixed reality contents, or any combination thereof) to a user.

Figure 2:
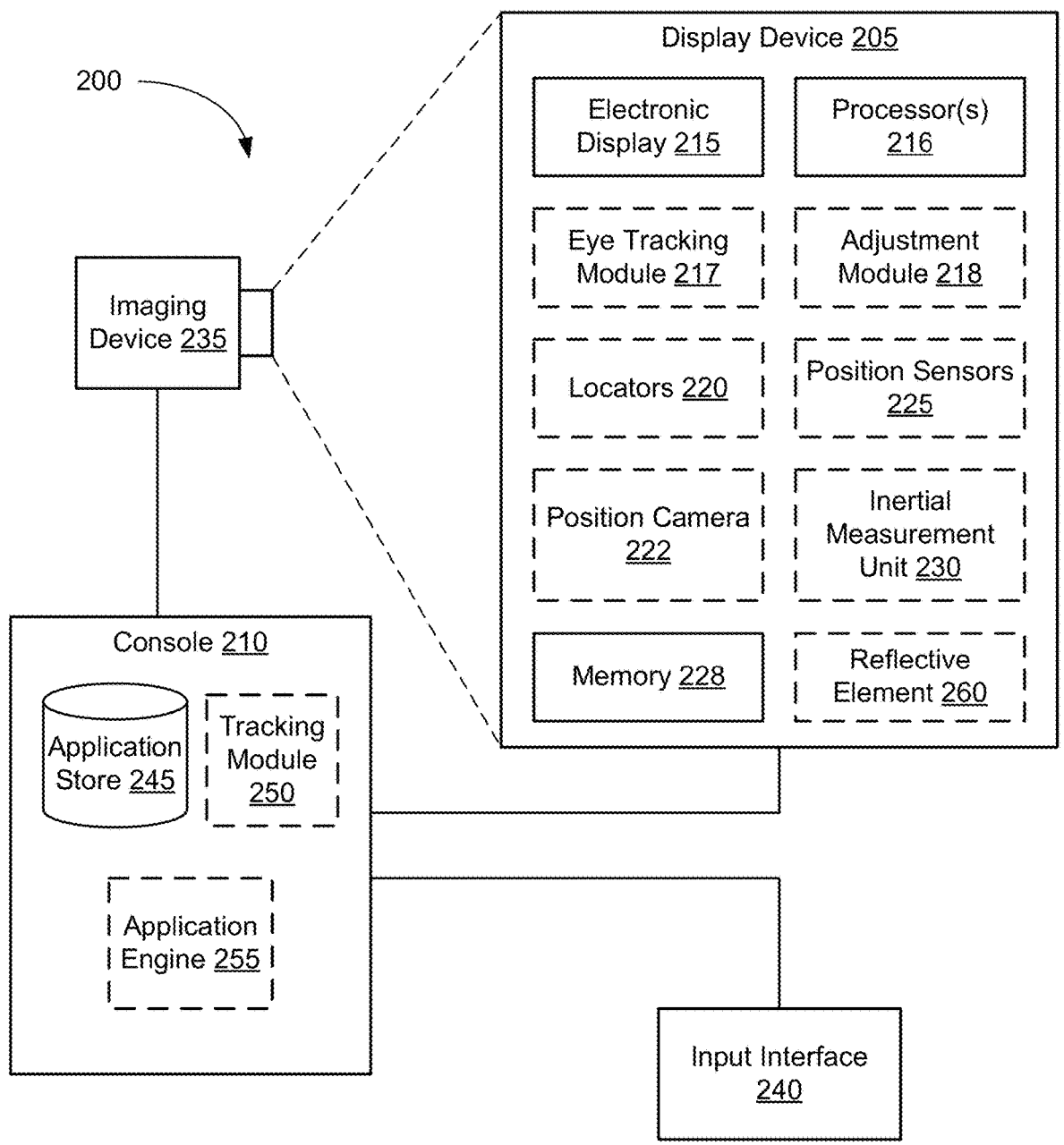
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver augmented reality, virtual reality, and mixed reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in an augmented environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more reflective elements 260 or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to display images to the user by projecting the images onto one or more reflective elements 260.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array. In some embodiments, electronic display 215 projects images to one or more reflective elements 260, which reflect at least a portion of the light toward an eye of a user.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described herein.

Adjustment module 218 generates an image frame based on the determined locations of the pupils. In some embodiments, this sends a discrete image to the display that will tile subimages together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 optionally includes one or more reflective elements 260. In some embodiments, electronic display device 205 optionally includes a single reflective element 260 or multiple reflective elements 260 (e.g., a reflective element 260 for each eye of a user). In some embodiments, electronic display device 215 projects computer-generated images on one or more reflective elements 260, which, in turn, reflect the images toward an eye or eyes of a user. The computer-generated images include still images, animated images, and/or a combination thereof. The computer-generated images include objects that appear to be two-dimensional and/or three-dimensional objects. In some embodiments, one or more reflective elements 260 are partially transparent (e.g., the one or more reflective elements 260 have a transmittance of at least 15%, 20%, 25%, 30%, 35%, 40%, 45%, or 50%), which allows transmission of ambient light. In such embodiments, computer-generated images projected by electronic display 215 are superimposed with the transmitted ambient light (e.g., transmitted ambient image) to provide augmented reality images.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described herein may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in an augmented environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

FIG. 3 is an isometric view of display device 300 in accordance with some embodiments. In some other embodiments, display device 300 is part of some other electronic display (e.g., a digital microscope, a head-mounted display device, etc.). In some embodiments, display device 300 includes light emission device array 310 and one or more lenses 330. In some embodiments, display device 300 also includes an IR detector array.

Light emission device array 310 emits image light and optional IR light toward the viewing user. Light emission device array 310 may be, e.g., an array of LEDs, an array of microLEDs, an array of OLEDs, or some combination thereof. Light emission device array 310 includes light emission devices 320 that emit light in the visible light (and optionally includes devices that emit light in the IR).

In some embodiments, display device 300 includes an emission intensity array configured to selectively attenuate light emitted from light emission array 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to control what portion of the image light emitted from light emission device array 310 is passed to the one or more lenses 330. In some embodiments, display device 300 uses an emission intensity array to facilitate providing image light to a location of pupil 350 of eye 340 of a user, and minimize the amount of image light provided to other areas in the eyebox.

One or more lenses 330 receive the modified image light (e.g., attenuated light) from emission intensity array (or directly from emission device array 310), and direct the modified image light to a location of pupil 350.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device array 310 and an emission intensity array make up a display element. Alternatively, the display element includes light emission device array 310 (e.g., when light emission device array 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more lenses 330 toward the determined location of pupil 350, and not toward other locations in the eyebox.

In some embodiments, display device 300 includes one or more broadband sources (e.g., one or more white LEDs) coupled with a plurality of color filters, in addition to, or instead of, light emission device array 310.

Figure 4A:
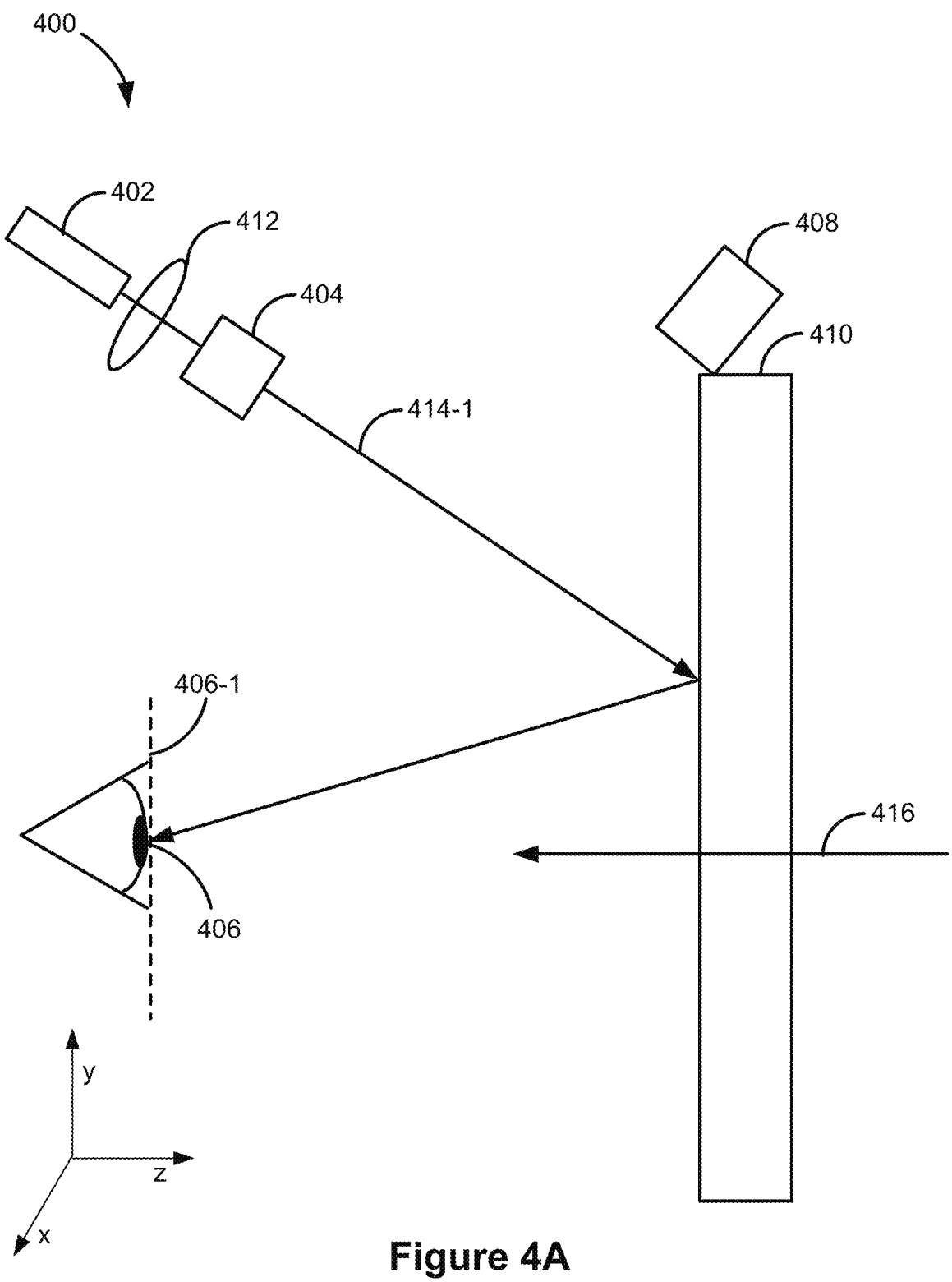
FIG. 4A is a schematic diagram illustrating a display device in accordance with some embodiments.

FIG. 4A is a schematic diagram illustrating display device 400 in accordance with some embodiments. In some embodiments, display device 400 corresponds to display device 100 described herein with respect to FIG. 1. In some embodiments, display device 400 is configured to provide augmented reality contents to a wearer of display device 400. In FIG. 4A, display device 400 includes light projector 402, beam steerer 404, combiner 410, and eye tracker 408. Light projector 402 projects light 414-1 toward beam steerer 404, which, in turn, directs light 414-1 toward beam combiner 410. Beam combiner 410 reflects and/or guides at least a portion of light 414-1 toward pupil 406 (e.g., a pupil of an eye of a user or wearer of display device 400). Beam combiner 410 combines light 414-1 with light (e.g., light 416) coming from the outside of display device 400 (e.g., ambient light) so that an image represented by light 414-1 is overlapped with, or superimposed on, a real-world image provided by light 416.

Eye tracker 408 is configured to determine a position of pupil 406 and/or track its movement as pupil 406 rotates toward different gaze directions. In some embodiments, eye tracker 408 corresponds to, is coupled with, or is included in eye tracking module 217 described herein with respect to FIG. 2. In some embodiments, determining a position of pupil 406 includes determining the position of pupil 406 on an x-y plane of pupil 406 (e.g., reference plane 407-1). In some embodiments, the x-y plane is a curvilinear plane. In some embodiments, determining a position of pupil 406 includes determining a distance between the eye and eye tracker 408 (e.g., the shortest distance between the eye and eye tracker 408). In some embodiments, eye tracker 408 includes a light source (e.g., an infrared or a near-infrared light source). In some embodiments, eye tracker 408 is integrated with light projector 402. In some embodiments, light projected by light projector 402 and light detected by eye tracker (e.g., IR light) 408 have the same optical path (or parallel optical paths) and are transmitted or guided by the same optical elements (e.g., one or more lenses 412, beam steerer 404 and/or beam combiner 410).

In some embodiments, light projector 402 is configured to project light for providing augmenter reality images overlapped with real-world view. In some embodiments, light projector 402 includes one or more light emission devices. Examples of the light emission devices include: light emitting diodes (LEDs), superluminescent light emitting diodes (SLEDs), lasers, or some combination thereof. The light emission devices include devices that are capable of generating visible light (e.g., red, green, blue, etc.) used for multi-color image generation. In some embodiments, the light emission devices also include devices that generate infrared (IR) and/or near infrared (NIR) light. In some embodiments, the one or more light emission devices includes a liquid crystal display (LCD), a liquid crystal on silicon (LCOS) display, organic light emitting diodes (OLEDs), inorganic light emitting diodes (ILEDs), digital light processing (DLP) display, or any combination thereof. In some embodiments, the one or more light emission devices are optically coupled with a corresponding array of spatial light modulators. The array of spatial light modulators is configured to selectively attenuate individual light emission devices, groups of light emission devices, or any combination thereof. In FIG. 4A, pupil 406 is located adjacent to reference plane 407-1 that is parallel to an x-y plane and tangential to a surface of pupil 406. Light 414-1 projected by light projector 402 illuminates an area on reference plane 407-1. In some embodiments, the area is sized to cover only a subset of an eye box configured to cover all possible positions of a pupil. For example, the area covers an area that has a characteristic dimension less than 20 mm (e.g., a round area having a diameter of 7 mm, 6 mm, 5 mm, 4 mm, or 3 mm, a square area of 7 mm×7 mm, 6 mm×6 mm, 5 mm×5 mm, 4 mm×4 mm, or 3 mm×3 mm, etc.). In some embodiments, light projector 402 projects light over an area on reference plane 407-1 having a characteristic dimension of at least 3 mm. In some embodiments, light 414-1 is steered to project light within an area of the reference plane 407-1 plane, which intersects with an uncertainty cone encompassing positions of pupil 406 directed to all possible gaze directions.

Beam steerer 404 directs light 414-1 toward combiner 410, which, in turn, guides light 414-1 toward pupil 406. In some embodiments, beam steerer 404 adjusts the direction of light 414-1 and/or offsets light 414-1 based on the position of pupil 406 determined by eye tracker 408. In some embodiments, beam steerer 404 includes a mechanical beam steerer including one or more actuators that change the location of beam steerer 404 in the x- and/or y-directions, or in the x-, y- and/or z-directions with respect to display device 400. In some embodiments, beam steerer 404 includes a mechanical beam steerer including one or more actuators configured to rotate about one or more axes. In some embodiments, beam steerer 404 includes one or more translational, one or more rotational mirrors, or any combination thereof. In some embodiments, beam steerer 404 also includes one or more stationary mirrors. In some embodiments, beam steerer 404 is integrated with light projector 402 or beam combiner 410.

Combiner 410 reflects and/or guides light 414-1 projected by light projector 402 toward pupil 406 and transmits light 416 from the outside of display device 400. As a result, computer-generated images formed by light projected from light projector 402 are overlapped with a real-world image. In some embodiments, combiner 410 is configured to avoid pupil replication. For example, combiner 410 reflects or guides light (e.g., light 414-1) onto an area without replicated rays. In some embodiments, combiner 410 includes a Fresnel combiner, a pancake combiner, an ellipsoidal mirror, one or more tunable waveguides, or a holographic combiner.

Optionally, display device 400 includes one or more lenses 412. In some embodiments, one or more lenses 412 are optically coupled with light projector 402 and positioned on the optical path of light 414-1 before beam steerer 404. In some embodiments, lenses 412 are optically coupled with beam steerer 404 and positioned on the optical path of light 414-1 after beam steerer 404. In some embodiments, one or more lenses 412 focus light 414-1 projected by light projector 402. In some embodiments, one or more lenses 412 include a lens selected from a group consisting of a concave lens, a convex lens, a plano-concave lens, a plano-convex lens, or a convex-concave lens. In some embodiments, one or more lenses 412 include a lens selected from a group consisting of a spherical lens or an aspherical lens. In some embodiments, one or more lenses 412 include a Fresnel lens including one or two Fresnel surfaces, at least a portion of a Fresnel surface being defined by a plurality of Fresnel structures. In some embodiments, one or more lenses 412 include an adaptive lens with an adjustable focal distance (e.g., an autofocusing lens, an electro-wetting lens, a liquid lens, or a liquid crystal lens).

Figure 4B:
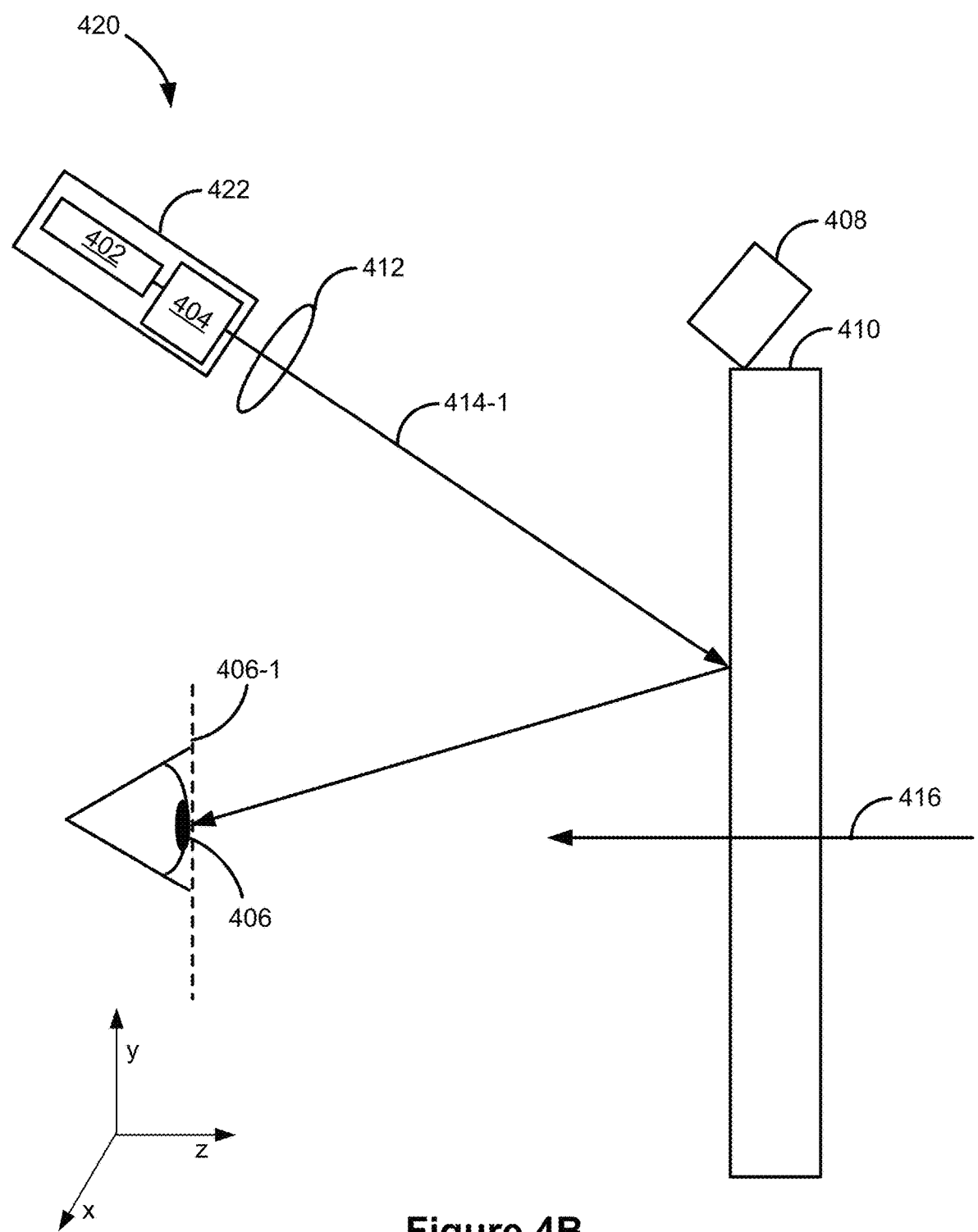
FIG. 4B is a schematic diagram illustrating a display device in accordance with some embodiments.

FIG. 4B is a schematic diagram illustrating display device 420 in accordance with some embodiments. Display device 420 corresponds to display device 400 described herein with respect to FIG. 4A except that, in FIG. 4B, light projector 402 is integrated with beam steerer 404. Component 422 projects and steers light 414-1 toward combiner 410, which, in turn, reflects light 414-1 toward pupil 406.

Figure 4C:
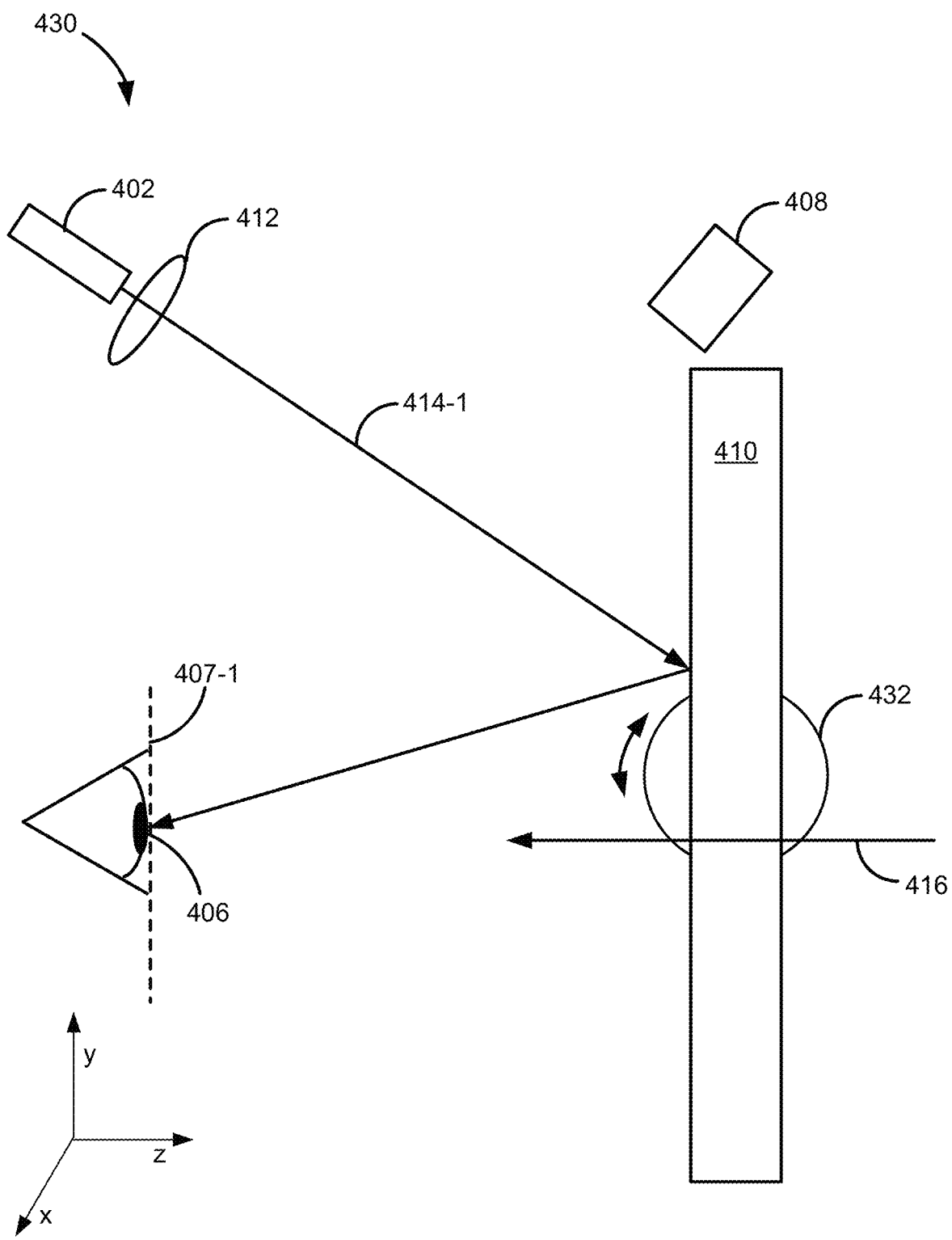
FIG. 4C is a schematic diagram illustrating a display device in accordance with some embodiments.

FIG. 4C is a schematic diagram illustrating display device 430 in accordance with some embodiments. Display device 430 corresponds to display device 400 described herein with respect to FIG. 4A except that, in FIG. 4C, beam steerer 432 is integrated with combiner 410. Beam steerer 432 is mechanically coupled with combiner 410 and configured to rotate combiner 410 for directing light 414-1. In some embodiments, additionally or alternatively, beam steerer 432 is configured to translate combiner 410 for directing light 414-1 (e.g., FIGS. 10A-10B). Light 414-1 projected by light projector 402 is received by combiner 410, which, in turn, reflects light 414-1 toward pupil 406.

Figure 4D:
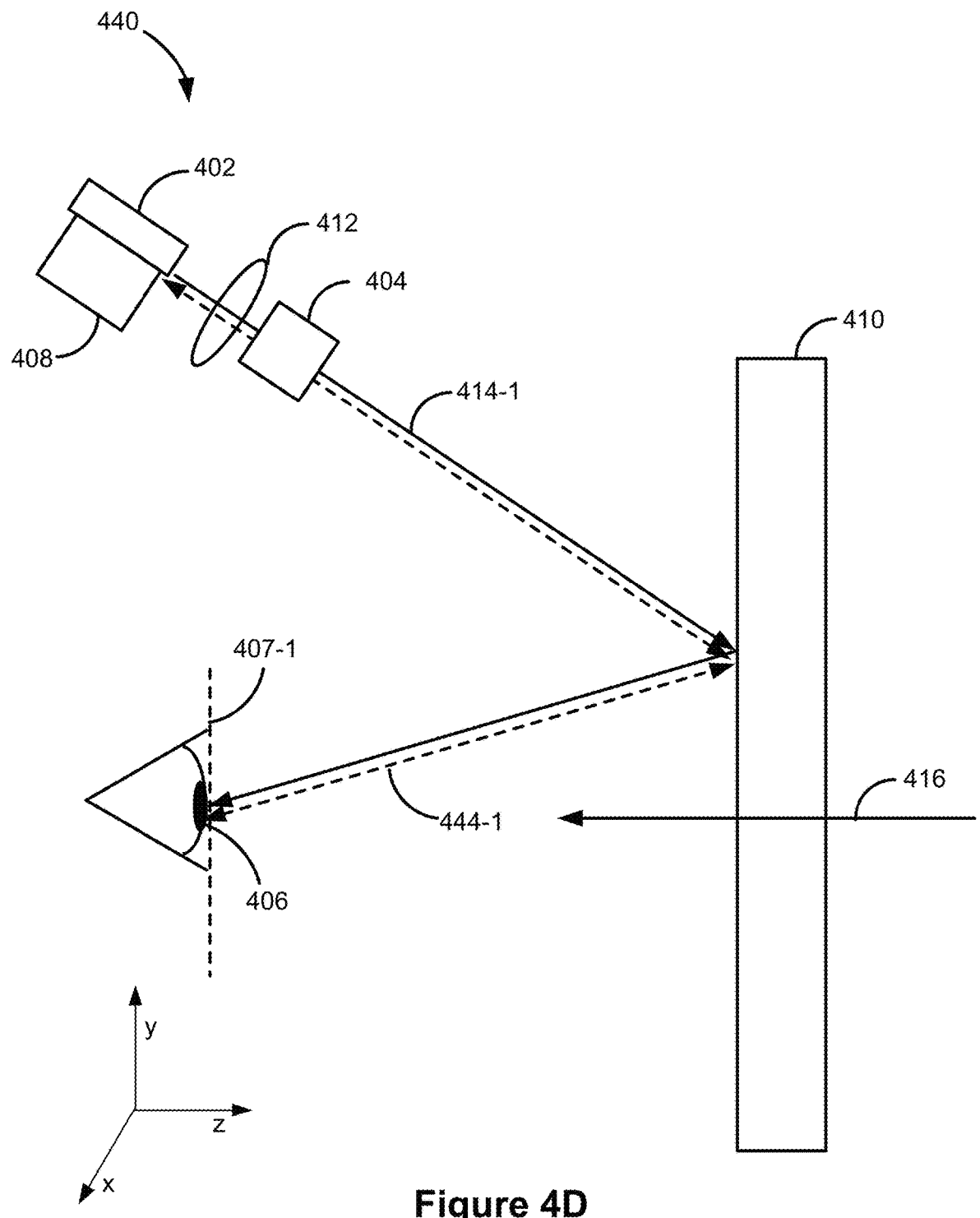
FIG. 4D is a schematic diagram illustrating a display device in accordance with some embodiments.

FIG. 4D is a schematic diagram illustrating display device 440 in accordance with some embodiments. Display device 440 corresponds to display device 400 described herein with respect to FIG. 4A except that, in FIG. 4D, light projector 402 is integrated with eye tracker 408. Light 414-1, projected by light projector 402 is directed, by beam steerer 404, toward combiner 410, which, in turn, reflects light 414-1 toward pupil 406. Eye tracker 408 transmits ray 444-1 (e.g., an IR ray or a near-infrared ray) via the same optical path as light 414-1 toward pupil 406. Ray 444-1 is then reflected from pupil 406, via the same optical path, back to eye tracker 408, which detects the reflected ray 444-1.

Although FIGS. 4A-4D illustrate display devices in accordance with various embodiments, one or more features described herein with respect to any one of FIGS. 4A-4D may be included in any of the display devices described herein with respect to any other drawings of FIGS. 4A-4D. For example, in some embodiments, the display devices described herein with respect to FIGS. 4A-4C include light projector 402 integrated with eye tracker 408. In some embodiments, the display devices described herein with respect to FIGS. 4A and 4C-4D include light projector 402 integrated with beam steerer 404. In some embodiments, the display devices described herein with respect to FIGS. 4A-4B and 4D include combiner 410 integrated with beam steerer 432 in addition to, or instead of, beam steerer 404. For brevity, such details are repeated herein.

Figure 5A:
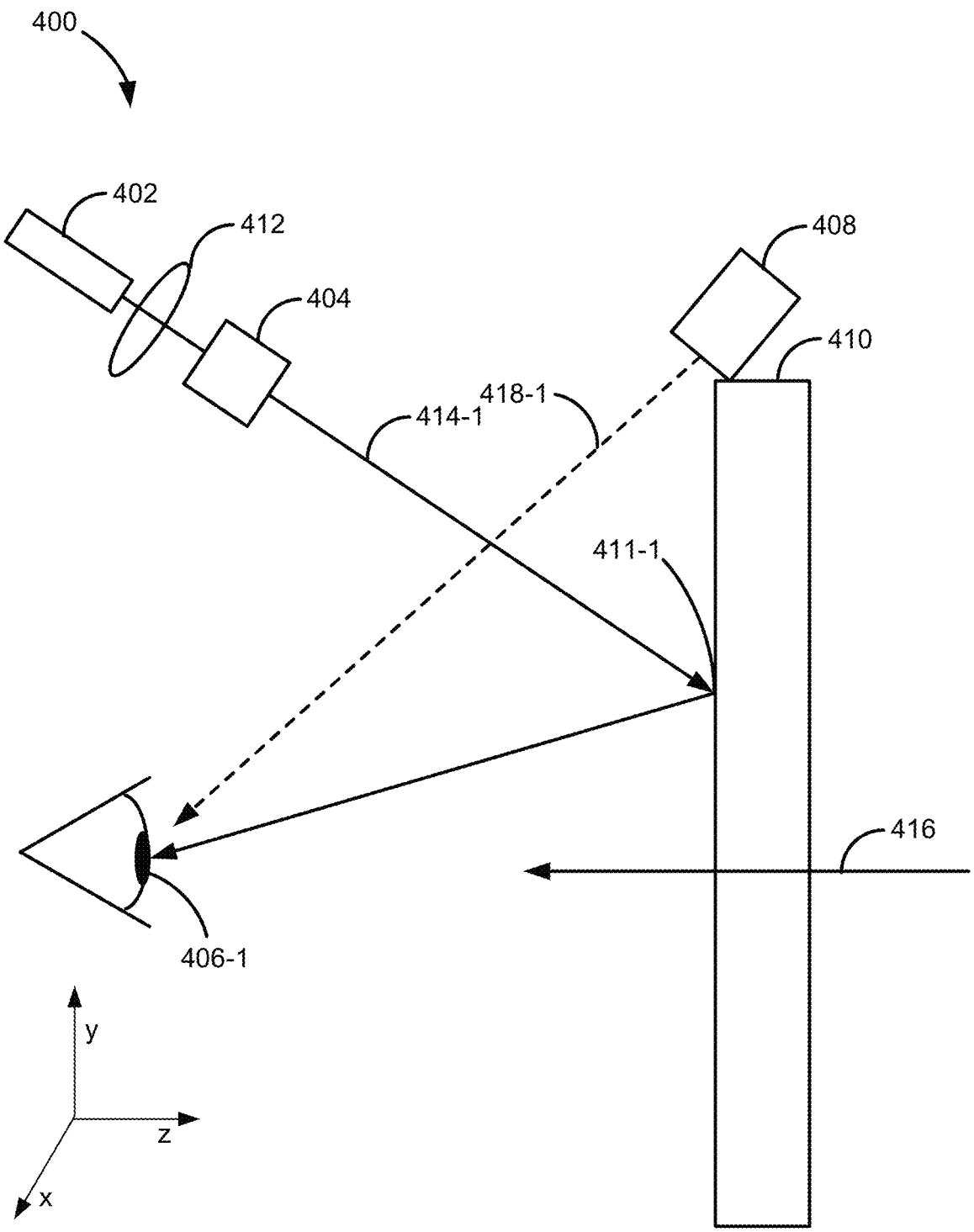
FIGS. 5A-5B are schematic diagrams illustrating example operations of a display device in accordance with some embodiments.
Figure 5B:
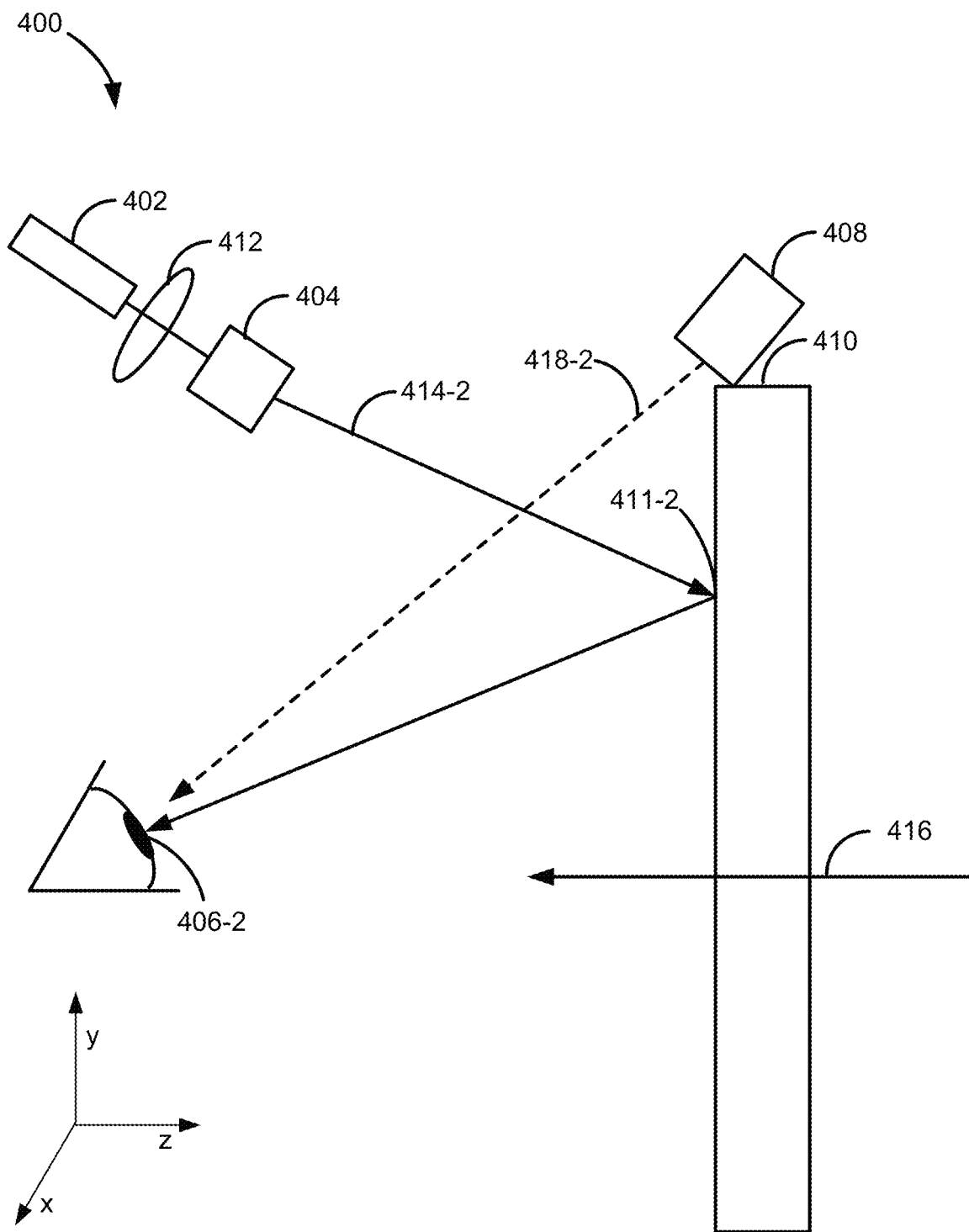

FIGS. 5A-5B are schematic diagrams illustrating example operations of display device 400 in accordance with some embodiments.

In FIG. 5A, pupil 406 is located at first pupil position 406-1 directly facing combiner 410. The position of pupil 406 is determined by eye tracker 408, as illustrated with arrow 418-1. In some embodiments, the position is determined based on pupil images, glint detection, detection of retinal reflex (also called retinal reflection), or measurement of a profile of a surface of pupil 406 (e.g., using a depth sensor). In accordance with a determination that pupil 406 is located at first pupil position 406-1, light 414-1 projected by light projector 402 is directed, by beam steerer 404, toward location 411-1 of combiner 410 so that reflected light 414-1 is directed toward the pupil 406 at first pupil position 406-1. In addition, combiner 410 transmits light 416 from the outside display device 400, and at least a portion of light 416 is transmitted toward pupil 406 at first pupil position 406-1.

In FIG. 5B, pupil 406 has moved to second pupil position 406-2 (e.g., due to rotation of the eye). The position of pupil 406 is determined by eye tracker 408, as illustrated with arrow 418-2. In accordance with a determination that pupil 406 is located at second pupil position 406-2, light 414-2 projected by light projector 402 is directed, by beam steerer 404, toward location 411-2 of combiner 410 that is distinct from location 411-1 of combiner 410. This causes combiner 410 to reflect light 414-2 toward pupil 406 at second pupil position 406-2.

Although FIGS. 5A-5B illustrate steering the light projected by light projector 402 in one direction, a person having ordinary skill in the art would understand that the light projected by light projector 402 can be steered in the opposite direction (e.g., from location 411-2 to location 411-1). For brevity, such details are not repeated herein.

Although FIGS. 5A-5B illustrate example operations of display device 400, a person having ordinary skill in the art would understand analogous operations applicable to any other display devices described herein. For brevity, such details are not repeated herein.

Certain aspects of combiners are described herein with respect to FIGS. 6A-6C, 7A-7B, 8, 9A-9E, and 10A-10B. Certain aspects of tracking a position of pupil 406 are discussed herein with respect to FIGS. 11A-11F. For brevity, such details are not repeated herein.

Figure 5C:
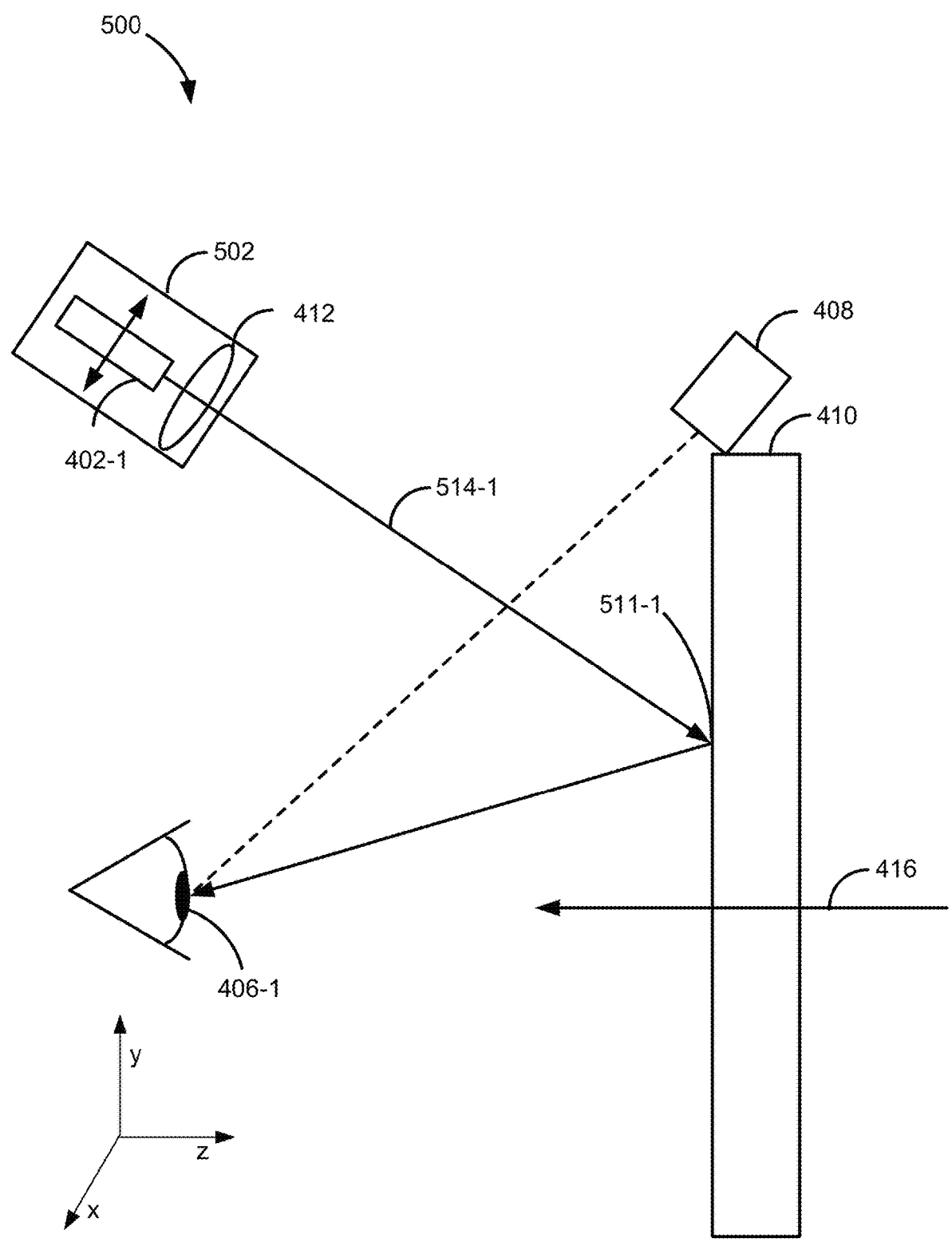
FIGS. 5C-5E are schematic diagrams illustrating a display device in accordance with some embodiments.
Figure 5D:
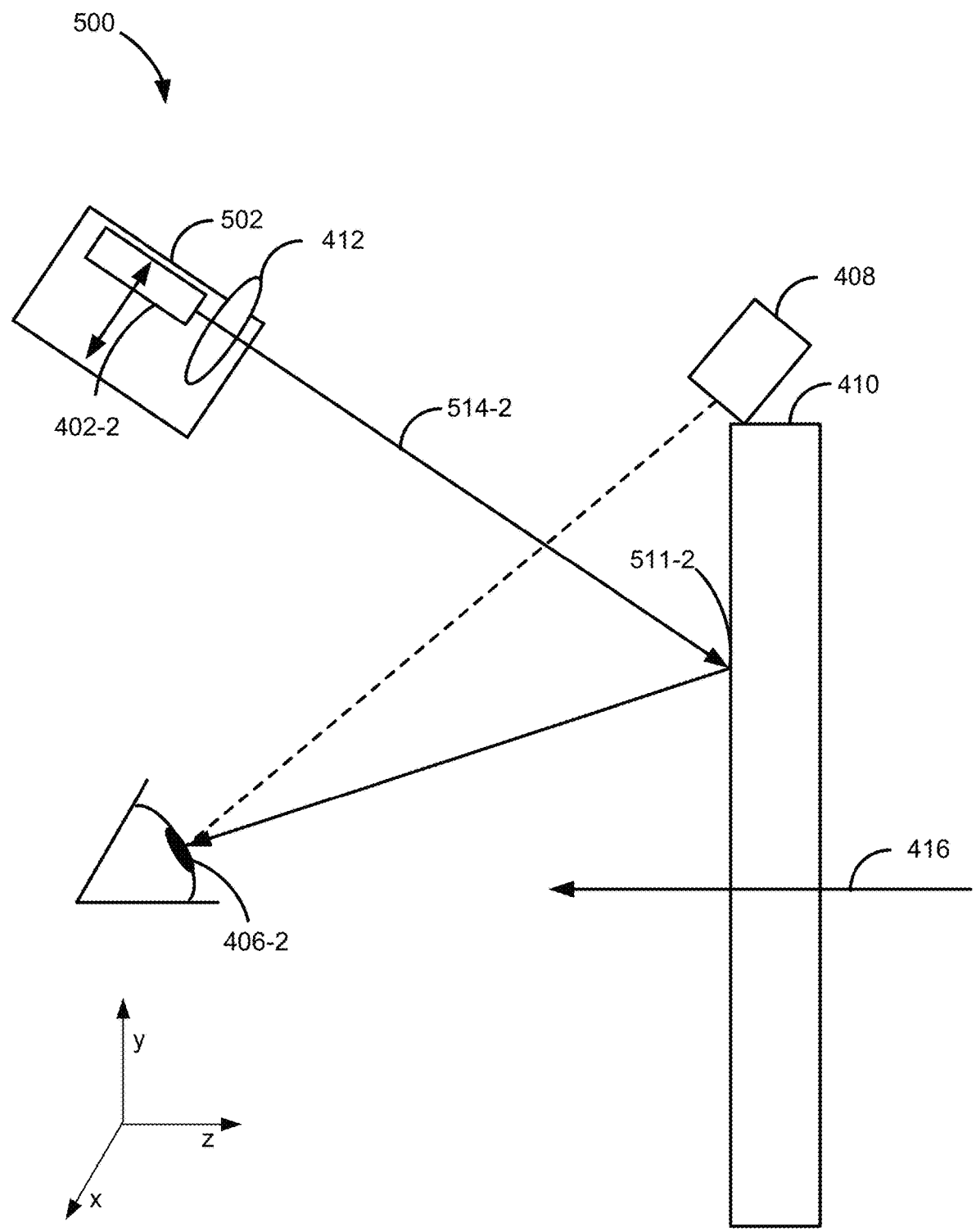
Figure 5E:
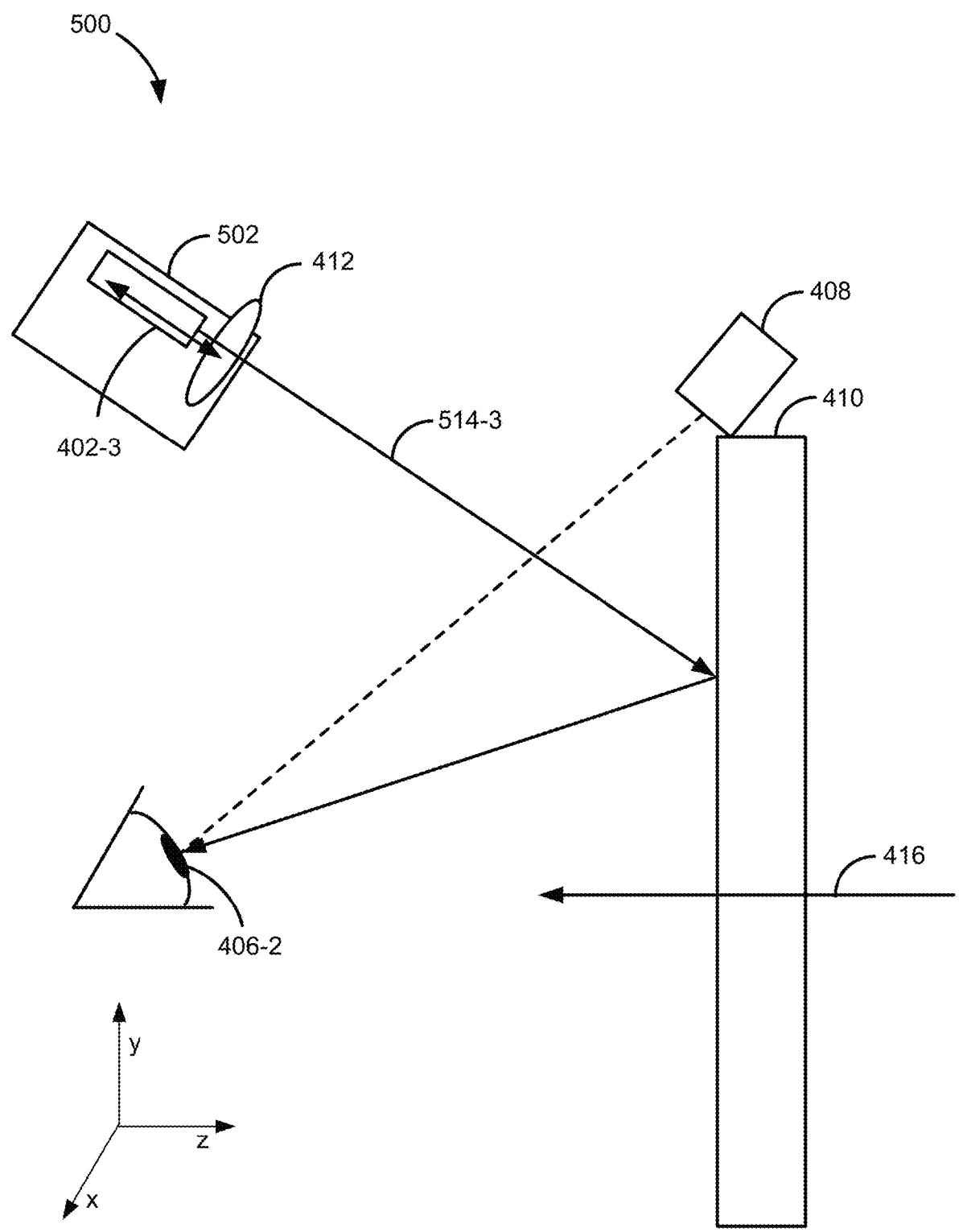

FIGS. 5C-5E are schematic diagrams illustrating display device 500 in accordance with some embodiments.

Display device 500 in FIG. 5C corresponds to display device 400 described herein with respect to FIG. 4A, except that light projector 402, corresponding to light projector 402 of FIG. 4A positioned at a first position, is mechanically coupled with actuator 502. In some embodiments, display device 500 does not include beam steerer 404, as shown in FIG. 5C. In some embodiments, display device 500 includes beam steerer 404 in addition to actuator 502.

Actuator 502 is configured to change the position of light projector 402 in one or more dimensions (e.g., three dimensions) by moving (e.g., linearly or piecewise linearly) light projector 402, thereby changing the optical path of light 514-1 projected by light projector 402. In some embodiments, actuator 502 includes a voice coil motor, and moving light projector 402 includes activating the voice coil motor. In some embodiments, actuator 502 is coupled with one or more translation stages, and moving light projector 402 includes activating the actuator 502 to move the one or more translation stages.

In FIG. 5C, pupil 406 is located at first pupil position 406-1. The position of pupil 406 is determined by eye tracker 408. Also in FIG. 5C, light projector 402 is located at first position 402-1, and projects light 514-1 to location 511-1 on combiner 410, where light 514-1 is directed toward pupil 406 at first pupil position 406-1.

In some embodiments, light projector 402 is optically coupled with one or more lenses 412 positioned on the optical path of light 514-1. In some embodiments, one or more lenses 412 are mechanically coupled with actuator 502. In some embodiments, actuator 502 is configured to move light projector 402 and one or more lenses 412 concurrently. In some embodiments, actuator 502 is configured to move light projector 402 independent of one or more lenses 412 (e.g., one or more lenses 412 are not mechanically coupled with actuator 502 so that actuator 502 moves light projector 402 without moving one or more lenses 412).

In FIG. 5D, pupil 406 has moved to second pupil position 406-2 (e.g., due to rotation of the eye). In response to a determination that pupil 406 has moved to second pupil position 406-2, actuator 502 moves light projector 402 to second position 402-2, thereby directing light 514-2 toward location 511-2 on combiner 410, where light 514-2 is directed toward pupil 406 at second pupil position. In some embodiments, movement of light projector 402 does not change the direction of light projected by light projector 402 (e.g., light 514-1 is parallel to light 514-2). In some embodiments, a direction of a movement of light projector 402 from first position 402-1 to second position 402-2 is perpendicular to a direction of propagation of light 514-2. In some embodiments, actuator 502 also moves one or more lenses 412 so that one or more lenses 412 remains in the optical path of the light projected by light projector 402.

In some embodiments, light projector 402 and/or one or more lenses 412 are moved in a direction parallel to a direction of propagation of light projected by light projector 402 in order to adjust an image plane corresponding to the light projected by light projector 402. This changes a distance to a projected image, perceived by a wearer. In FIG. 5E, pupil 406 remains in second pupil position 406-2. The image plane corresponding to the light projected by light projector 402 is adjusted by moving light projector 402 in a direction parallel to an optical axis of light projector 402 to third position 402-3. While light projector 402 remains at third position 402-3, the image plane moves along an optical axis in a direction toward light projector 402. In some embodiments, actuator 502 moves light projector 402 to a position further away from pupil 406, which, in turn, moves the image plane along the optical axis in a direction away from light projector 402. By moving light projector 402 back and forth in directions parallel to the direction of propagation of light projected by light projector 402, the projected images or objects appear to be closer or further away from a wearer of display device 500.

Moving an image plane to change a perceived distance to a projected image is described further with respect to FIGS. 12A-12D.

Figure 5F:
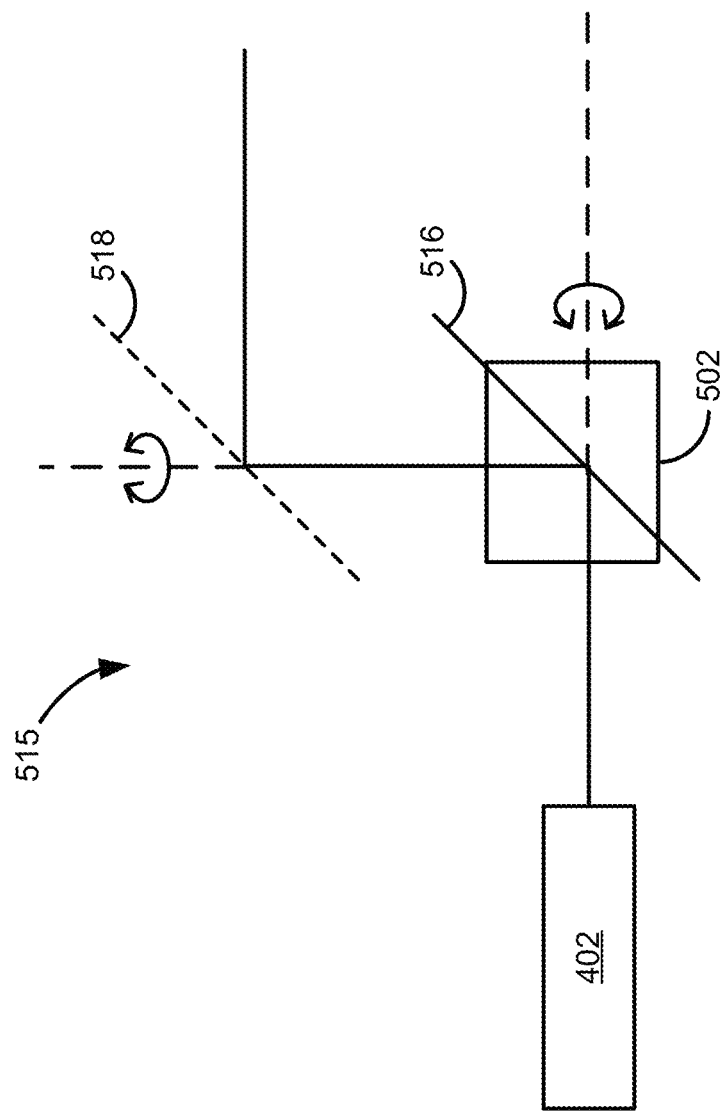
FIG. 5F is a schematic diagram illustrating a scanning reflector assembly in accordance with some embodiments.

FIG. 5F is a schematic diagram illustrating scanning reflector assembly 515 in accordance with some embodiments. Scanning reflector assembly 515 includes adjustable mirror 516 mechanically attached to actuator 502. Scanning reflector assembly 515 is optically coupled with light projector 402 (e.g., scanning reflector assembly 515 is configured to receive light projected from light projector 402). Optionally, scanning reflector assembly 515 also includes mirror 518. In some embodiments, mirror 518 is either a stationary mirror or a movable mirror. In some embodiments, mirror 518 is also mechanically coupled with actuator 502 (or an actuator that is separate from actuator 502). Scanning reflector assembly 515 is configured to direct light from light projector 402 toward a pupil of an eye of a wearer of a head-mounted display device. As the position of the pupil changes, the direction of the light projected by light projector 402 is changed by moving (e.g., by tilting) adjustable mirror 516 and/or mirror 518.

Although FIG. 5F illustrates scanning reflector assembly 515 with adjustable mirror 516 configured to rotate about one axis, in some embodiments, scanning reflector assembly 515 includes an adjustable mirror configured to rotate about two axes that are not parallel to each other (e.g., the adjustable mirror is configured to rotate about the x-axis and also rotate about the y-axis at the same time and the adjustable mirror is also configured to rotate about the x-axis and also rotate about the y-axis at separate times).

Figure 5G:
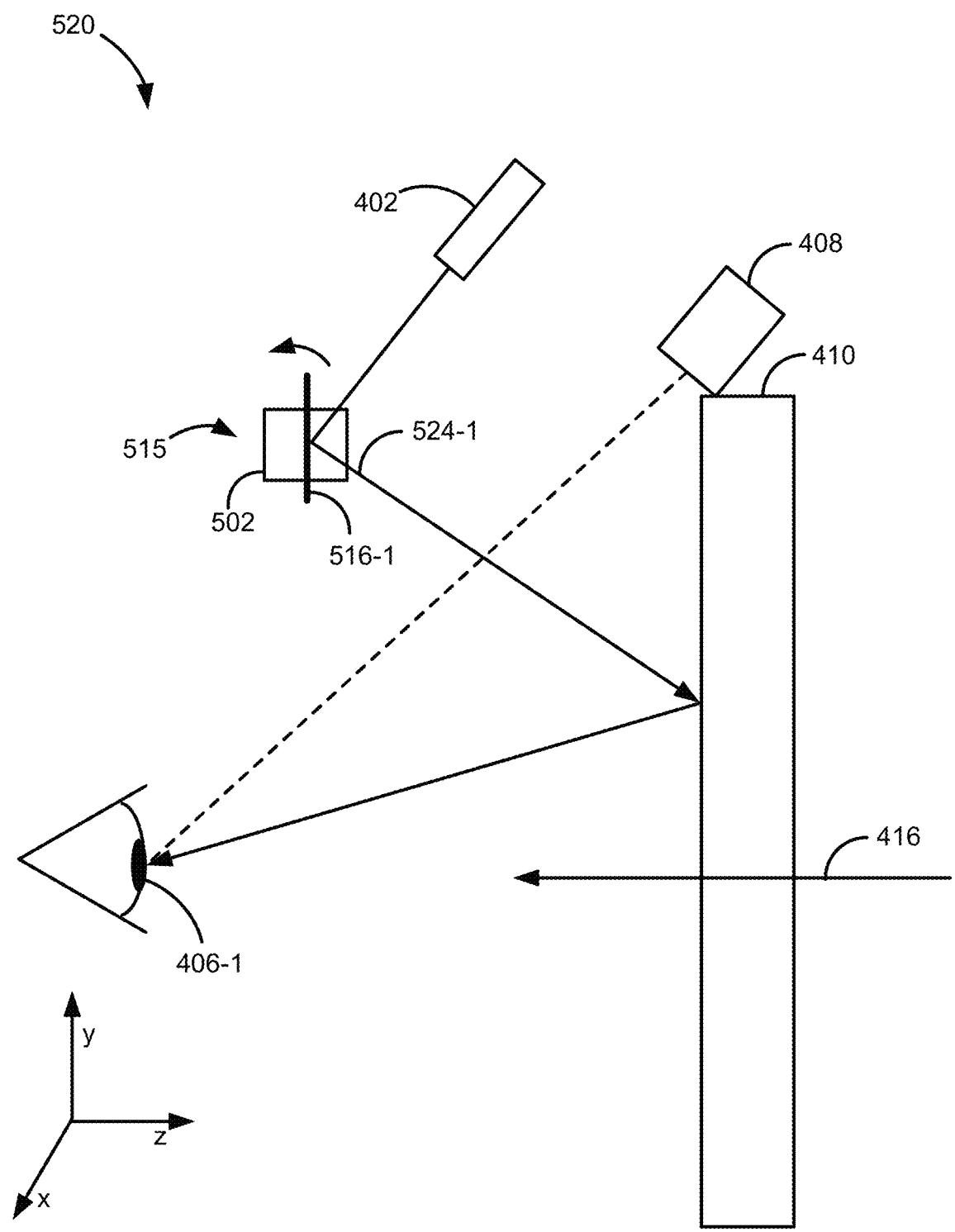
FIG. 5G-5H are schematic diagrams illustrating a display device in accordance with some embodiments.
Figure 5H:
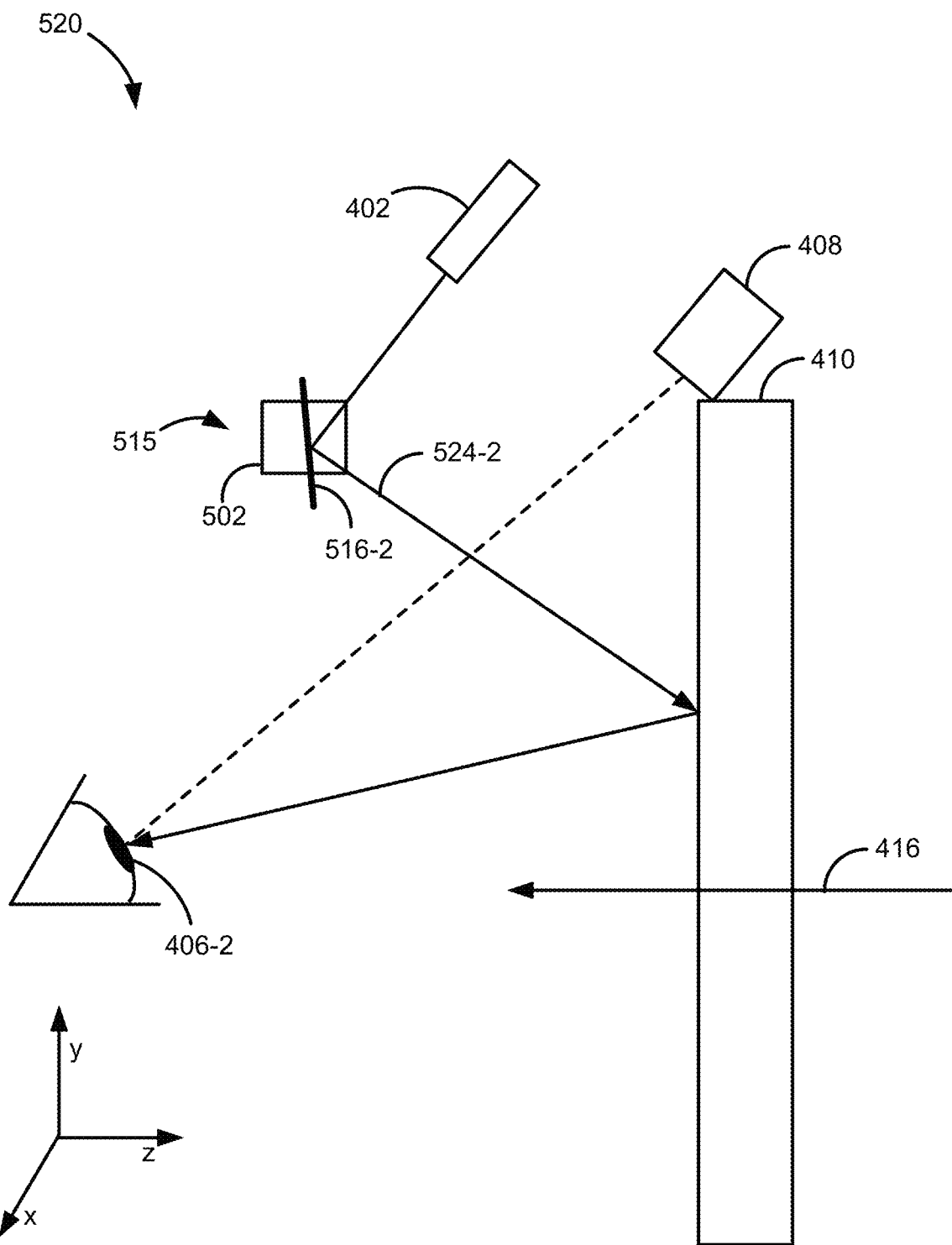

FIGS. 5G-5H are schematic diagrams illustrating display device 520 in accordance with some embodiments. Display device 520 is similar to display device 500 described herein with respect to FIG. 5A, except that display device 520 includes scanning reflector assembly 515 optically coupled with light projector 402. In some embodiments, display device 520 includes one or more lenses 412, which are not shown in FIG. 5G.

In FIG. 5G, pupil 406 is located at first pupil position 406-1. The position of pupil 406 is determined with eye tracker 408. Adjustable mirror 516 is located at first mirror position 516-1. Adjustable mirror directs light 524-1 toward pupil 406 in first pupil position 406-1.

In FIG. 5H, pupil 406 has moved to second pupil position 406-2 (e.g., due to a rotation of the eye). In response to a determination that the pupil has moved to second pupil position 406-2, adjustable mirror 516 is tilted, by actuator 502, to second mirror position 516-2 so that light 524-2, projected by light projector 402, is directed toward pupil 406 at second pupil position 406-2. In FIG. 5H, adjustable mirror is tilted about the x-axis. In some embodiments, adjustable mirror is tilted with respect to the x-axis, the y-axis, and/or the z-axis.

Figure 5I:
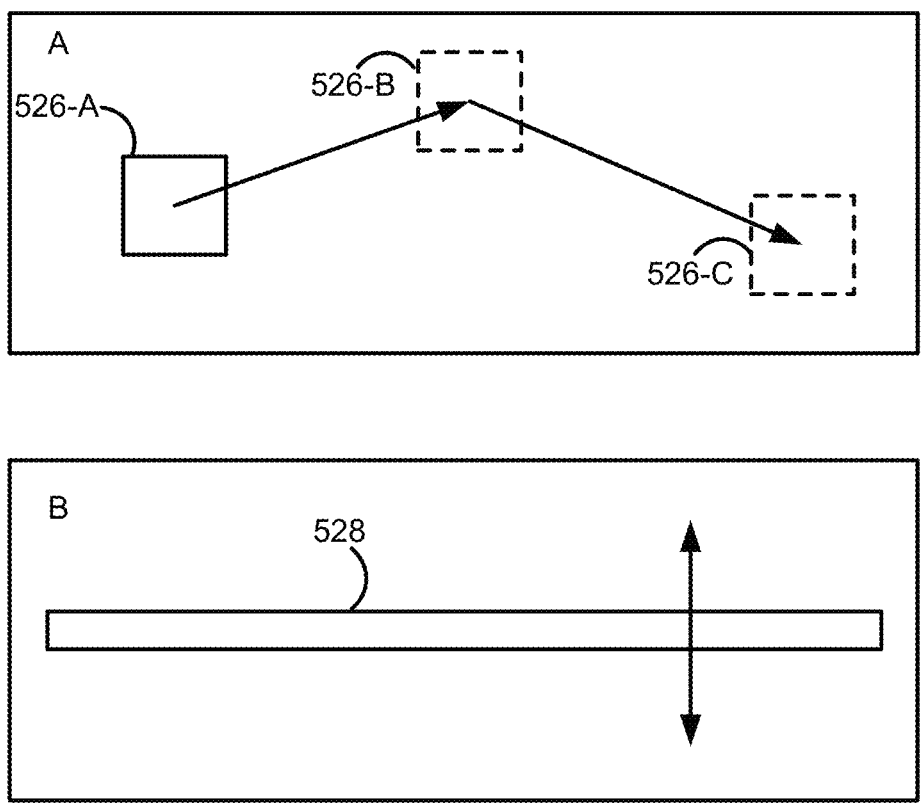
FIG. 5I is a schematic diagram illustrating changing of direction of projected light in accordance with some embodiments.

FIG. 5I is a schematic diagram illustrating changing of direction of projected light in accordance with some embodiments. The light projected by light projector (e.g., light 524-1 in FIG. 5G) has a cross-section characterized by two dimensions.

In some embodiments, the cross-section is symmetric with respect to the two dimensions (e.g., the cross-section is a square or a circle), as illustrated by cross-section 526-A in Section A of FIG. 5I. In some embodiments, the projected light is steered based on a position of a pupil (e.g., first pupil position 406-1 and second pupil position 406-2 in FIGS. 5G-5H) in two dimensions, as illustrated with cross-sections 526-B and 526-C.

In some embodiments, the cross-section has a longitudinal shape (e.g., a first dimension characterizing the cross-section, such as a length of the cross-section, is at least three times a second dimension characterizing the cross-section, such as a width of the cross-section), as illustrated with cross-section 528 shown in Section B of FIG. 5I. In some embodiments, the light is steered in only one dimension, as illustrated with an arrow in Section B.

In some embodiments, the direction of the light is changed by tilting adjustable mirror 516 of scanning reflector assembly 515 in one, two, or three dimensions, as described herein with respect to FIGS. 5F-5H.

In some embodiments, a direction of light projected by a light projector (e.g., light projector 402 described herein with respect to FIG. 4A) is changed by beam steerer 432 integrated with combiner 410 (e.g., FIG. 4C).

FIGS. 6A-6C and 7A-7B illustrate embodiments of flat combiners with beam steering features in accordance with some embodiments.

Figure 6A:
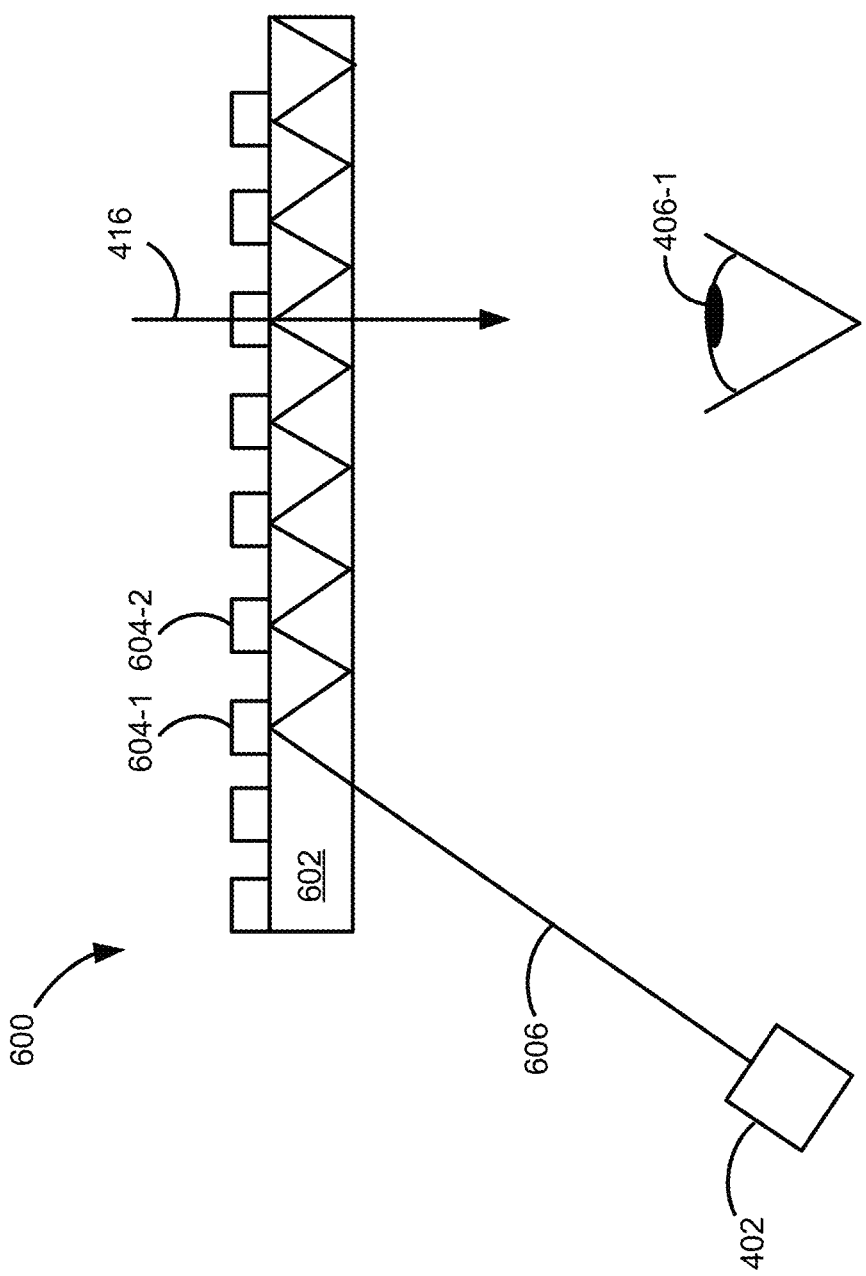
Figure 6B:
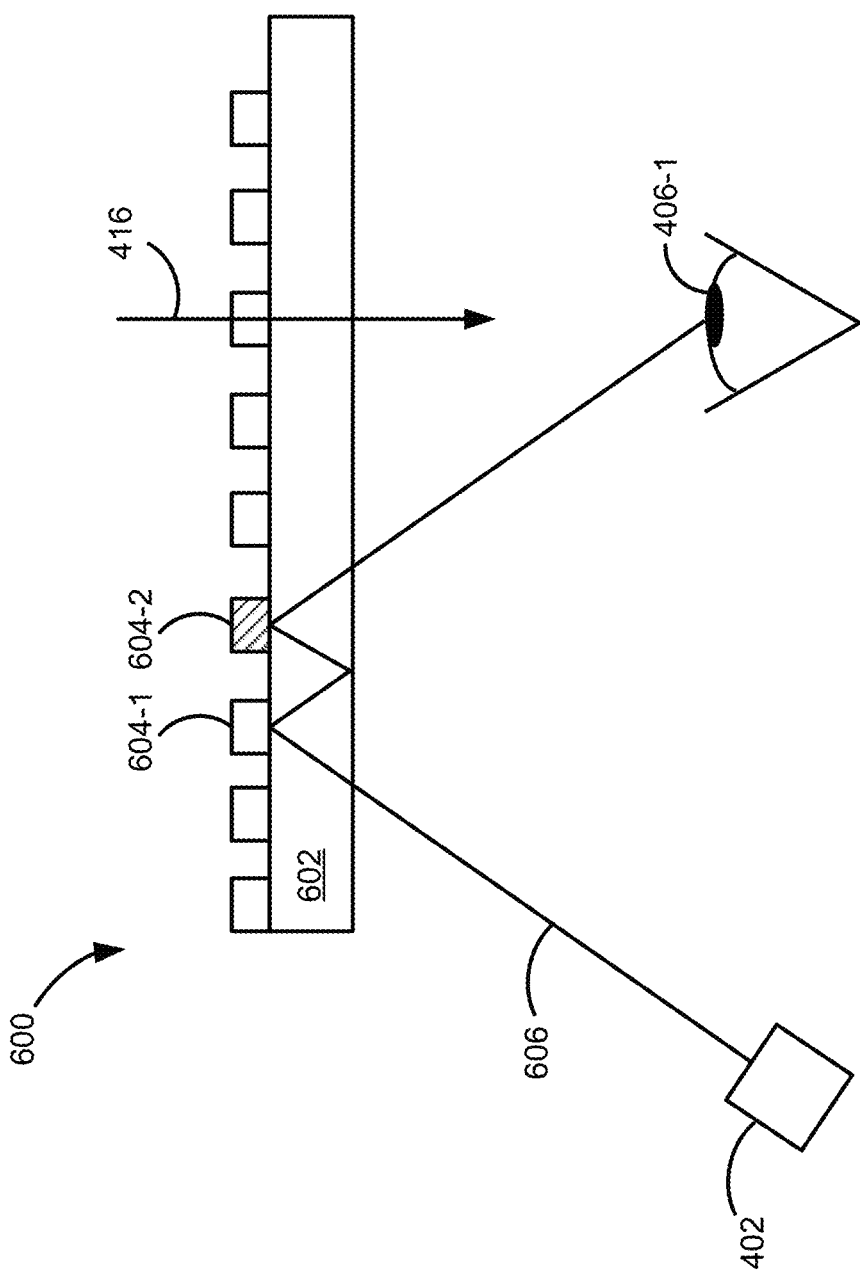

FIGS. 6A-6C are schematic diagrams illustrating tunable waveguide 600 in accordance with some embodiments. Tunable waveguide 600 includes optical waveguide 602 (e.g., a waveguide composed of a substrate of glass, fused silica or polycarbonate) configured to receive light (e.g., light 606) projected by light projector 402. In some embodiments, tunable waveguide 600 includes one or more gratings coupled with optical waveguide 602 to facilitate entry of light 606 into optical waveguide 602. The one or more gratings are omitted in FIGS. 6A-6C so as not to obscure other aspects of tunable waveguide 600.

In FIGS. 6A-6C, optical waveguide 602 is coupled with, or attached to, a plurality of tunable optical elements, such as tunable optical elements 604-1 and 604-2. In some embodiments, tunable optical elements 604-1 and 604-2 have electrically tunable optical properties. In some embodiments, tunable optical elements 604-1 and 604-2 include individually-addressable liquid crystal elements with electrically tunable indices of refraction. In some embodiments, individual adjustment of the index of refraction of tunable optical element 604-1 causes light transmitted through optical waveguide 602 to emit from optical waveguide 602 at a location corresponding to tunable optical element 604-1.

In FIG. 6A, tunable optical elements 604-1 and 604-2 are under a first operating condition (e.g., both tunable optical elements 604-1 and 604-2 are in a non-activated condition, such as no electric field is applied to tunable optical elements 604-1 and 604-2). For example, in FIG. 6A both tunable optical elements 604-1 and 604-2 have a first index of refraction.

In FIG. 6A, the characteristics of light 606 are such that light 606 propagates along optical waveguide 602 based on total internal reflection (TIR) (while tunable optical elements 604-1 and 604-2 remain in the first operating condition).

In FIG. 6A, light 606 continues to propagate through optical waveguide 602, and light 606 is not emitted toward pupil 406 at first pupil position 406-1.

In FIG. 6B, tunable optical elements 604-1 and 604-2 are under a second operating condition so that tunable optical element 604-2 is electrically tuned to have a second index of refraction, distinct from the first index of refraction while tunable optical element 604-1 continues to have the first index of refraction. After light 606 propagates to a region of optical waveguide 602 adjacent to tunable optical element 604-1, light 606 continues to propagate along optical waveguide 602. However, after light 606 propagates to a region of optical waveguide 602 adjacent to tunable optical element 604-2, light 606 is emitted (e.g., escapes) from optical waveguide 602 toward pupil 406 at first pupil position 406-1.

In FIG. 6C, pupil 406 has moved to second pupil position 406-2. In FIG. 6C, tunable optical elements 604-1 and 604-2 are under a third operating condition so that tunable optical element 604-1 is electrically tuned to have the second index of refraction (and tunable optical element 604-2 may have the first index of refraction as shown in FIG. 6C or the second index of refraction). After light 606 propagates to a region of optical waveguide 602 adjacent to tunable optical element 604-1, light 606 is emitted (e.g., escapes) from optical waveguide 602 toward pupil 406 at second pupil position 406-2.

Figure 7A:
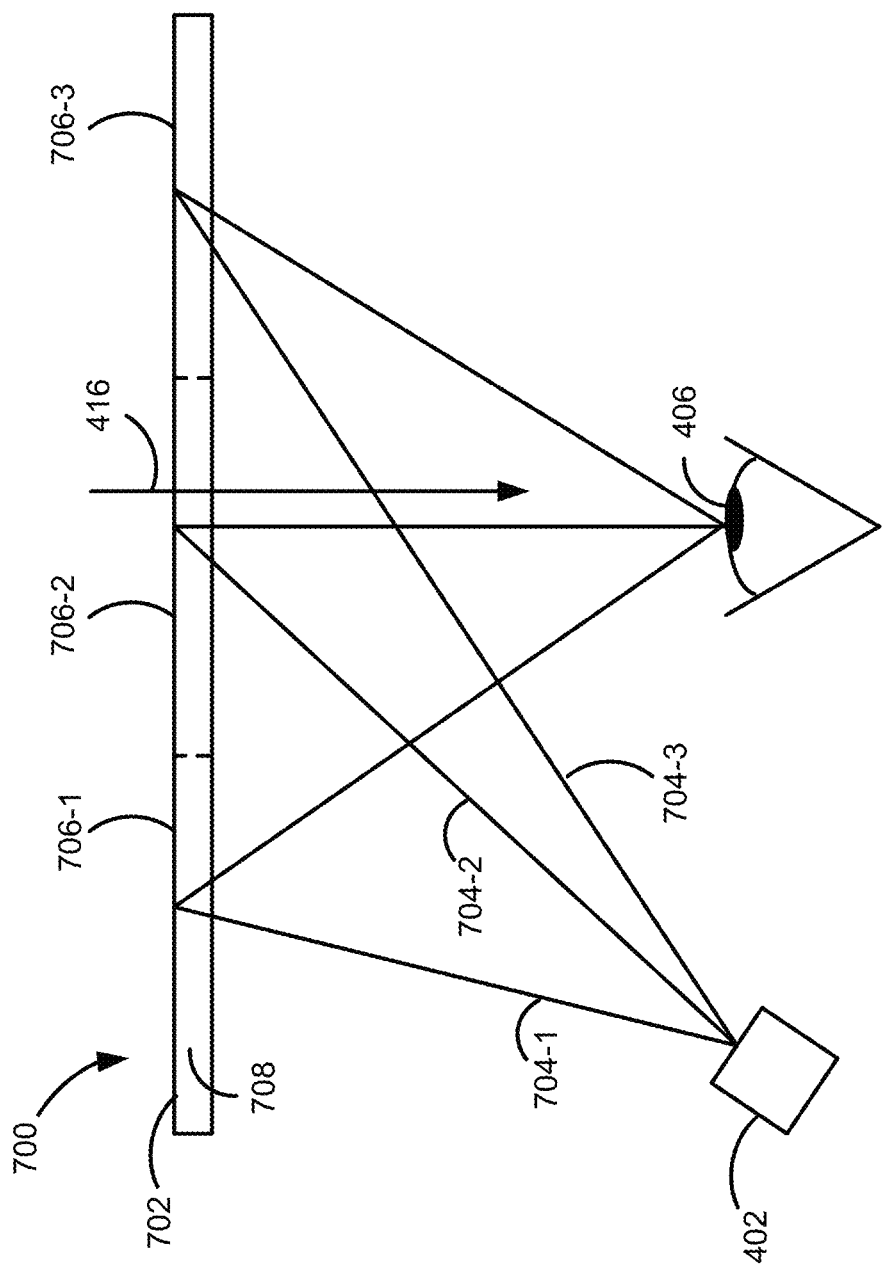
FIG. 7A is a schematic diagram illustrating a holographic combiner in accordance with some embodiments.

FIG. 7A is a schematic diagram illustrating holographic combiner 700 in accordance with some embodiments. Holographic combiner 700 includes holographic optical element (HOE) 702. Holographic optical element 702 includes one or more holographic films (e.g., a holographic film of a photopolymer or an analog holographic film). In some embodiments, the one or more holographic films are located on substrate 708. Holographic optical element 702 includes a plurality of portions (e.g., portions 706-1, 706-2, and 706-3) configured to direct light in distinct directions. In some embodiments, the portions of holographic optical element 702 are configured to direct light in distinct directions (e.g., portion 706-1 of holographic optical element 702 is configured to direct light from light projector 402 into a first direction, portion 706-2 of holographic optical element 702 is configured to direct light from light projector 402 into a second direction that is distinct from the first direction, and portion 706-3 of holographic optical element 702 is configured to direct light from light projector 402 into a third direction that is distinct from the first direction and the second direction). In some embodiments, holographic optical element 702 acts as a non-spherical reflective surface (e.g., a parabolic reflective surface or an ellipsoidal reflective surface) where rays impinging on the different portions of holographic optical element 702 are directed toward a pupil (e.g., pupil 406). In FIG. 7A, ray 704-1 projected by light projector 402 impinges on portion 706-1, and portion 706-1 of holographic optical element 702 is configured so that ray 704-1 is directed toward pupil 406. Ray 704-2 projected by light projector 402 impinges on portion 706-2, and portion 706-2 of holographic element 702 is configured so that ray 704-2 is directed toward pupil 406. Ray 704-3 projected by light projector 402 impinges on portion 706-3, and portion 706-3 of holographic optical element 702 is configured so that ray 704-3 is directed toward pupil 406. In some embodiments, holographic optical element 702 is a dynamically adjustable holographic optical element.

Although FIG. 7A illustrates three portions 706-1, 706-2, and 706-3 of holographic optical element 702, in some embodiments, holographic optical element 702 is configured to have more than three distinct portions. In some embodiments, a holographic combiner includes a plurality of distinct and separate holographic optical elements (e.g., portions of the holographic optical element need not be continuous, in some embodiments).

Figure 7B:
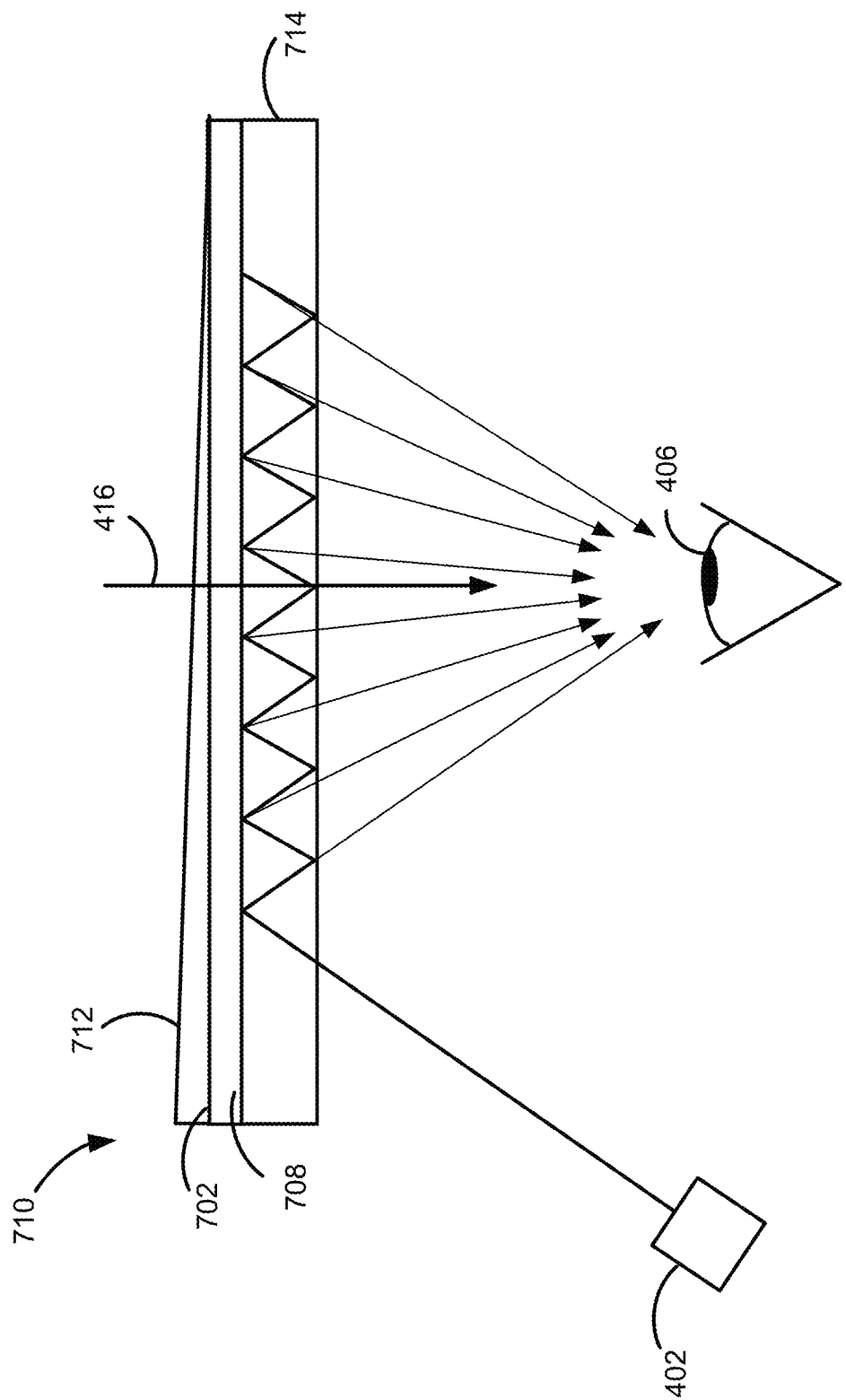
FIG. 7B is a schematic diagram illustrating a holographic combiner in accordance with some embodiments.

FIG. 7B is a schematic diagram illustrating holographic combiner 710 (also called a holographic waveguide combiner) in accordance with some embodiments. Holographic combiner 710 includes optical waveguide 714 adjacent to holographic optical element 702. Waveguide 714 is configured to receive light projected by light projector 402. In some embodiments, optical waveguide 714 corresponds to optical waveguide 602 described herein with respect to FIG. 6A. For example, in some embodiments, optical waveguide 714 is coupled with one or more gratings to facilitate entry of the light projected by light projector 402 into optical waveguide 714. The one or more gratings are omitted in FIG. 7B so as not to obscure other aspects of holographic combiner 710.

In some embodiments, holographic combiner 710 also includes one or more prisms (e.g., prism 712). Prism 712 is a tunable prism. In some embodiments, prism 712 is a tunable liquid prism. In some embodiments, prism 712 is a tunable liquid crystal prism. Tunable prism 712 is configured to dynamically steer light projected by light projector 402 (e.g., rays 704-1, 702-2, and 704-3) based on a position of pupil 406.

Figure 8:
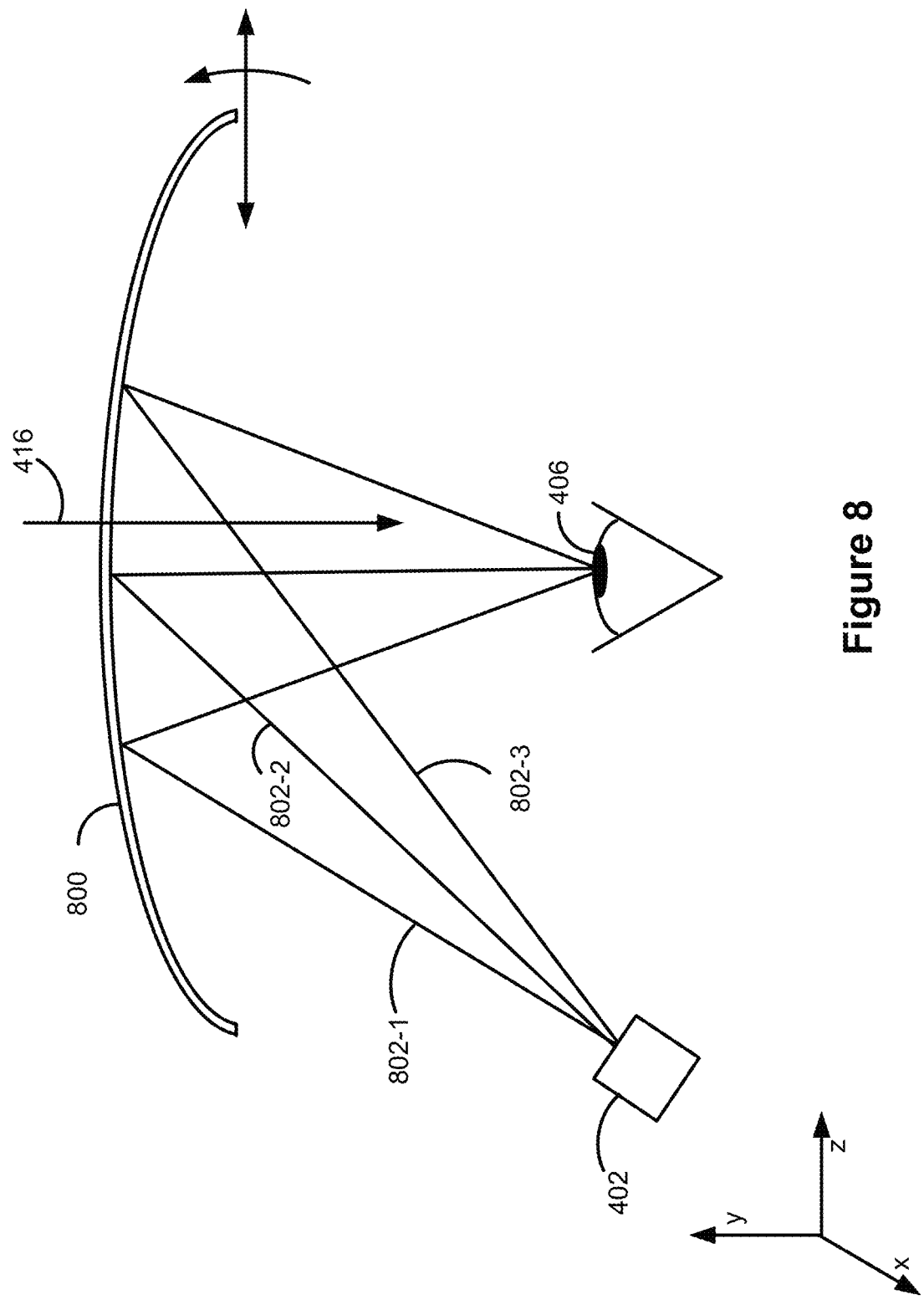
FIG. 8 is a schematic diagram illustrating a aspheric combiner in accordance with some embodiments.

FIG. 8 is a schematic diagram illustrating aspheric combiner 800 in accordance with some embodiments. Aspheric combiner 800 includes a partially reflective aspheric surface (e.g., a parabolic surface, an ellipsoidal surface, etc.) configured to receive rays 802-1, 802-2, and 802-3 projected by light projector 402 and reflect at least a portion of each ray toward pupil 406.

In some embodiments, the partially reflective aspheric surface is a wavelength-selective reflective surface (e.g., the partially reflective aspheric surface reflects a visible light of a first wavelength and transmits a visible light of a second wavelength that is distinct form the first wavelength). In some embodiments, the partially reflective aspheric surface includes wavelength-selective coatings, which are described herein with respect to FIG. 9A. In such embodiments, aspheric combiner 800 reflects light with distinct wavelengths (e.g., blue, green and/or red color) projected by light projector 402 while transmitting visible wavelengths that are distinct from the wavelengths of light projected by light projector 402.

In some embodiments, the partially reflective surface is a polarization dependent surface. Polarization dependent surfaces are described herein with respect to FIG. 10A. In such embodiments, aspheric combiner 800 reflects light with a particular polarization (e.g., linearly polarized light) projected by light projector 402 while transmitting light having a distinct polarization (e.g., circularly polarized light). In some embodiments, aspheric combiner 800 is mechanically coupled with an actuator for changing the position and/or orientation of the aspheric combiner in order to change the direction of rays 802-1, 802-2, and 802-3 based on a position of pupil 406. For example, the position of aspheric combiner 800 is moved in the z-direction and/or the orientation of aspheric combiner 800 changed by tilting aspheric combiner 800 with respect to the x-axis.

Figure 9A:
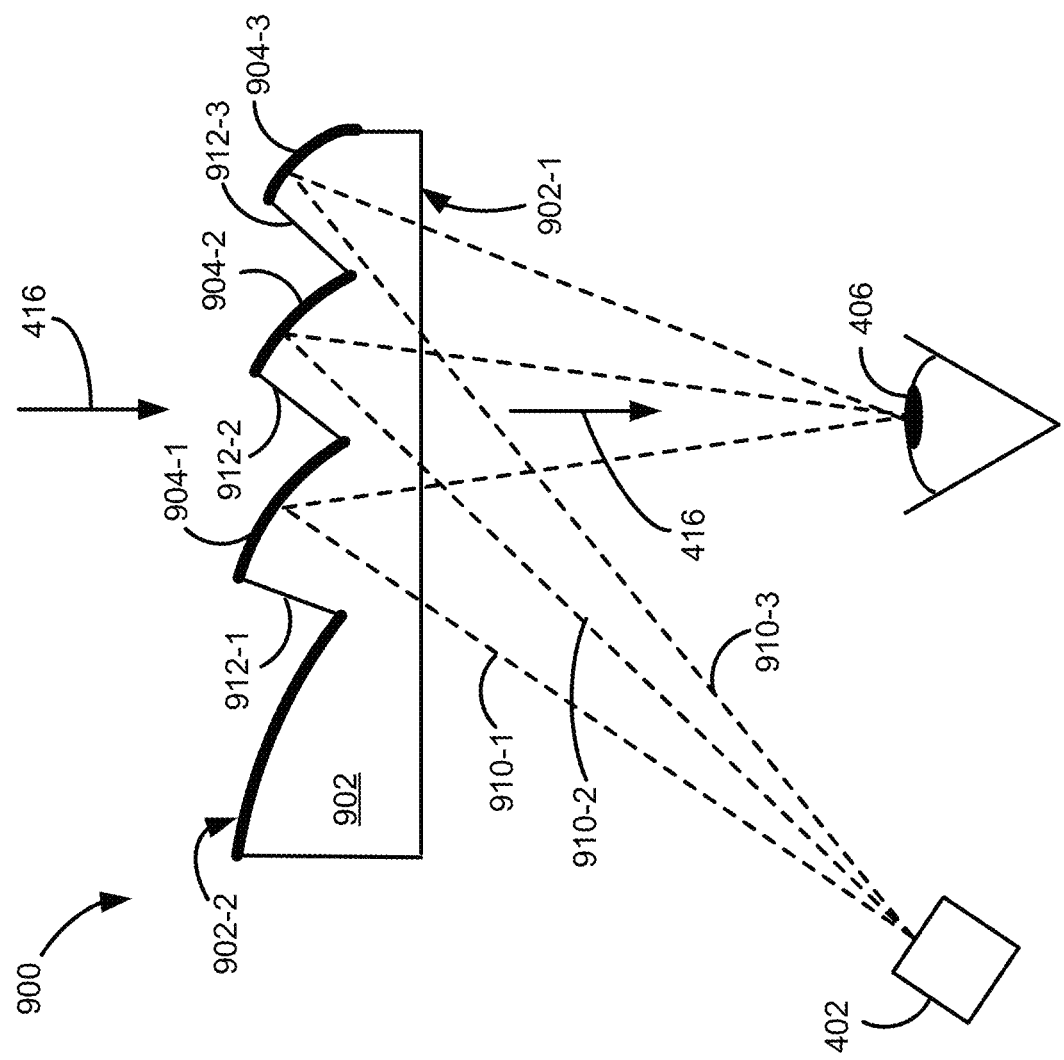
FIG. 9A is a schematic diagram illustrating a Fresnel combiner in accordance with some embodiments.

FIG. 9A is a schematic diagram illustrating Fresnel combiner 900 in accordance with some embodiments. In some embodiments, Fresnel combiner 900 is an example of combiner 410 described herein with respect to FIG. 4A. Fresnel combiner 900 is configured to combine light (e.g., light 416) transmitted through combiner 900 from the outside of a head-mounted display device with light (e.g., rays 910-1, 910-2 and 910-3) projected by light projector 402. In some embodiments, light projector 402 projects light with a distinct set of characteristics (e.g., light with a distinct polarization and wavelengths). In some embodiments, light projector 402 is configured to output two or more rays with distinct characteristics. For example, light projector 402 projects two or more light rays with distinct colors (e.g., red, green, blue, infrared, etc.) and/or with distinct polarizations (e.g., a right hand polarization, a left hand polarization, a horizontal polarization, a vertical polarization, etc.). In some embodiments, light projector 402 includes or is optically coupled with one or more lenses 412 and/or beam steerer 404 described herein with respect to FIG. 4A.

Fresnel combiner 900 includes substrate 902 with surface 902-1 facing pupil 406 and surface 902-2 opposite to surface 902-1. In some embodiments, surface 902-1 is a smooth surface and surface 902-2 includes a plurality of Fresnel structures defined by a plurality of draft facets (e.g., draft facets 912-1, 912-2, and 912-3) and a plurality of slope facets (e.g., slope facets 904-1, 904-2, and 904-3). Draft facets 912-1, 912-2, and 912-3 are characterized by representative draft angles (e.g., the draft facet is tilted by a respective representative draft angle from a reference axis). In some embodiments, draft facets 912-1, 912-2, and 912-3 are flat surfaces. In some embodiments, draft facets 912-1, 912-2, and 912-3 are curved surfaces, and the representative draft angle is an average draft angle for the draft facet. In some embodiments, slope facets 904-1, 904-2, and 904-3 are characterized by representative slope angles (e.g., the slope facet is tilted by a respective representative slope angle from the reference axis). In some embodiments, slope facets 904-1, 904-2, and 904-3 are flat surfaces. In some embodiments, slope facets 904-1, 904-2, and 904-3 are curved surfaces, and the representative slope angle is an average slope angle for the slope facet. In some embodiments, the shape of slope facets 904-1, 904-2, and 904-3 is curved so that slope facets 904-1, 904-2, and 904-3 correspond to segments of an aspheric surface (e.g., an ellipsoidal surface or a parabolic surface).

Substrate 902 is made of an optically transparent material (e.g., glass or plastic). In some embodiments, at least a portion of surface 902-2 includes a reflective coating. In some embodiments, at least a portion of surface 902-2 includes a semi-transparent optical coating that reflects light (e.g., rays 910-1, 910-2, and 910-3) projected by light projector 402 while transmitting light (e.g., ambient light) from opposite side of combiner 900 (e.g., light 416). In some embodiments, slope facets 904-1, 904-2, and 904-3 include a reflective optical coating while draft facets 912-1, 912-2, and 912-3 do not include a reflective coating. In some embodiments, one or more slope facets do not have a reflective coating (e.g., light impinging on such slope facets are reflected by total internal reflection).

In some embodiments, the reflective coating is a wavelength-selective optical coating. In some embodiments, slope facet 904-1 has a wavelength-selective optical coating that reflects light with a specific wavelength while transmitting light with other wavelengths. For example, slope facet 904-1 has a wavelength-selective optical coating that reflects red light with wavelength ranging from 625 nm to 675 nm while transmitting light outside of this range. The properties of the wavelength-selective coating are configured in accordance with the characteristics of light projected by light projector 402 (e.g., rays 910-1, 910-2, and 910-3). For example, in a configuration where light projector 402 includes a narrow-bandgap light emitter (e.g., a laser or a superluminescent diode (SLD)), the reflective coating of slope facet 904-1 is configured to reflect light with a narrow wavelength range (e.g., a wavelength range of 10 nm). If light projector 402 includes an LED, the reflective coating of slope facet 904-1 is configured to reflect light with a wider wavelength range (e.g., a wavelength range of 50 nm). In some embodiments, slope facets 904-1, 904-2, and 904-3 include a same wavelength-selective optical coating. In some embodiments, slope facet 904-1 has a wavelength-selective optical coating that is distinct from optical coatings of slope facets 904-2 or 904-3. For example, slope facet 904-1 has a wavelength-selective optical coating that reflects red light (e.g., light with wavelength 625-675 nm) and slope facet 904-2 has a wavelength-selective optical coating that reflects green light (e.g., light with wavelength 495-545 nm).

In some embodiments, the optical coatings of slope facets 904-1, 904-2, and 904-3 are polarization-selective optical coatings. For example, slope facet 904-1 has a coating that reflects light with a horizontal polarization while transmitting through light with any other polarization and slope facet 904-2 has a coating that reflects light with a vertical polarization while transmitting through light with any other polarization.

In FIG. 9A, light 416 from the outside of a head-mounted display device is transmitted through Fresnel combiner 900 toward pupil 406. In some embodiments, light 416 is refracted at surfaces 902-2 and 902-1. In some embodiments, Fresnel combiner 900 is optically coupled with other optical elements (e.g., one or more prisms) that are configured to steer light 416 and/or rays 910-1, 910-2, and 910-3 (e.g., to compensate for the refraction of light 416 at surfaces 902-2 and/or 902-1).

Figure 9B:
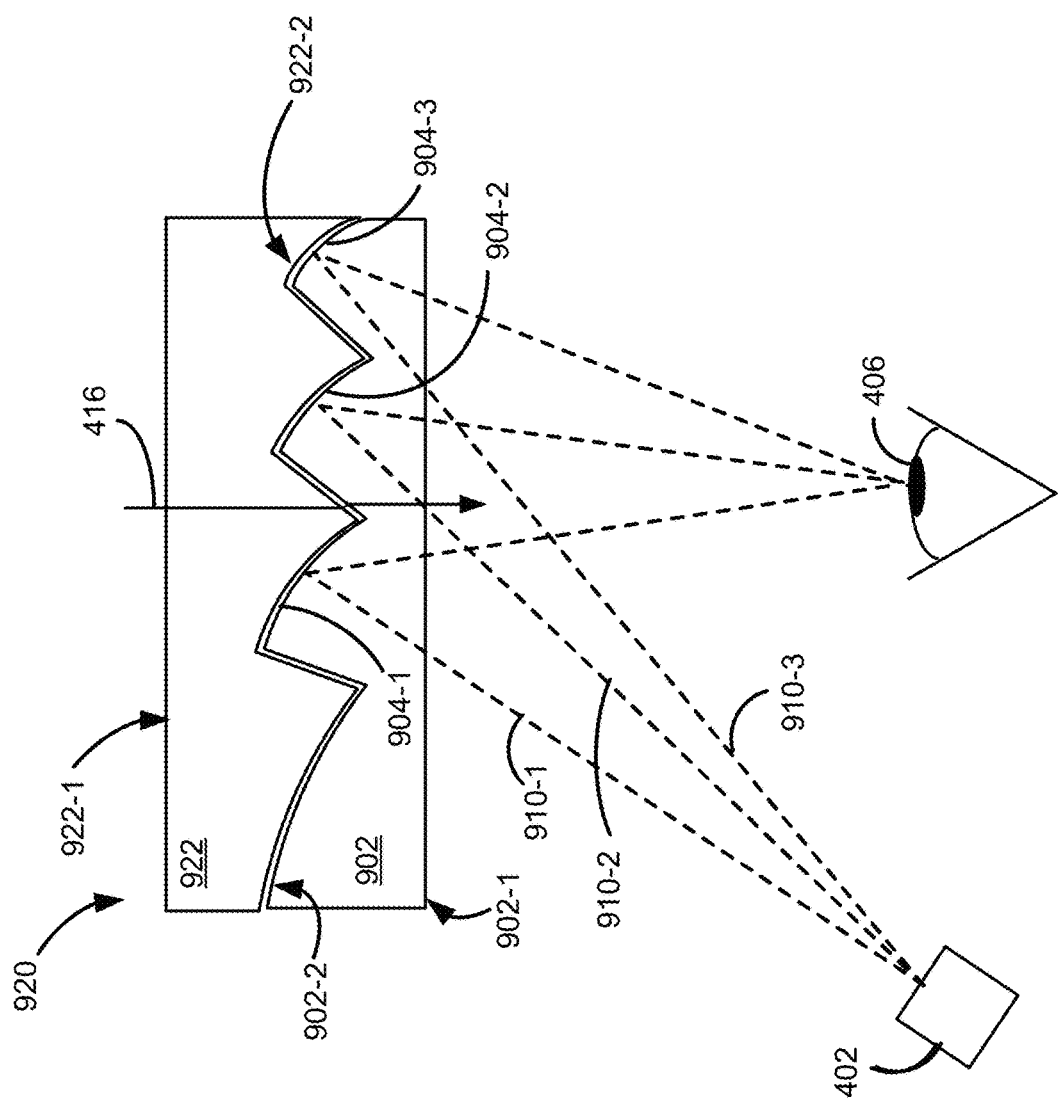
FIG. 9B is a schematic diagram illustrating a Fresnel combiner in accordance with some embodiments.

FIG. 9B is a schematic diagram illustrating Fresnel combiner 920 in accordance with some embodiments. Fresnel combiner 920 includes substrate 902 coupled with substrate 922. Substrate 922 includes surfaces 922-1 and 922-2. In some embodiments, surface 922-1 corresponds to surface 902-1 of substrate 902 (e.g., surface 922-1 is a smooth and flat surface). Surface 922-2 is configured to be an inverse replicate of surface 902-1, thereby including a plurality of Fresnel structures. Substrate 922 has an index of refraction corresponding to the index of refraction of substrate 902. In some embodiments, substrate 922 is made of the same optically transparent material as substrate 902. Substrate 902 and 922 are positioned so that there is a narrow space between substrates 902 and 922 defined by respective surfaces 902-2 and 922-2.

In some embodiments, slope facets 904-1, 904-2, and 904-3 of substrate 902 include wavelength-selective or polarization-selective coatings, as described herein with respect to FIG. 9A. In such embodiments, rays 910-1, 910-2, and 910-3 respectively corresponding to the characteristics of the coatings of slope facets 904-1, 904-2, and 904-3 are reflected on the slope facets of surface 902-2, and transmitted toward pupil 406, similarly as illustrated in FIG. 9A. However, in case of Fresnel combiner 920 with two mating substrates 902 and 922, light 416 is transmitted through Fresnel combiner 920 with only a slight shift as refraction of light 416 on surface 922-2 is compensated by refraction of light 416 on surface 902-2.

Figure 9C:
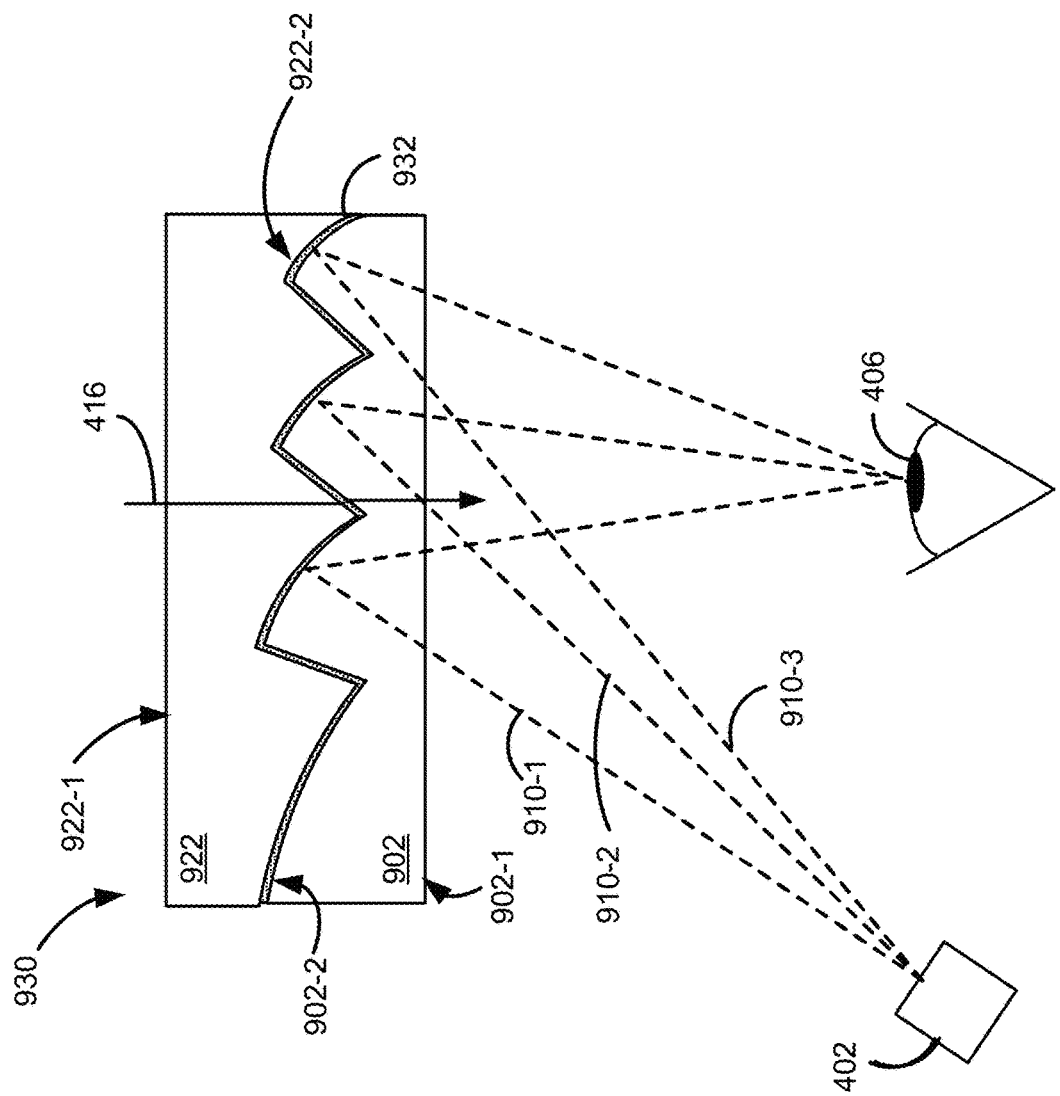
FIG. 9C is a schematic diagram illustrating a Fresnel combiner in accordance with some embodiments.

FIG. 9C is a schematic diagram illustrating Fresnel combiner 930 in accordance with some embodiments. Fresnel combiner 930 corresponds to Fresnel combiner 920 described herein with respect to FIG. 9B except that in Fresnel combiner 930 the space defined by surface 902-2 and surface 922-2 is filled with material 932. Material 932 is composed of an optically transparent material. In some embodiments, material 932 has an index of refraction similar to an index of refraction of a material used for substrates 902 and 922. In some embodiments, material 932 has an index of refraction similar to an index of refraction of air.

Figure 9D:
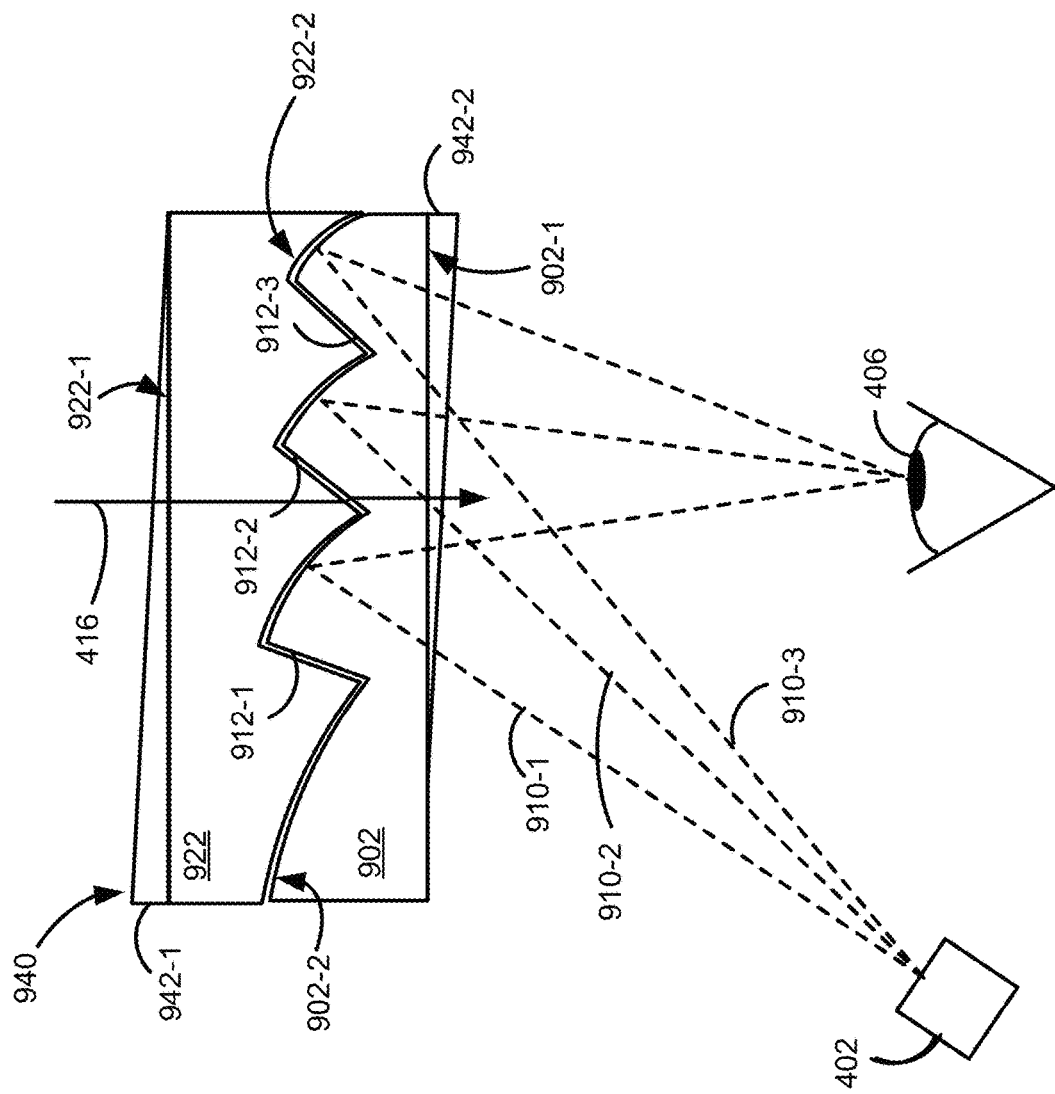
FIG. 9D is a schematic diagram illustrating a Fresnel combiner in accordance with some embodiments.

FIG. 9D is a schematic diagram illustrating Fresnel combiner 940 in accordance with some embodiments. Fresnel combiner 940 corresponds to Fresnel combiner 920 described herein with respect to FIG. 9B or Fresnel combiner 930 described herein with respect to FIG. 9C except that Fresnel combiner 940 additionally includes one or more optical elements optically coupled with surface 922-1 and/or surface 922-2. Such optical elements further steer light 416 and/or rays 910-1, 910-2, and 910-3, and can be used to change the direction of the rays in accordance with rotation of the eye.

In FIG. 9D, Fresnel combiner 940 includes elements 942-1 and 942-2 that are prisms. Element 942-1 is optically coupled with surface 922-1. In some embodiments, element 942-1 is located adjacent to surface 922-1. In some embodiments, element 942-1 is separated from optical surface 922-1. Optical element 942-2 is optically coupled with surface 902-1. In some embodiments, element 942-1 is located adjacent to surface 902-1. In some embodiments, element 942-1 is separated from optical surface 902-1. In some embodiments, elements 942-1 and 942-2 are prisms made of an optically transparent material (e.g., glass or plastic) (e.g., transparent to visible light). In some embodiments, elements 942-1 and 942-2 are liquid prims or liquid crystal prisms. In some embodiments, elements 942-1 and 942-2 are adaptive optical elements, such as adaptive liquid prims or adaptive liquid crystal prisms. In some embodiments, elements 942-1 and 942-2 include one or more lenses, one or more diffraction gratings, one or more array of prims or any combination thereof. In some embodiments, optical elements 942-1 and 942-2 further include coatings, such as wavelength-selective and/or polarization-selective coatings.

Figure 9E:
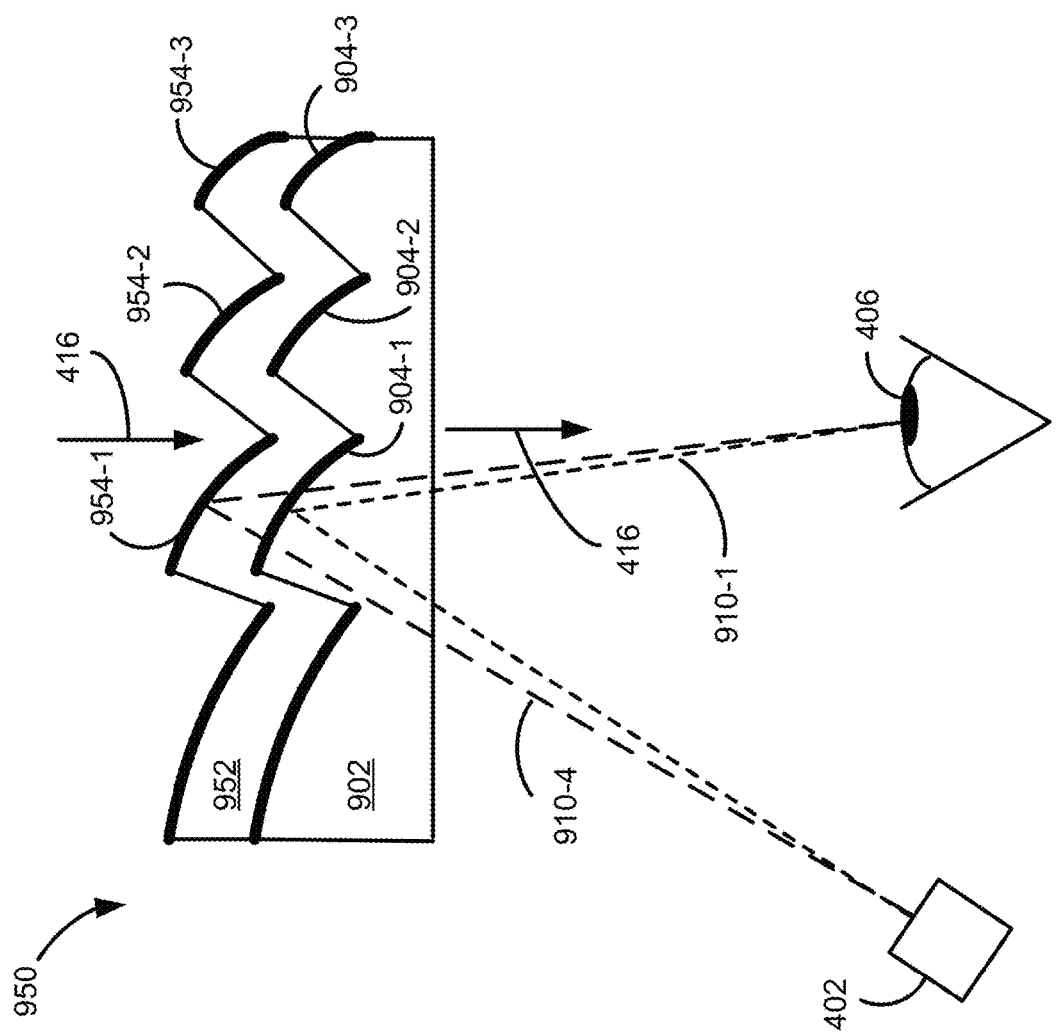
FIG. 9E is a schematic diagram illustrating a Fresnel combiner in accordance with some embodiments.

FIG. 9E is a schematic diagram illustrating Fresnel combiner 950 in accordance with some embodiments. Fresnel combiner 950 includes substrate 902 and substrate 952. Substrate 952 is similar to substrate 902 except substrate 952 includes slope facets 954-1, 954-2, and 954-3 with optical coatings distinct from the optical coatings of slope facets 904-1, 904-2, and 904-3. For example, slope facets 952-1, 954-2, and 954-3 reflect light with distinct characteristics (e.g., color) from light reflected by slope facets 904-1, 904-2, and 904-3. In some embodiments, slope facets 904-1, 904-2, and 904-3 include a wavelength-selective coating reflecting a first wavelength (e.g., ray 910-1) while slope facets 954-1, 954-2, and 954-3 include a wavelength-selective coating reflecting a second wavelength (e.g., ray 910-4). For example, slope facets 904-1, 904-2, and 904-3 reflect green light while transmitting all other wavelengths and slope facets 954-1, 954-2, and 954-3 reflect red light (and in some cases, transmit all other wavelength). In some embodiments, slope facets 904-1, 904-2, and 904-3 include a polarization-selective coating reflecting light with a first polarization while slope facets 954-1, 954-2, and 954-3 include a polarization coating reflecting light with a second polarization (e.g., a polarization-selective coating for reflecting light with the second polarization). For example, slope facets 904-1, 904-2, and 904-3 reflect light with a horizontal polarization while transmitting light having a different polarization and slope facets 954-1, 954-2, and 954-3 reflect light with a vertical polarization while transmitting light having any other polarization.

In FIG. 9E, substrate 952 is optically coupled with substrate 902 so that they have the same optical axis. In some embodiments, substrate 952 is adjacent to substrate 902. In some embodiments, substrates 952 and 902 are configured differently (e.g., substrates 952 have Fresnel structures that are different from Fresnel structures of substrate 902 so that they have different focal lengths). In some embodiment, substrates 952 and 902 form a single contiguous substrate so that substrate 952 and 902 are distinct portions of a single contiguous Fresnel combiner. In some embodiments, Fresnel combiner 950 includes three or more substrates optically coupled with each other for combining light with distinct characteristics with ambient light. In some embodiments, substrate 952 is mechanically coupled with substrate 902.

Figure 10A:
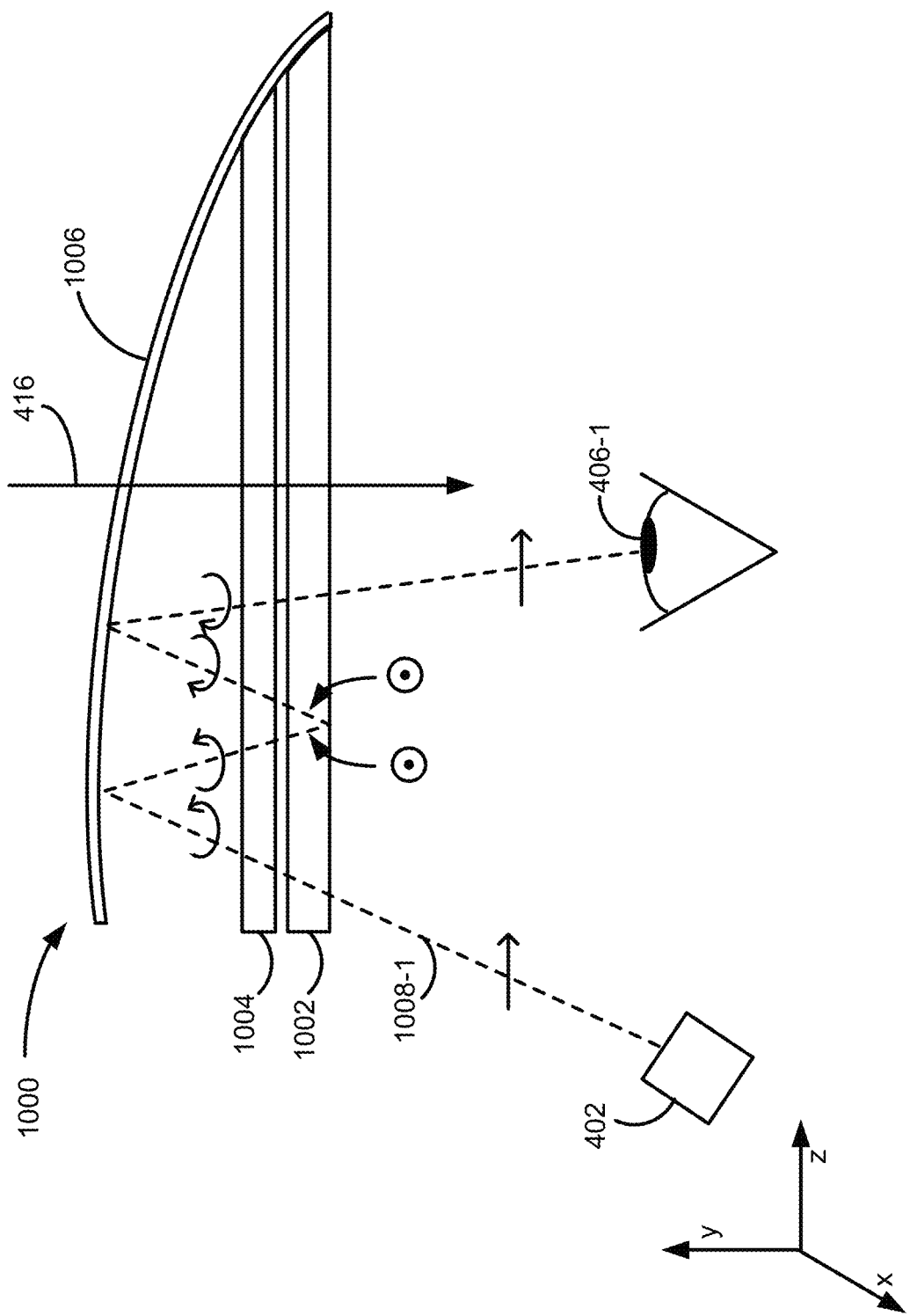
FIGS. 10A and 10B are schematic diagrams illustrating a pancake combiner in accordance with some embodiments.

FIG. 10A is a schematic diagram illustrating pancake combiner 1000 in accordance with some embodiments. In some embodiments, pancake combiner 1000 is an example of combiner 410 described herein with respect to FIG. 4A. Pancake combiner 1000 is configured to combine light (e.g., light 416) transmitted through combiner 1000 from the outside of a head-mounted display device with light (e.g., ray 1008-1) projected by light projector 402. Pancake combiner 100 is also configured to direct ray 1008-1 projected by light projector 402 toward an eye of a user (e.g., pupil 406). In FIG. 10A, pupil 406 is located at first pupil position 406-1.

In some embodiments, light projector 402 is an example of light projector 402 described herein with respect to FIG. 4A. In some embodiments, light projector 402 projects polarized light. In some embodiments, light projector 402 includes one or more light sources that emit linearly polarized light (e.g., a laser, or an LED). In some embodiments, light projector 402 includes one or more light sources emitting light with mixed polarization, and the one or more light sources are optically coupled with a polarizer. In FIG. 10A, ray 1008-1 projected by light projector 402 has a linear polarization. In some other embodiments, ray 1008-1 has a circular polarization. In some embodiments, light projector 402 is configured to emit light with distinct wavelengths. In some embodiments, light projector 402 projects light rays with blue, green and/or red color.

In FIG. 10A, light projector 402 is positioned away from an optical axis of pancake combiner 1000 and away from a path of light (e.g., light 416) transmitted through pancake combiner from the outside of a head-mounted display. For example, light projector 402 is positioned on a temple of a head-mounted display device. In some embodiments, light projector 402 includes or is optically coupled with one or more lenses 412 and/or beam steerer 404 described herein with respect to FIG. 4A. One or more lenses 412 and beam steerer 404 are not shown in FIG. 10A so as not to obscure other aspects of pancake combiner 1000.

Pancake combiner 1000 includes partial reflector 1002, polarizer 1004 and partial reflector 1006. The configuration of these optical components illustrated in FIG. 10A provides a folded optical path for ray 1008-1, thereby allowing a smaller (e.g., thinner) combiner.

Partial reflector 1002 transmits at least a portion of ray 1008-1 projected by light projector 402. In some embodiments, partial reflector 1002 is a polarization dependent reflector that transmits light with a specific polarization (e.g., a particular linear polarization). In some embodiments, partial reflector 1002 reflects light with any other polarization. In FIG. 10A, partial reflector 1002 transmits ray 1008-1 with a first linear polarization, while reflecting light with a second linear polarization (e.g., perpendicular to the first linear polarization). After ray 1008-1 is transmitted through partial reflector 1002, ray 1008-1 is received by polarizer 1004, which converts the polarization of ray 1008-1 from the first linear polarization to a right-handed circular polarization. In some embodiments, polarizer 1004 is a quarter-wave plate.

Ray 1008-1 is subsequently reflected by partial reflector 1006. In some embodiments, partial reflector 1006 is a wavelength-selective mirror reflecting light with one or more specific wavelengths while transmitting light with some other wavelengths. Wavelength-selective optical coatings are described herein with respect to FIG. 9A. In FIG. 10A, partial reflector 1006 is a wavelength-selective optical mirror configured to reflect light with green color while transmitting through light with other colors, ray 1008-1 includes green light. In some embodiments, ray 1008-1 includes blue, green, and red light, and partial reflector 1006 is a wavelength-selective optical mirror reflecting blue, green, and red light while transmitting light with other colors. When partial reflector 1006 reflects ray 1008-1, the circular polarization shifts from a right-handed circular polarization to a left-handed circular polarization. Ray 1008-1 reflected by partial reflector 1006 is received, for a second time, by polarizer 1004, which converts ray 1008-1 to light with the second linear polarization.

Ray 1008-1 with the second linear polarization is reflected by polarization dependent partial reflector 1002. Ray 1008-1 reflected by partial reflector 1002 is received, for the third time, by polarizer 1004, which converts ray 1008-1 to a light with a left-handed circular polarization.

Ray 1008-1 is reflected, for the second time, by partial reflector 1006, and ray 1008-1 with a right-handed circular polarization is received, for the fourth time, by polarizer 1004. Polarizer 1004 converts ray 1008-1 with the circular polarization to a light with the first linear polarization. Ray 1008-1 with the first linear polarization is transmitted through partial reflector 1002 toward pupil 406.

In some embodiments, partial reflector 1002 is, in addition to being polarization dependent, also wavelength-selective, so that partial reflector 1002 only reflects light with wavelengths included in ray 1008-1 (e.g., blue, green, and/or red color) while transmitting light with other wavelengths. Such wavelength-selective feature allows a greater amount of light from the outside of the display device (e.g., light 416) to be transmitted through toward pupil 406. In some embodiments, partial reflector 1002 is polarization-independent and/or wavelength-independent. In some embodiments, partial reflector 1002 is configured to transmit a portion of impinging light and reflect a portion of the impinging light. For example, partial reflector 1002 is a 50/50 mirror transmitting 50% and reflecting 50% of incident light (although a partial reflector having a different reflectance can be used, such as a 60/40 mirror, a 70/30 mirror, etc.). In some embodiments, partial reflector 1006 is polarization-independent and/or wavelength-independent. In some embodiments, partial reflector 1006 is configured to transmit a portion of impinging light and reflect a portion of the impinging light. For example, partial reflector 1006 is a 50/50 mirror transmitting 50% and reflecting 50% of incident light (although a partial reflector having a different reflectance can be used, such as a 60/40 mirror, a 70/30 mirror, etc.). In some embodiments, partial reflector 1006 is a polarization dependent mirror.

In FIG. 10A, partial reflector 1006 is a parabolic partial mirror configured to direct light projected by light projector 402 at a range of angles toward pupil 406. By adjusting the position and/or orientation of partial reflector 1006, the direction of ray 1008-1 emerging from pancake combiner 1000 is changed. In FIG. 10A, pupil 406 is located at first pupil position 406-1 and ray 1008-1 is directed toward pupil 406 at first pupil position 406-1.

Figure 10B:
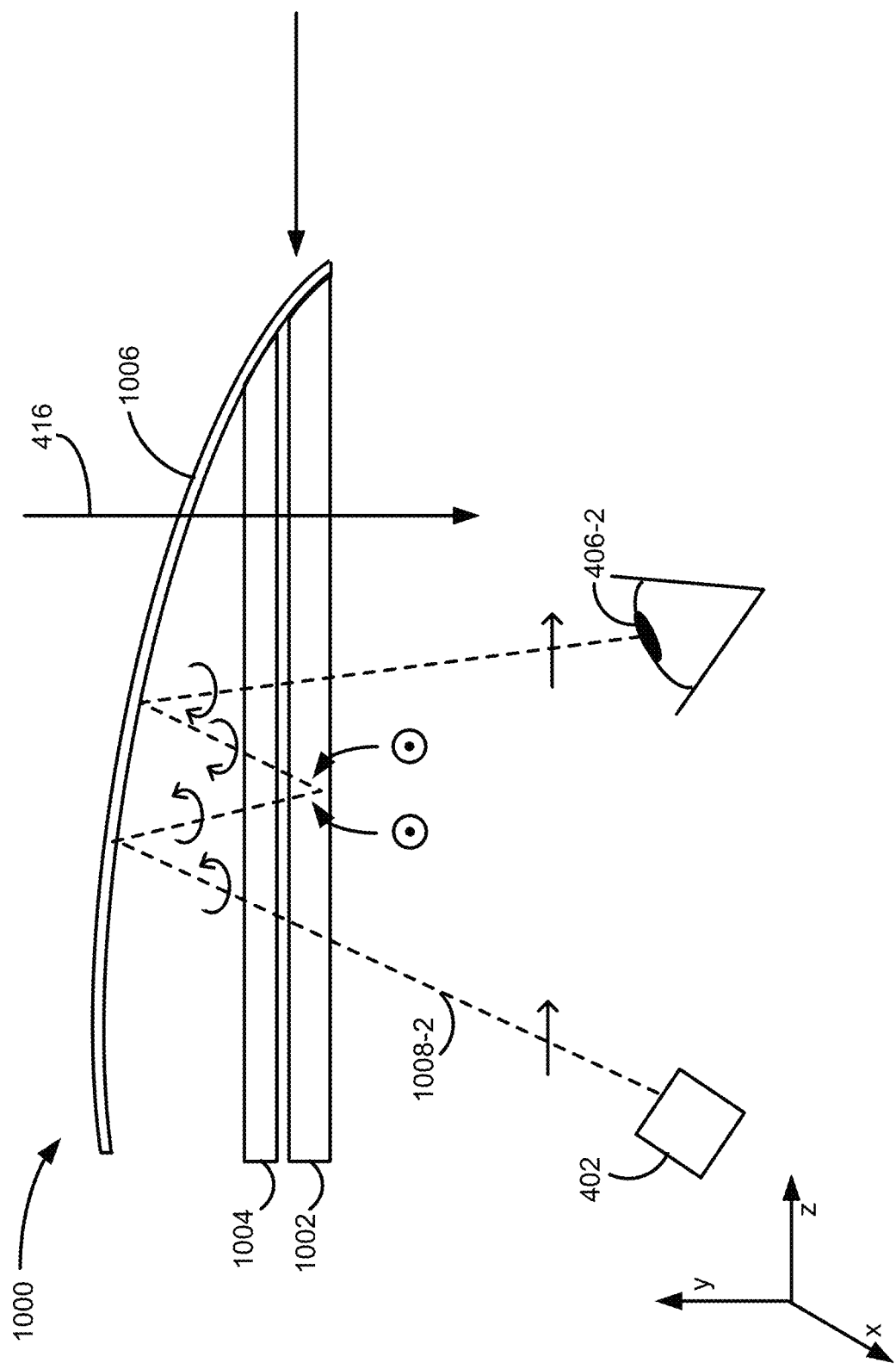

In FIG. 10B, pupil 406 has moved to second pupil position 406-2. Based on the position of pupil 406, a head-mounted display shifts pancake combiner 1000 (e.g., in the z-direction) so that ray 1008-2 is directed toward pupil 406 at second pupil position 406-2. The direction of the movement and the distance of the movement are determined in accordance with a position of pupil 406. In some embodiments, the orientation of pancake combiner 1000 is adjusted to change the direction of ray 1008-2 emerging from pancake combiner 1000. For example, the orientation of pancake combiner 1000 is adjusted by tilting pancake combiner 1000 with respect to a plane defined by pupil 406. In some embodiments, partial reflector 1006 has a curved shape other than a parabolic shape.

FIGS. 11A-11I illustrate methods and devices for eye tracking used in head-mounted display devices in accordance with some embodiments. Eye trackers illustrated in FIGS. 11A-11I are examples of eye tracker 408 described herein with respect to FIG. 4A. The eye trackers are configured to determine a position of pupil 406 of eye 1100 (e.g., eye 1100 is an eye of a wearer of a head-mounted display device) and/or track movement of pupil 406 as eye 1100 rotates to different gaze directions. In some embodiments, eye tracker 408 corresponds to, is coupled with, or is included in eye tracking module 217 described herein with respect to FIG. 2.

Figure 11A:
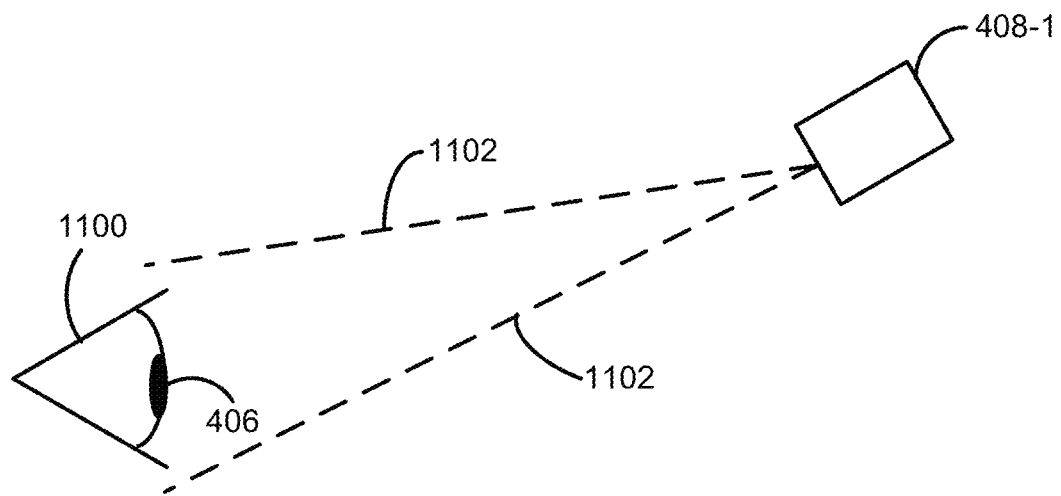
FIG. 11A is a schematic diagram illustrating detecting a position of a pupil by imaging in accordance with some embodiments.

FIG. 11A is a schematic diagram illustrating detecting a position of a pupil by imaging in accordance with some embodiments. In FIG. 11A, eye tracker 408-1 includes a camera (e.g., a still camera or a video camera) that captures an image of an area surrounding pupil 406 (e.g., the area of eye 1100 of a wearer of a head-mounted display device). In some embodiments, eye tracker 408-1 includes a telecentric camera. In FIG. 11A, reference lines 1102 define an area (or a cone) imaged by eye tracker 408-1. The position of pupil 406 is determined from the captured image by determining positions of components of an eye (e.g., the sclera, the iris, and/or the pupil of the eye) by image processing algorithms. In some embodiments, eye tracker 408-1 includes a light source for illumination of the imaged area. In some embodiments, the light source emits infrared (IR) or near-infrared (NIR) and the camera captures an IR image or a NIR image of the eye.

Figure 11B:
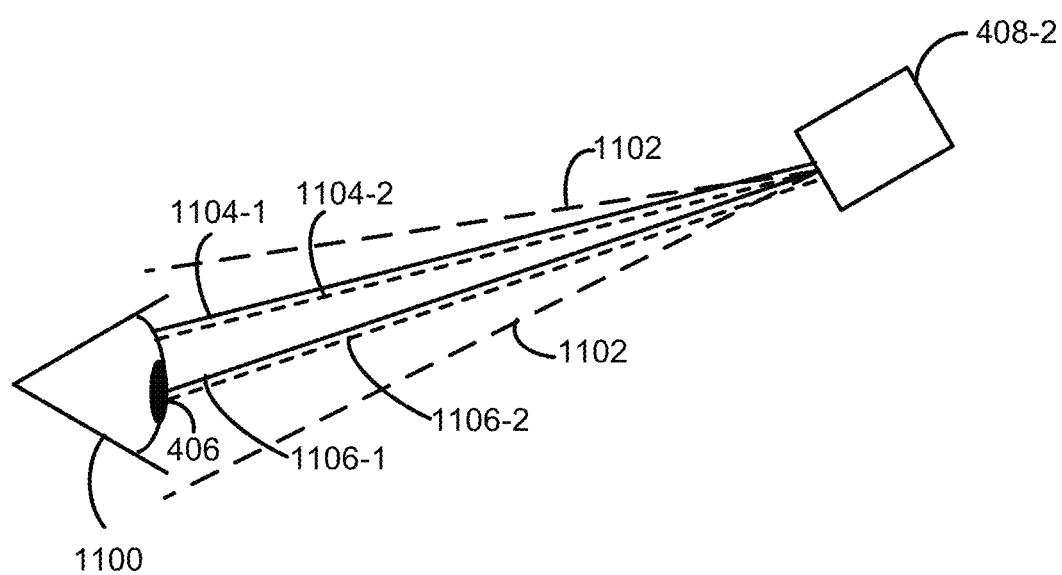
FIG. 11B is a schematic diagram illustrating detecting a position of a pupil by glint tracking in accordance with some embodiments.

FIG. 11B is a schematic diagram illustrating detecting a position of a pupil by glint tracking in accordance with some embodiments. In FIG. 11A, eye tracker 408-2 includes a camera (e.g., a still camera or a video camera) or other photodetector (e.g., an array of photodiodes). Glint refers to a reflection of light from one or more surfaces of the eye. In FIG. 11B, eye tracker 408-2 projects light toward eye 1100 and at least a portion of the light, such as ray 1104-1, impinges on a sclera of eye 1100 and is reflected as ray 1104-2. The reflected ray 1104-2 is detected in the image captured by eye tracker 408-2.

In some embodiments, the position of pupil 406 is determined based on a representative intensity or intensities of detected rays. In some embodiments, the position of pupil 406 is determined based on an incident angle of detected ray 1104-2 (e.g., eye tracker 408-2 includes one or more optical elements to determine the incident angle of detected ray 1104-2). For example, the position of pupil 406 is determined by comparing an incident angle of ray 1104-2 to an estimated surface profile of surface of eye 1100. The surface profile of an eye does not correspond to a perfect sphere but instead has a distinct curvature in the area that includes the cornea and the pupil. Therefore, a position of the pupil can be determined by determining the surface profile of the eye.

In some embodiments, at least a portion of the light projected by eye tracker 408-1 impinges on other portions of eye 1100, such as ray 1106-1 impinging on pupil 406. Ray 1106-1 is reflected as ray 1106-2, which is detected in an image captured by eye tracker 408-2. In some embodiments, the position of pupil 406 is determined based on ray 1104-2 and ray 1106-2. In some embodiments, the position of pupil 406 is determined based on a difference (and/or a ratio) between an intensity of ray 1104-2 and an intensity of ray 1106-2. For example, the intensity of ray 1104-2 reflected on the sclera of eye is higher than the intensity of ray 1106-2 and therefore the location of pupil 406 can be determined based on the intensity difference. In some embodiments, the position of pupil 406 is determined based on an angle between ray 1104-2 and ray 1106-2. For example, a surface profile of eye 1100 is determined based on an angle between ray 1104-2 reflected on the sclera and ray 1106-2 reflected on pupil 406.

In some embodiments, determining the position of pupil 406 by glint tracking includes projecting, by eye tracker 408-2, a light with a structured pattern (e.g., ray 1104-1 in FIG. 11B includes a structured pattern) toward eye 1100 and detecting, by eye tracker 408-2, an image of the structured pattern (e.g., ray 1104-2) as the light with the structured pattern is reflected on the surface of eye 1100. For example, as a light with a structured pattern is reflected by the non-flat surface of eye 1100, the structured pattern is distorted. The non-flat surface profile of the eye 1100 is then determined based on the distorted structured pattern and the position of pupil 406 is determined based on the surface profile.

Figure 11C:
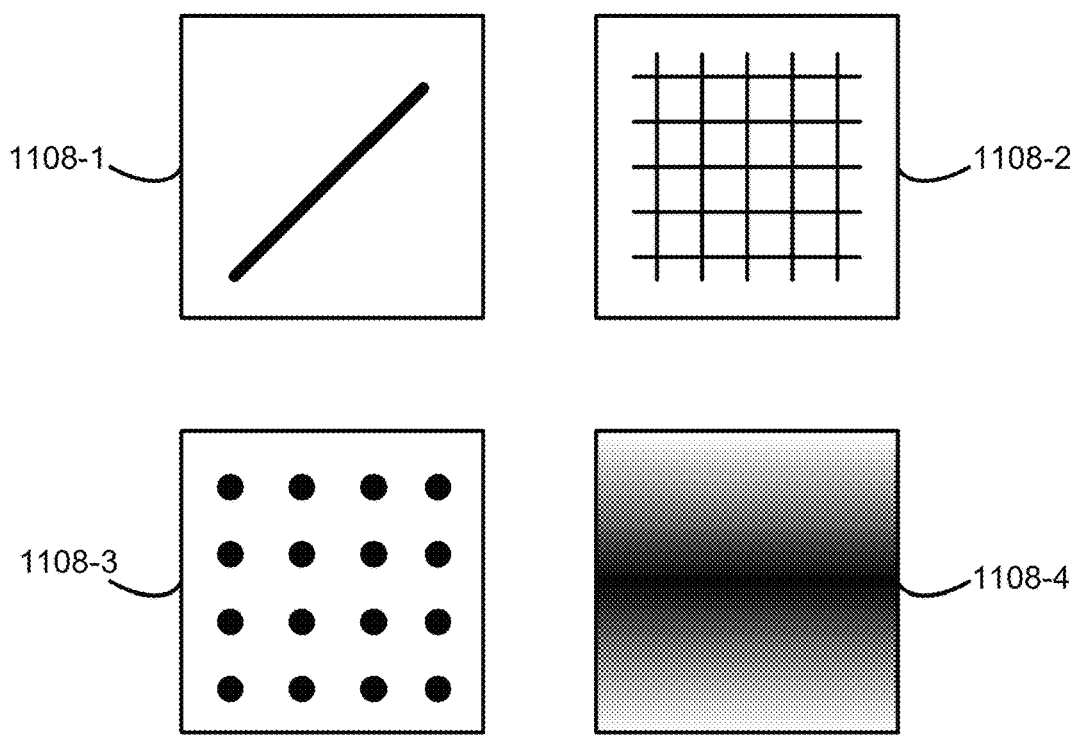
FIG. 11C is a schematic diagrams illustrating four structured patterns of light used for eye tracking in accordance with some embodiments.

FIG. 11C is a schematic diagram illustrating four structured patterns of light used for eye tracking in accordance with some embodiments. Pattern 1108-1 includes a straight line, pattern 1108-2 includes a grid pattern, pattern 1108-3 includes a dot matrix, and pattern 1108-4 includes a sinusoid pattern.

Figure 11D:
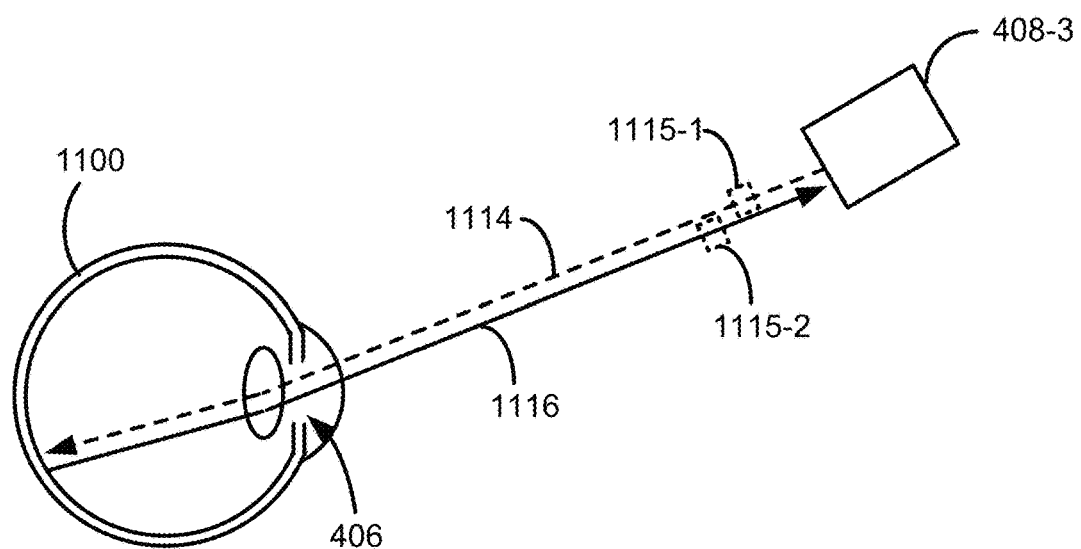
FIG. 11D is a schematic diagrams illustrating detecting a position of a pupil by infrared (IR) retinal reflex detection in accordance with some embodiments.

FIG. 11D is a schematic diagram illustrating detecting a position of a pupil by infrared (IR) retinal reflex detection in accordance with some embodiments. IR retinal reflex, also known as retinal reflection or red reflex, refers to a reddish reflection of light from the eye's retina, which is a layer of tissue that lines the inside of the back of an eye. The reflection of reddish light (e.g., infrared light) caused by the IR retinal reflex is distinguishable from reflection of light by other positions of the eye. For example, the light reflected from the retina has a distinguishable intensity, wavelength dependence, and/or polarization dependence. The retina includes the fovea, which is an area responsible for the sharp central vision including the highest density of photoreceptors. Some photoreceptors (e.g., Henle fibers) have birefringent properties. Birefringence refers to a property of a material to have a refractive index that depends on the polarization state and propagation direction of incident light. The birefringent properties of the fovea can further be used to distinguish the light reflected from the retina from light reflected from other portions of the eye.

Eye tracker 408-3 in FIG. 11D includes a light source (e.g., an IR light source) and an IR detector. In some embodiments, the IR detector is an IR-sensitive photodiode. In FIG. 11D, ray 1114 (e.g., an IR light) is projected by eye tracker 408-3 toward eye 1100. As ray 1114 enters through the pupil, ray 1114 is reflected by the retina of eye 1100. Reflected ray 1116 is detected by eye tracker 408-3. A ray reflected by the retina is distinguishable from light reflected from other portions of the eye, and the location of the pupil can be determined based on the position (and optionally an intensity) of the reflected light.

In some embodiments, eye tracker 408-3 is optically coupled with one or more polarizers 1115. In some embodiments, polarizer 1115-1 is positioned to polarize ray 1114 projected by eye tracker 408-3. A polarized light impinging on the birefringent photoreceptors of the retina produces a reflection with a characteristic pattern. Alternatively or additionally, in some embodiments, polarizer 1115-2 is positioned to polarize reflected ray 1116 detected by eye tracker 408-3, and a similar characteristic pattern is detected by eye tracker 408-3 due to the birefringent photoreceptors. In such embodiments, the position of pupil 406 of eye 1100 is determined based on the characteristic pattern detected by eye tracker 408-3 in reflected ray 1116. In some embodiments, when no characteristic pattern is detected, eye tracker 408-3 determines that ray 1116 has been reflected by other portions of eye 1100 (e.g., the sclera or the cornea).

Figure 11E:
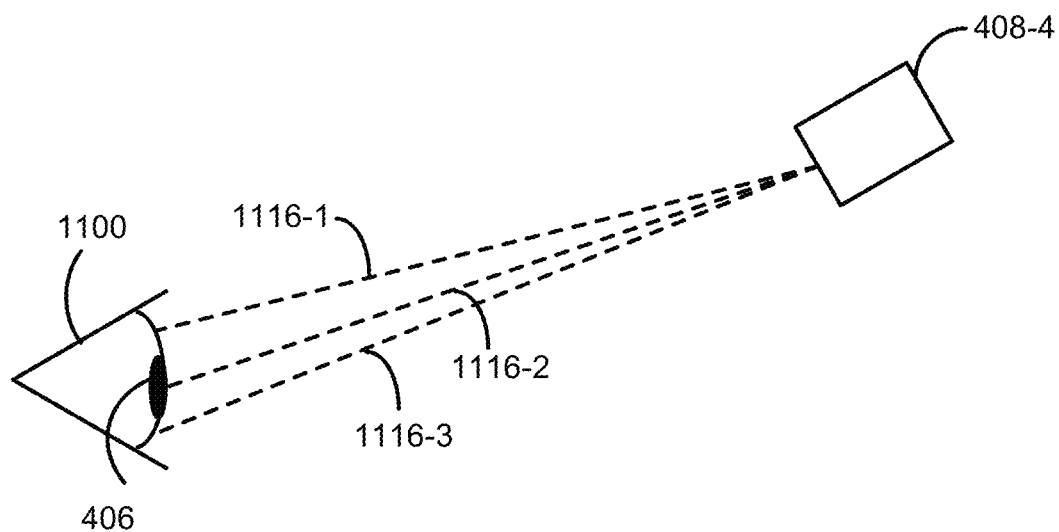
FIG. 11E is a schematic diagrams illustrating detecting a position of a pupil by depth measurement in accordance with some embodiments.

FIG. 11E is a schematic diagram illustrating detecting a position of a pupil by depth measurement in accordance with some embodiments. In some embodiments, eye tracker 408-4 includes one or more depth sensors (e.g., one or more depth sensors based on a Time-of-Fly, Sound Navigation and Ranging (SONAR), Light Detection and Ranging (LIDAR), interferometry, and/or light triangulation technique, and/or other techniques known in the art for depth sensing). A depth sensor is configured to measure one or more distances between eye tracker 408-4 and the surface of eye 1100 (e.g., distances 1116-1, 1116-2, and 1116-3 in FIG. 11E). In some embodiments, a surface profile is determined by measuring two or more of distances 1116-1, 1116-2, and 1116-3. In some embodiments, the position of pupil 406 is determined from the surface profile.

As eye 1100 rotates, the distance between eye tracker 408-4 and eye 1100 changes. For example, in FIG. 11E, a distance longer than a reference distance, such as a distance for an eye that is in a neutral position (e.g., 00), indicates that the eye is looking down, and a distance shorter than the reference distance indicates that the eye is looking up. In addition, a gaze angle of eye 1100 can be determined from the distance. Furthermore, an angular movement of eye 1100 can be determined from changes in the distance. For example, in accordance with a determination that the distance has increased, eye tracker 408-4 determines that eye 1100 is rotating downward, and in accordance with a determination that the distance has decreased, eye tracker 408-4 determines that eye 1100 is rotating up. In FIG. 11E, eye tracker 408-4 is configured to measure a distance between eye tracker 408-4 and a surface of eye 1100 along an axis that is not parallel to an optical axis of eye 1100 in a neutral position. For example, an optical axis of eye tracker 408-4 is not aligned with an optical axis of eye 1100 in a neutral position (e.g., eye tracker 408-4 is positioned to measure a distance to a surface of eye 1100 at angle that is at least 150 away from an optical axis of eye 1100 in a neutral position; eye tracker 408-4 is positioned to measure a distance to a surface of eye 1100 at angle that is at least 300 away from an optical axis of eye 1100 in a neutral position; eye tracker 408-4 is positioned to measure a distance to a surface of eye 1100 at angle that is at least 450 away from an optical axis of eye 1100 in a neutral position; or eye tracker 408-4 is positioned to measure a distance to a surface of eye 1100 at angle that is at least 60° away from an optical axis of eye 1100 in a neutral position).

Figure 11F:
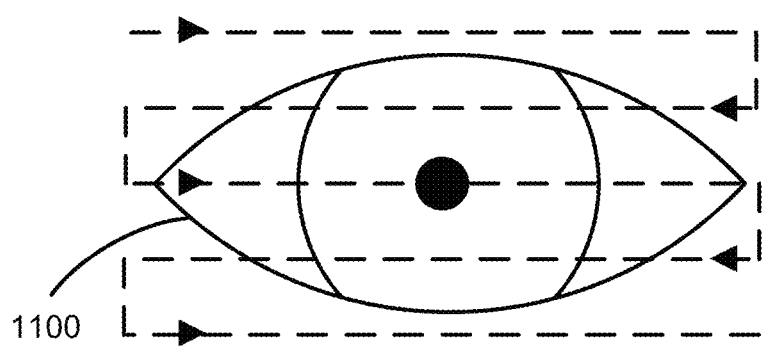
FIG. 11F is a schematic diagrams illustrating detecting a position of a pupil by depth scanning in accordance with some embodiments.

FIG. 11F is a schematic diagram illustrating detecting a position of a pupil by scanning in accordance with some embodiments. In some embodiments, an area including eye 1100 is scanned with eye tracker 408-4 including a depth sensor to produce a contour profile of the surface of eye 1100. In some embodiments, the contour profile of the surface of the eye includes a three dimensional image of eye 1100. In some embodiments, the three dimensional image of eye 1100 is a low resolution image including only a limited number of depth measurement points sufficient to create an image of eye 1100. By limiting the number of depth measurement points reduced time required of performing the measurements as well as reducing the time and power required for image processing of such images. This consequently reduces the power consumption required for eye tracking.

In some embodiments, an area including eye 1100 is scanned with any other eye tracker described herein. In some embodiments, an eye tracker performs a local search (e.g., scanning only a subset, less than all, of the area and determining a position of the pupil or a boundary of the iris), which improves the speed of eye tracking.

Figure 11G:
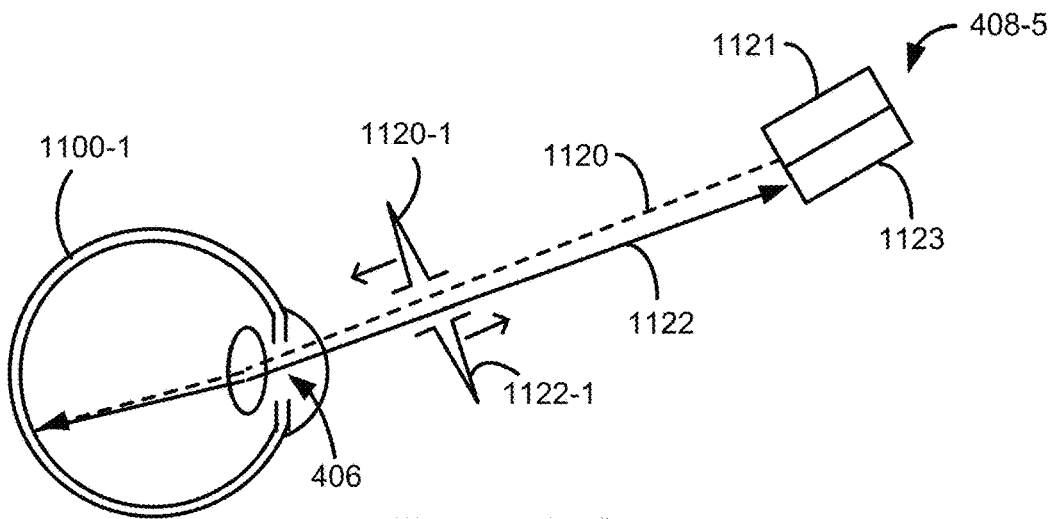
FIGS. 11G-11I are schematic diagrams illustrating detecting a position of a pupil by a time-of-flight detector in accordance with some embodiments.
Figure 11H:
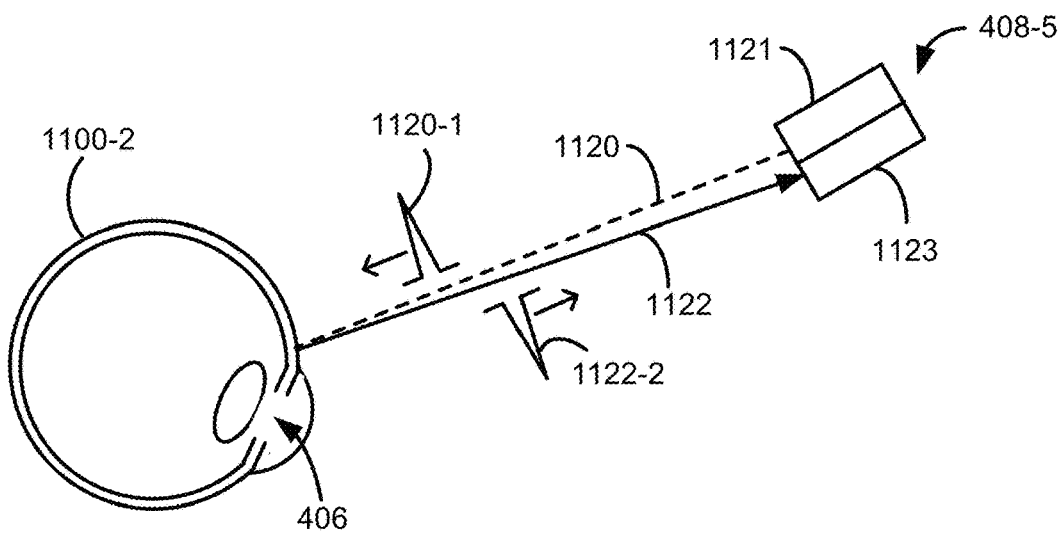
Figure 11I:
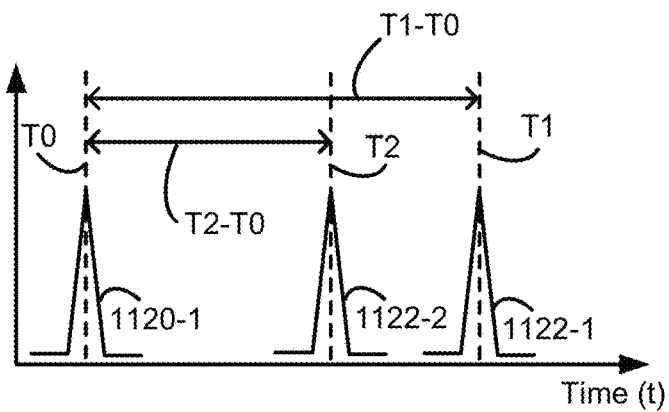

FIGS. 11G-11I are schematic diagrams illustrating detecting a position of a pupil by a time-of-flight detector in accordance with some embodiments. Eye tracker 408-5 includes light source 1121 configured to emitting pulsed light toward eye 1100 and detector 1123 configured to detect pulsed light reflected by eye 1100.

In some embodiments, light source 1121 includes a light emitting diode (LED), a superluminescent light emitting diode (SLED), an organic LED (OLED) or a laser. In some embodiments, light source 1121 is a single LED. In some embodiments, light source 1121 emits infrared (IR) or near-infrared (NIR) light and detector 1123 is an IR or a NIR detector. In some embodiments, light source 1121 is included in, or is coupled with, a light projector, such as light projector 402 described herein with respect to FIG. 4A. In FIGS. 11G-11H, eye tracker 408-5 emits pulsed light 1120-1 along optical path 1120 toward eye 1100. Pulsed light 1120-1 is reflected by a surface of eye 1100 (e.g., the retina, the sclera, or the cornea of eye 1100) and the reflected light is detected by detector 1123 of eye tracker 408-5. In some cases, pulsed light 1120-1 is reflected by an area surrounding eye 1100 (e.g., an eye lid).

In some embodiments, detector 1123 is an avalanche photodiode (e.g., a single-photon avalanche photodiode, SPAD). The avalanche photodiode is configured to receive light reflected by a surface of eye 1100 and eye tracker 408-5 is configured to determine a distance between the eye tracker 408-5 and the surface of eye 1100 which has reflected the light based on timing of emission and detection of light. In FIG. 11G, eye 1100-1 is directed to a first angular position and pulsed light 1120-1 projected toward eye 1100 enters eye 1100 through pupil 406 and is reflected back by the retina of eye 1100. Reflected pulsed light 1122-1 returns along optical path 1122 and is detected by eye tracker 408-5.

In FIG. 11H, eye 1100-2 is directed to a second angular position and pulsed light 1120-1 projected toward eye 1100 does not enter eye 1100 through pupil 406, and is reflected by the sclera of eye 1100. Reflected pulsed light 1122-2 is detected by detector 1123.

In FIG. 11I, pulsed light 1120-1 emitted by light source 1121 and reflected light 1122-1 and 1122-2 are illustrated on a timeline. Pulsed light 1120-1 is emitted at time T0 toward eye 1100 and time of emission is recorded by eye tracker 408-5. In FIG. 11G, pulsed light 1120-1 enters the pupil of eye 1100 and is reflected by the retina of eye 1100 as pulsed light 1122-1. Pulsed light 1122-1 is detected by eye tracker 408-5 at time T1, where T1-T0 corresponds to a time-of-flight for pulsed light 1120-1 reflected by the retina of eye 1100. Based on the time-of-flight T1-T0, a distance between eye tracker 408-5 and the surface from which pulsed light 1122-1 has been reflected (e.g., the retina) is determined. In FIG. 11H, pulsed light 1120-1 is reflected by the sclera of eye 1100 as pulsed light 1122-2. Pulsed light 1122-2 is detected by eye tracker 408-5 at time T2, where T2-T0 corresponds to a time-of-flight of pulsed light 1120-1 reflected by the sclera of eye 1100. Based on the time-of-flight T2-T0, a distance between eye tracker 408-5 and the surface from which pulsed light 1120-1 has been reflected (e.g., the sclera) is determined. Based on the distances determined based on time-of-flights T1-T0 and T2-T0, eye tracker 408-5 determines whether the time of flight corresponds to a time-of-flight of a pulsed light reflected from the retina of eye 1100 or a time-of-flight of a pulsed light reflected from the sclera of eye 1100.

Figure 11J:
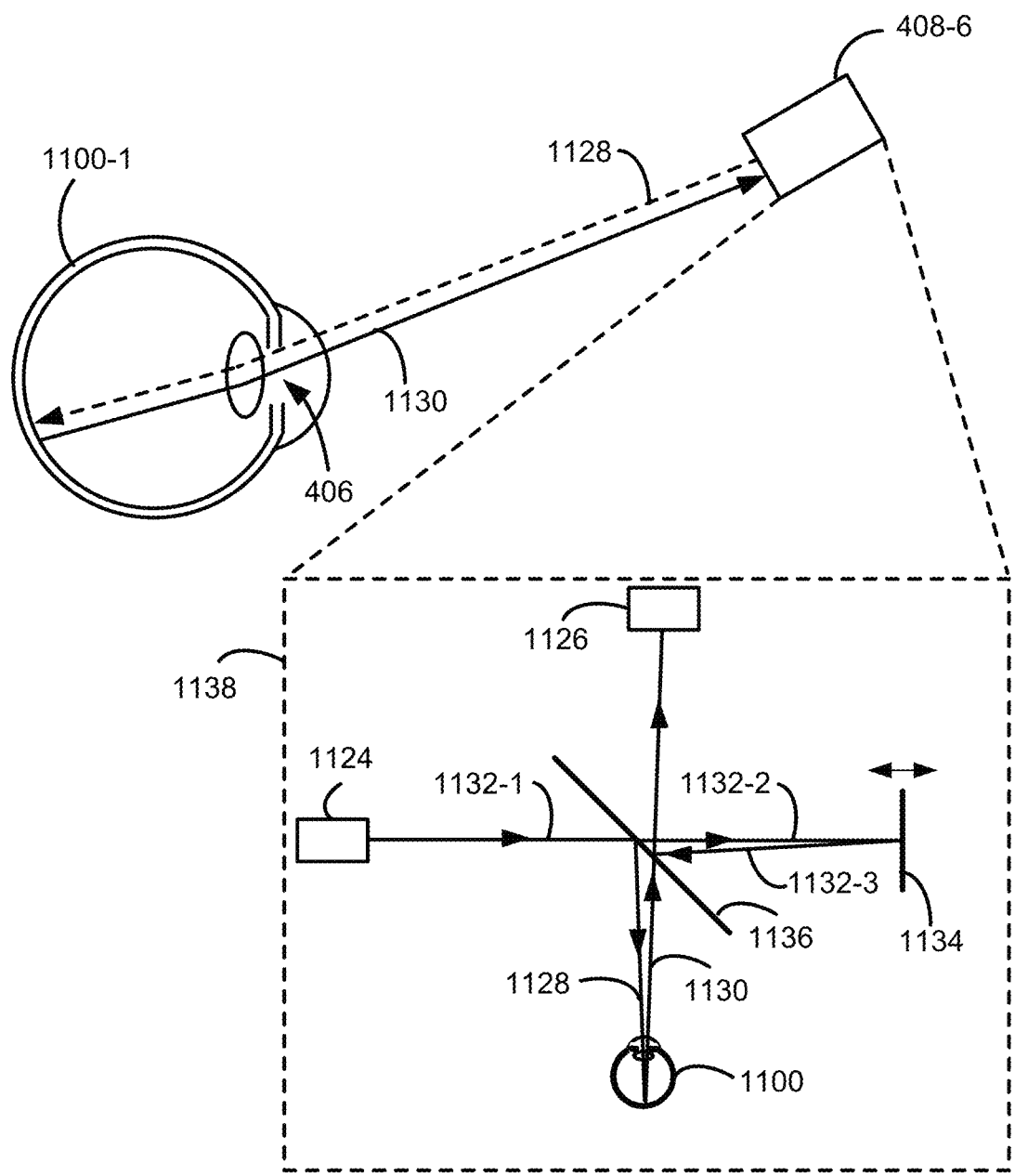
FIG. 11J is a schematic diagram illustrating detecting a position of a pupil by a time-of-flight detector in accordance with some embodiments.

FIG. 11J is a schematic diagram illustrating detecting a position of a pupil by a time-of-flight detector in accordance with some embodiments. Eye tracker 408-6 includes a light source (e.g., light source 1124 illustrated in the inset of FIG. 11J) emitting coherent light (e.g., ray 1128) toward eye 1100. Eye tracker 408-6 also includes an interferometer (e.g., interferometer 1138 illustrated in the inset of FIG. 11J). In some embodiments, the light source includes a light emitting diode (LED), a superluminescent light emitting diode (SLED), an organic LED (OLED) or a laser. In some embodiments, the light source is a single LED. In some embodiments, the light source is included in a light projector such as light projector 402 described herein with respect to FIG. 4A. Ray 1128 is reflected by a surface of eye 1100. In FIG. 11J, ray 1128 enters eye 1100 through pupil 406 and is reflected by the retina of eye 1100. Reflected ray 1130 is subsequently detected by interferometer 1138 of eye tracker 408-6.

The operation of interferometer 1138 is illustrated in the inset of FIG. 11J. Light source 1124 emits ray 1132-1 impinging on beam splitter 1136. Beam splitter 1136 splits ray 1132-1 into ray 1128 directed toward eye 1100 and reference ray 1132-2. Ray 1128 is reflected from a surface of eye 1100. As described herein with respect to FIG. 11G, ray 1128 can be reflected by one or more surfaces of eye 1100 (e.g., the retina, the sclera, or the cornea), or surfaces surrounding eye 1100 (e.g., an eye lid). Reflected ray 1130 passes through beam splitter 1136 and enters detector 1126 (e.g., a photodiode). Reference ray 1132-2 is reflected by mirror 1134, and a portion of the reflected reference ray 1132-3 is reflected by beam splitter 1136 toward detector 1126. Mirror 1134 is an adjustable mirror configured to change the optical distance travelled by the reference ray 1132-3. Detector 1126 detects an interference pattern formed by ray 1130 and reference ray 1132-3 arising from a phase-shift between ray 1130 and reference ray 1132-3 due to a difference in the distances travelled by the respective rays. Based on the interference pattern, eye tracker 408-6 determines a distance between eye tracker 408-6 and a surface which reflected ray 1128 is determined. Based on the distance between eye tracker 408-6 and the surface of which ray 1128, eye tracker 408-6 determines whether ray 1128 is reflected by the retina or any other surfaces of the eye (e.g., the sclera or the cornea of eye 1100).

In some embodiments, the eye trackers described herein with respect to FIGS. 11A-11J (i.e., eye trackers 408-1, 408-2, 408-3, 408-4, 408-5, and 408-6) are configured to obtain a low-resolution image of eye 1100 for eye tracking. In some embodiments, the low-resolution image includes a single-pixel image. In some embodiments, the low-resolution image includes an image consisting of a few pixels (e.g., 2, 3, 4, 5, 6, 7, 8, 9, 10 pixels, etc.). In some embodiments, the eye trackers of FIGS. 11A-11J include a single-pixel eye tracking sensor. In some embodiments, the eye trackers of FIGS. 11A-11J include a low-resolution image sensor such as a small array of eye tracking sensors (e.g., 2, 3, 4, 5, 6, 7, 8, 9, 10 eye tracking sensors, etc.). A single-pixel sensor and a low-resolution image sensor have advantages over eye trackers including a camera providing high-resolution images (e.g., 500×500 pixels or more, etc.). For example, a single-pixel eye tracking sensor has low power consumption and a low weight compared to a high-resolution camera. Also, processing data from a single-pixel sensor requires less computational power than processing data from a high-resolution image.

FIGS. 12A-12E are schematic diagrams illustrating head-mounted displays with focus-supporting light projectors in accordance with some embodiments.

Vergence-accommodation conflict can impact the quality of user experience with head-mounted displays. Focus-supporting light projectors, unlike fixed-focus light projectors, are capable of changing a perceived distance to a projected image, thereby reducing or eliminating vergence-accommodation conflict.

Figure 12A:
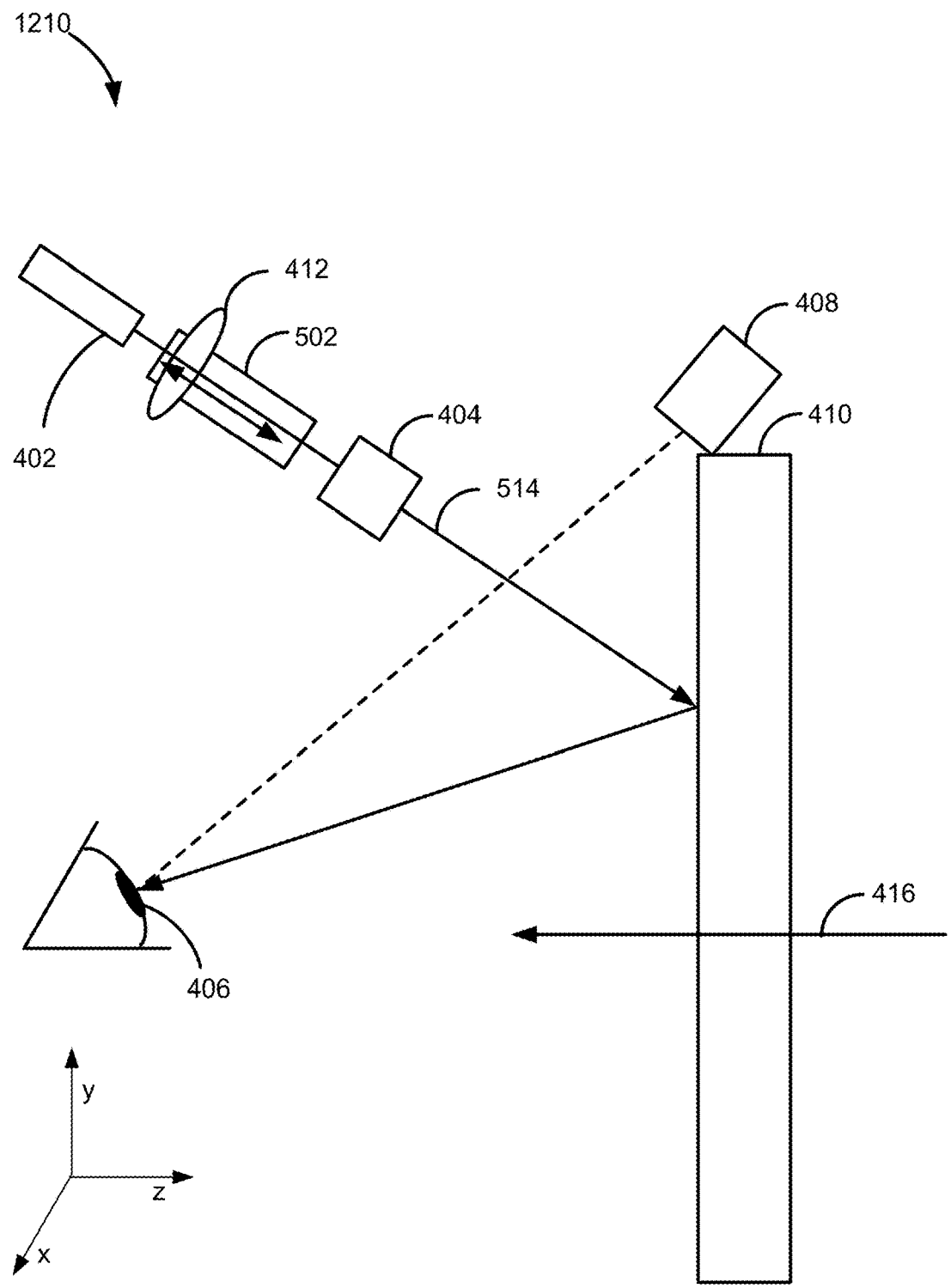
FIGS. 12A-12E are schematic diagrams illustrating head-mounted displays with focus-supporting light projectors in accordance with some embodiments.

FIG. 12A illustrates display device 1210 in accordance with some embodiments. Display device 1210 is similar to display device 500 shown in FIG. 5D, except that, in FIG. 12A, actuator 502 is configured to move one or more lenses 412 without moving light projector 402. In FIG. 12A, actuator 502 is configured to move one or more lenses 412 in a direction that includes a component parallel to an optical axis of light projector 402 (e.g., actuator 502 moves one or more lenses 412 along the optical axis of light projector 402). This allows moving an image plane corresponding to the projected images. Display device 1210 optionally includes beam steerer 404.

Figure 12B:
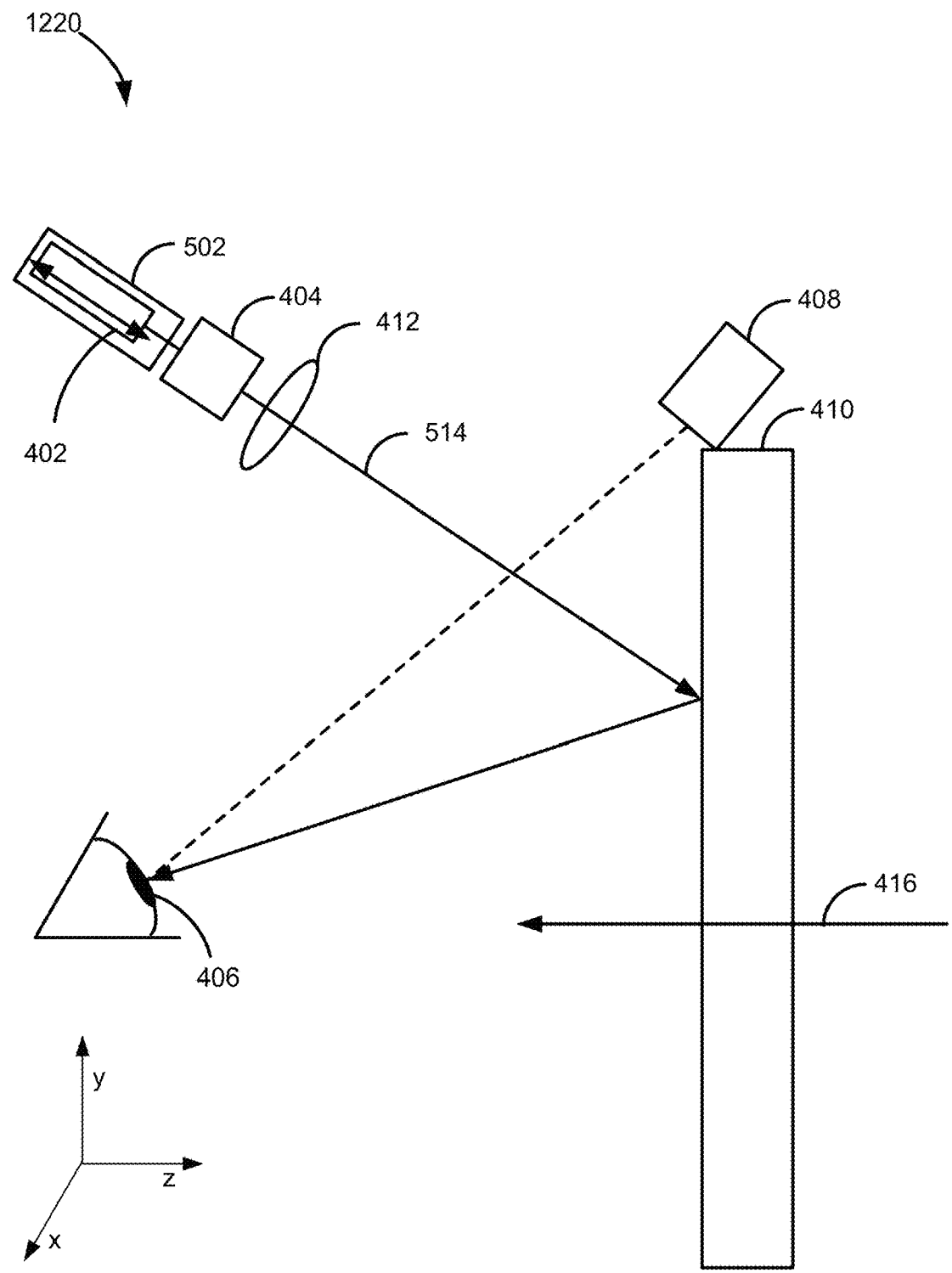

FIG. 12B illustrates display device 1220 in accordance with some embodiments. Display device 1220 is similar to display device 1210 shown in FIG. 12A, except that, in FIG. 12B, actuator 502 is configured to move light projector 402 (or a light source within light projector 402) without moving one or more lenses 412. In FIG. 12B, actuator 502 is configured to move light projector 402 in a direction that includes a component parallel to an optical axis of light projector 402 (e.g., actuator 502 moves light projector 402 along the optical axis of light projector 402).

In some embodiments, actuator 502 is configured to move one or more lenses 412 along with light projector 402, as shown in FIG. 5D.

Figure 12C:
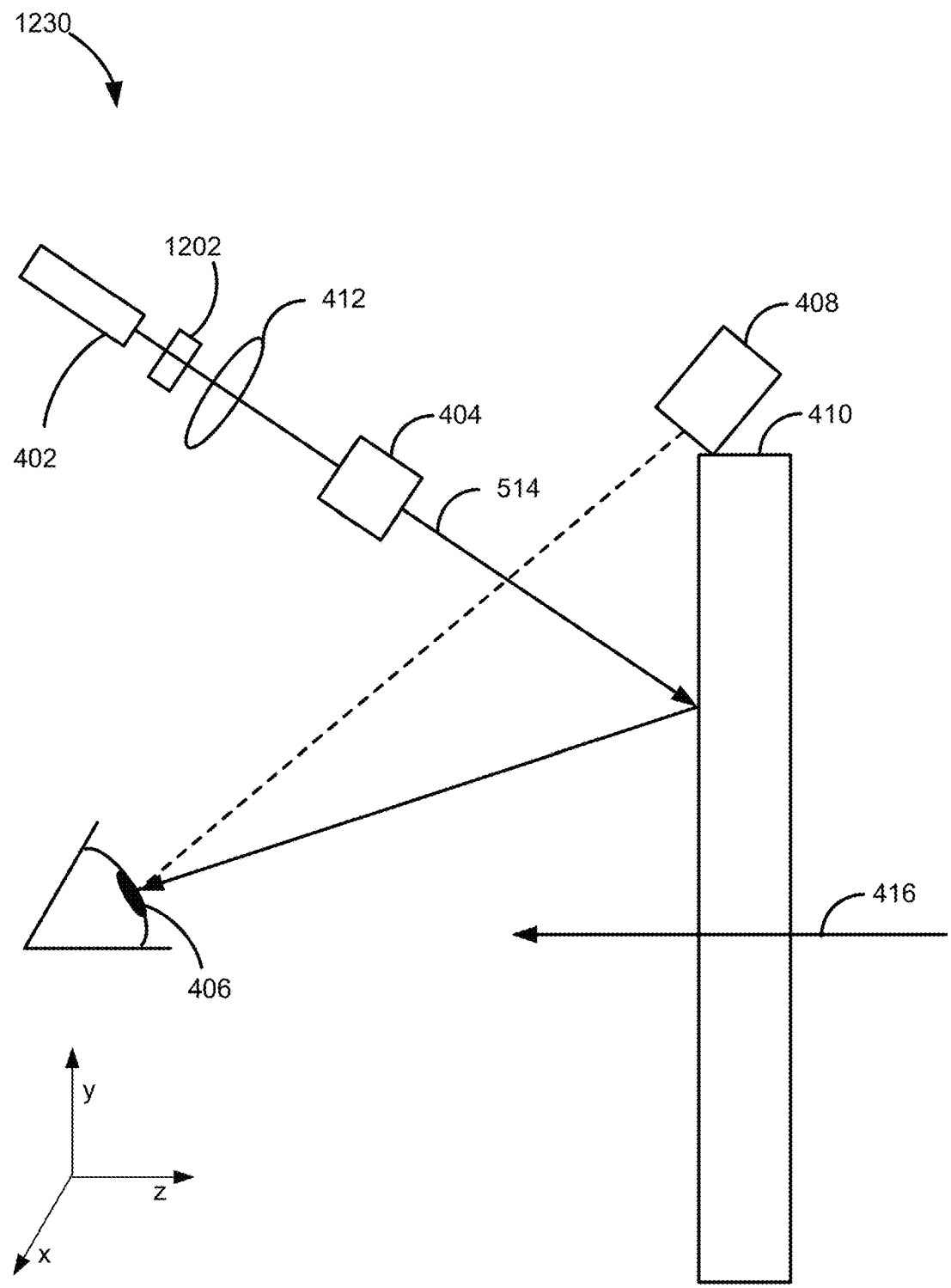

FIG. 12C illustrates display device 1230 in accordance with some embodiments. Display device 1230 is similar to display device 1210 shown in FIG. 12A, except that display device 1230 includes one or more spatial light modulators 1202. In some embodiments, one or more spatial light modulators 1202 include a liquid-crystal-on-silicon (LCOS) spatial light modulator. In some embodiments, one or more spatial light modulators 1202 include a phase-modifying spatial light modulator. The phase-modifying spatial light modulator functions like a tunable lens having a variable focal length.

Figure 12D:
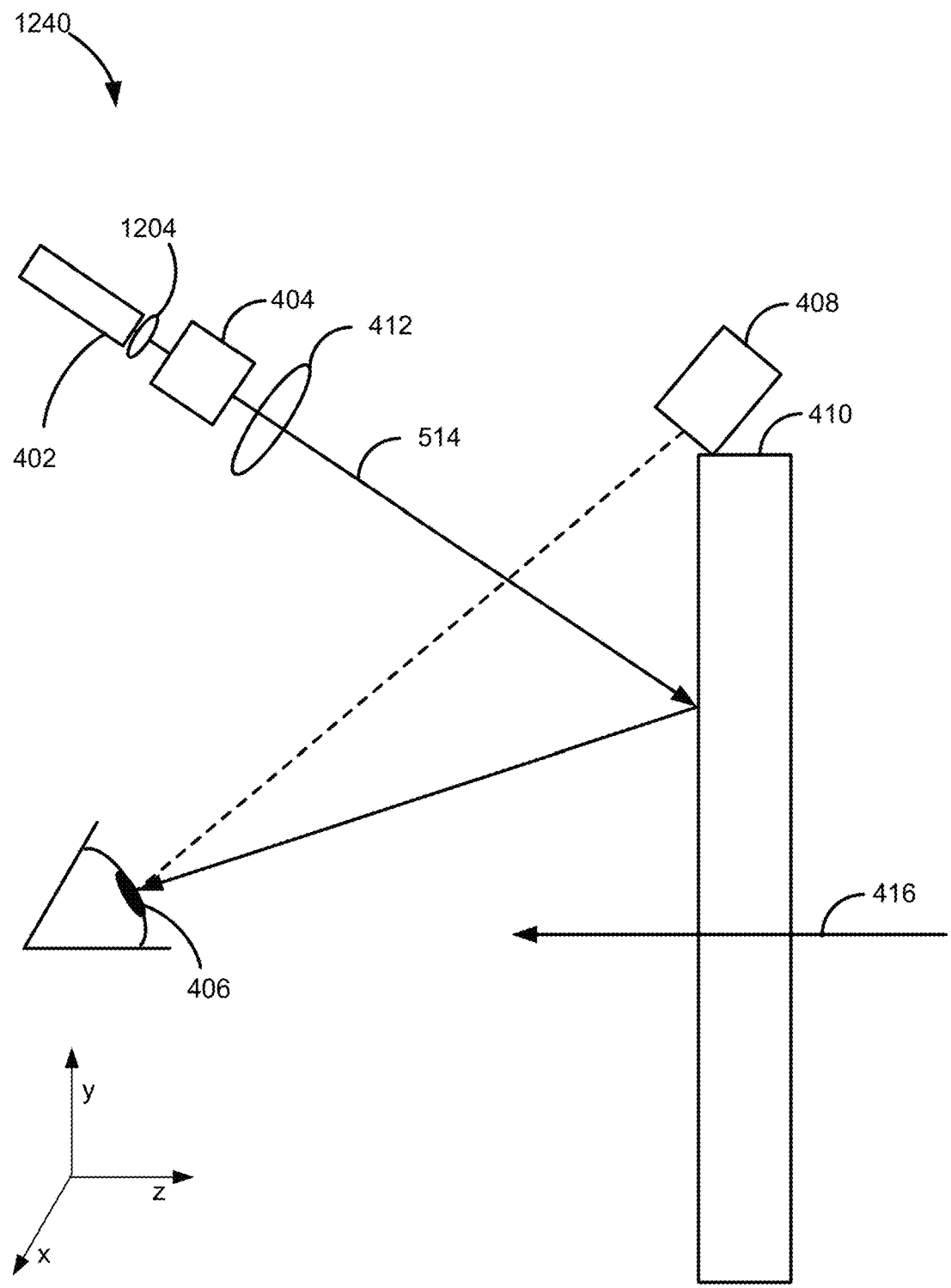

FIG. 12D illustrates display device 1240 in accordance with some embodiments. Display device 1240 is similar to display device 1230 shown in FIG. 12C, except that display device 1240 includes tunable lens 1204, such as an electro-wetting lens, a liquid lens, and a liquid crystal lens. In some embodiments, display device 1240 includes one or more lenses 412. In some embodiments, display device 1240 does not include one or more lenses 412.

Figure 12E:
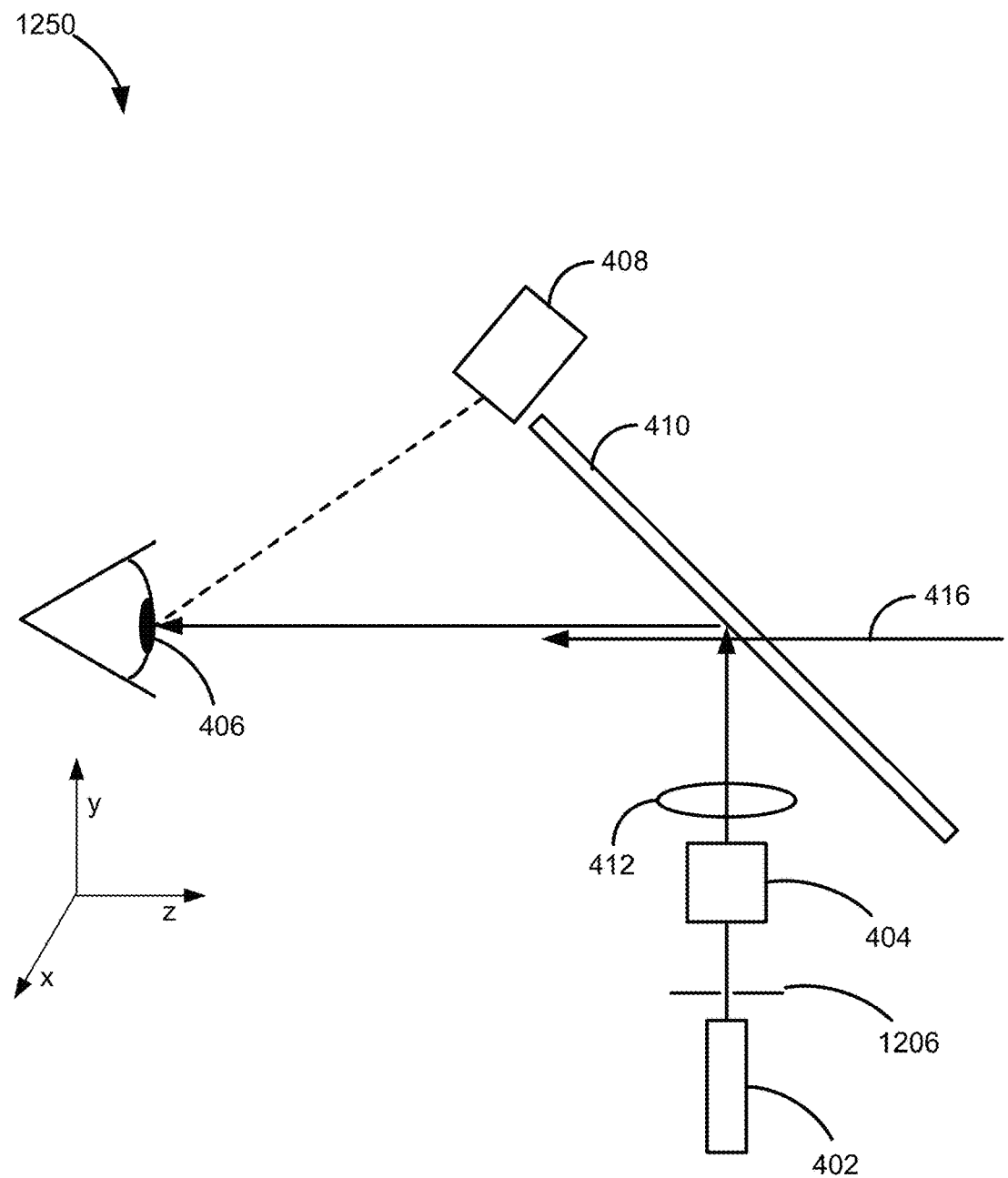

FIG. 12E illustrates display device 1250 in accordance with some embodiments. Display device 1250 is an example of a Maxwellian-view head-mounted display. Display device 1250 includes blocker 1206 defining an aperture (e.g., a pinhole having a diameter 0.1 mm, 0.2 mm, 0.3 mm, 0.4 mm, 0.5 mm, 0.6 mm, 0.7 mm, 0.8 mm, 0.9 mm, 1 mm, etc.). In some embodiments, blocker 1206 is made of an opaque material (e.g., metal, plastic, etc.) configured to block light (and transmit light only through the aperture). Light projector 402 is optically coupled with the aperture so that light from light projector 402 is transmitted through the aperture defined in blocker 1206. In some embodiments, one or more lenses 412 are configured to focus the light transmitted through the aperture onto (or adjacent to) pupil 406.

In some embodiments, display device 1250 includes one or more spatial light modulators (e.g., an amplitude-modifying spatial light modulator) configured to modify the light transmitted through the aperture.

Figure 12F:
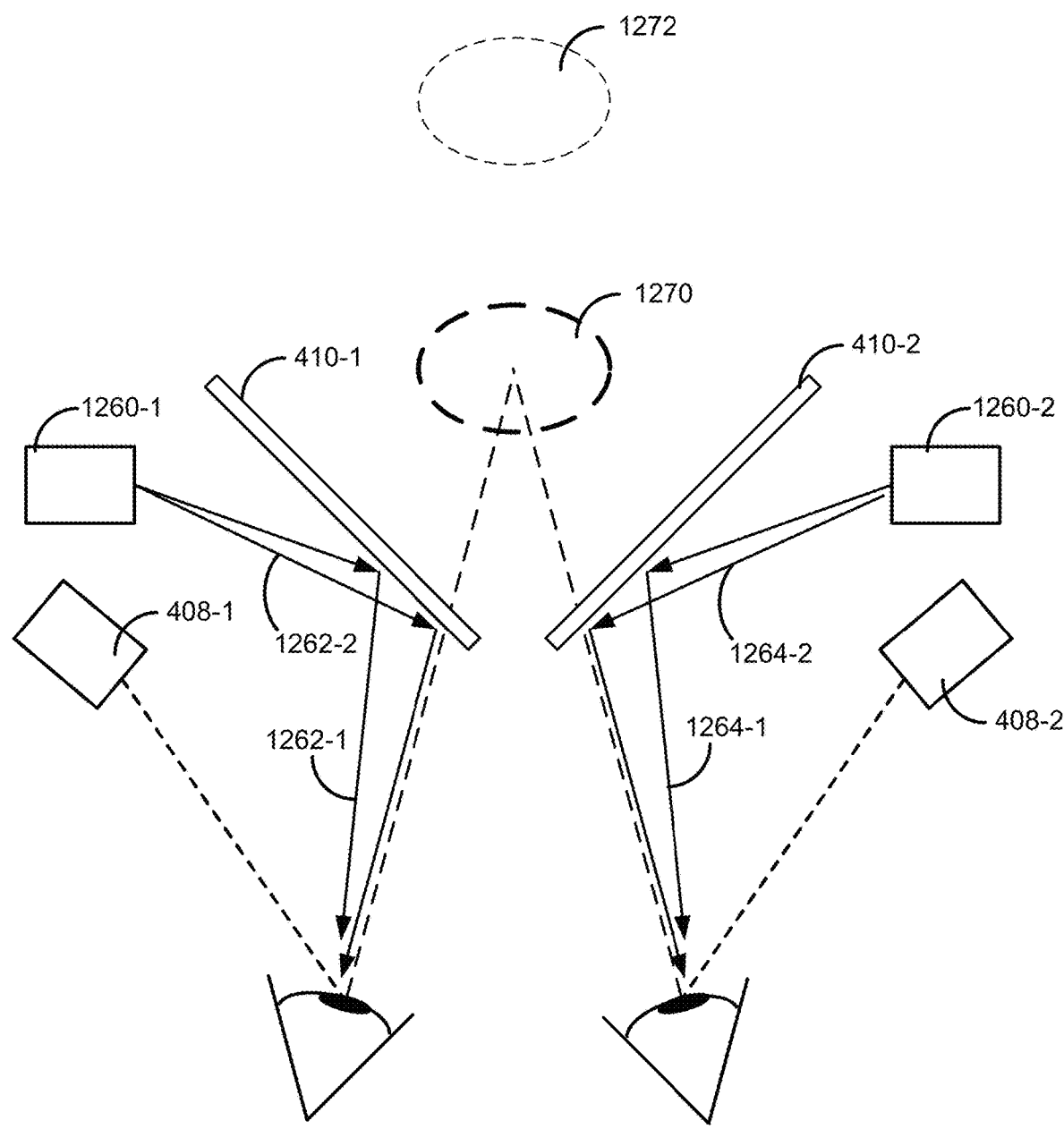
FIGS. 12F and 12G are schematic diagrams illustrating example operations of a head-mounted display in accordance with some embodiments.
Figure 12G:
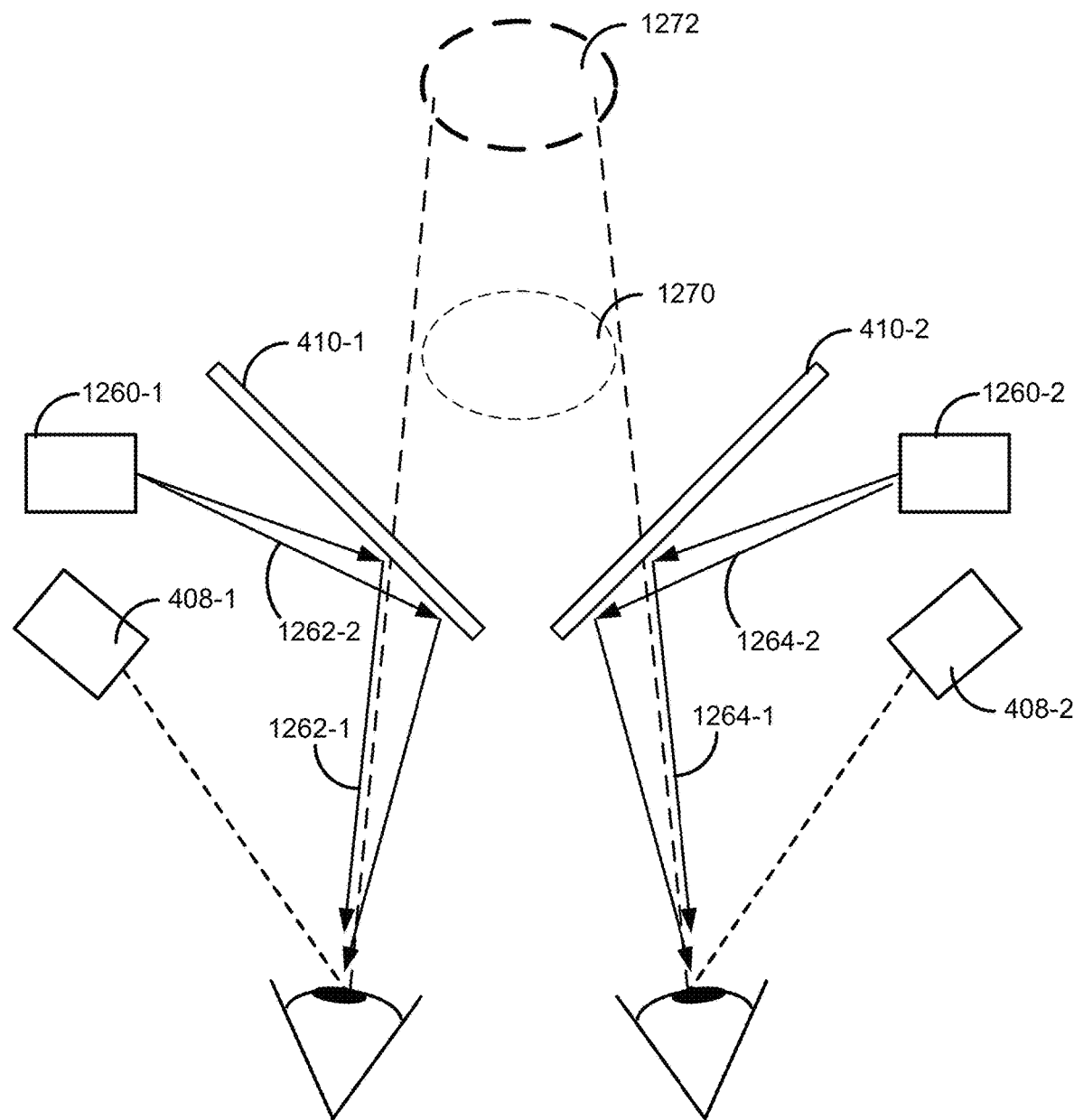

FIGS. 12F and 12G are schematic diagrams illustrating example operations of a head-mounted display in accordance with some embodiments.

FIG. 12F illustrates that eyes are gazing at object 1270 (e.g., a real object or a virtual object) located adjacent to the user. As shown in FIG. 12F, when the eyes are gazing an object that is located adjacent to the user, the eyes converge (as compared to their neutral positions). Eye trackers 408-1 and 408-2 determine positions of pupils of the eyes. In some embodiments, eye trackers 408-1 and 408-2 (or one or more processors in communication with eye trackers 408-1 and 408-2, such as processors 216) determine a vergence based on the positions of the pupils of the eyes (e.g., by determining gaze angles of the eyes and calculating a difference between the gaze angles). In some embodiments, the one or more processors determine an image plane based on the vergence. For example, the one or more processors select an adjacent image plane (e.g., an image plane having a first distance from the user) based on the convergence of the eyes, and select a far image plane (e.g., an image plane having a second distance, greater than the first distance, from the user) based on the divergence of the eyes.

Display devices 1260-1 and 1260-2 project light for rendering images. In some embodiments, each of display devices 1260-1 and 1260-2 includes a focus-supporting light projector described herein (e.g., the focus-supporting light projector of display device 1250). In FIG. 12F, display device 1260-1 projects light, and combiner 410-1 reflects the projected light toward the left eye. In addition, display device 1260-2 projects light, and combiner 410-2 reflects the projected light toward the right eye. In some embodiments, the light projected by display device 1260-1 is different from the light projected by display device 1260-2. In some cases, this provides a stereoscopic perception to the user.

In FIG. 12F, the light projected by display device 1260-1 is illustrated with two representative rays 1262-1 and 1262-2, and the light projected by display device 1260-2 is illustrated with two representative rays 1264-1 and 1264-2. Rays 1262-1 and 1264-1 correspond to object 1270 that is located adjacent to the user, and rays 1262-2 and 1264-2 correspond to object 1272 that is located away from the user.

While the user is gazing at object 1270 that is located adjacent to the user, rays 1262-1 and 1264-1 are adjusted (e.g., using a focus-supporting light projector, such as display device 1250) to remain in focus when projected onto the retinas of the eyes and rays 1262-2 and 1264-2 are adjusted (e.g., using the focus-supporting light projector) to remain out of focus when projected onto the retinas. This creates a visual perception that the object located adjacent to the user appears in focus and the object located away from the user appears blurry.

FIG. 12G illustrates that the eyes are gazing at object 1272 (e.g., a real object or a virtual object) located away from the user (e.g., object 1270 is perceived to be located at a first distance from the user, and object 1272 is perceived to be located at a second distance, from the user, that is greater than the first distance). Eye trackers 408-1 and 408-2 determine positions of pupils of the eyes. In some embodiments, eye trackers 408-1 and 408-2 determine a vergence based on the positions of the pupils of the eyes.

Display devices 1260-1 and 1260-2 project light for rendering updated images. For example, rays 1262-1 and 1264-1 are adjusted to remain out of focus when projected onto the retinas and rays 1262-2 and 1264-2 are adjusted to remain in focus when projected onto the retinas. This creates a visual perception that the object located adjacent to the user appears blurry and the object located away from the user appears in focus.

In light of these principles, we now turn to certain embodiments of head-mounted display devices.

In accordance with some embodiments, a head-mounted display device for providing augmented reality contents to a wearer includes an eye tracker, a light projector, a beam steerer and a combiner (e.g., display device 400 includes eye tracker 408, light projector 402, beam steerer 404 and combiner 410 in FIG. 4A). The eye tracker is configured to determine a position of a pupil of an eye of the wearer (e.g., a position of pupil 406 in FIG. 4A), the light projector is configured to project light (e.g., light 414-1) for rendering images based at least on the augmented reality contents, the beam steerer is configured to change a direction of the light (e.g., light 414-1) from the light projector based on the position of the pupil, and the combiner is configured to combine the light from the light projector and light from an outside of the head-mounted display device for providing an overlap of the rendered image and a real image that corresponds to the light from the outside of the head-mounted display device (e.g., combiner 410 combines light 414-1 projected by light projector 402 with light 416 from the outside of display device 400 (e.g., ambient light) in FIG. 4A).

In some embodiments, the eye tracker includes any eye tracker described herein (e.g., FIGS. 11A-11J).

In some embodiments, the beam steerer includes any beam steerer or any actuator described herein (e.g., FIGS. 4A-4D and 5A-5I).

In some embodiments, the light projector is a focus-supporting light projector (e.g., FIGS. 12A-12E).

In some embodiments, the combiner is any combiner described herein (e.g., FIGS. 6A-6C, 7A-7B, 8, 9A-9E, and 10A-10B).

In some embodiments, the light projector is configured to project the light over an area that is within a 6 mm×6 mm square area on a plane of the pupil of the eye of the wearer (e.g., an area within a 6 mm×6 mm square area on reference plane 407-1 of pupil 406 in FIG. 4A).

In some embodiments, the light projector is configured to project the light over an area with a characteristic dimension of at least 3 mm. This reduces or eliminates underfilling of a pupil.

In some embodiments, the combiner does not include a grating coupled with a waveguide (e.g., combiner 410 in FIG. 4A does not include a grating coupled with a waveguide, which are used in a pupil replicating combiner). In some embodiments, the combiner is not configured to expand the size of a beam using pupil replication.

In some embodiments, the light projector includes one or more of: a spatial light modulator (e.g., FIG. 12C) or a scanning mirror projector (e.g., FIG. 5G).

In some embodiments, the light projector is coupled with one or more adjustable focus lenses (e.g., lens 1204 in FIG. 12D).

In some embodiments, the light projector is coupled with an aperture and one or more lenses (e.g., Maxwellian optics shown in FIG. 12E).

In some embodiments, the beam steerer includes one or more actuators (e.g., actuator 502 in FIG. 5C).

In some embodiments, the combiner includes one or more of: a Fresnel combiner (e.g., FIGS. 9A-9E), a pancake combiner (e.g., FIGS. 10A-10B), an ellipsoidal mirror (e.g., FIG. 8), one or more tunable waveguides (e.g., FIGS. 6A-6C), or a holographic combiner (e.g., FIGS. 7A and 7B).

In some embodiments, the combiner is configured to reflect the light from the light projector and transmit the light from the outside of the head-mounted display device (e.g., in FIG. 4A, combiner 410 reflects light 414-1 projected by light projector 402 and transmits light 416 from the outside of display device 400).

In some embodiments, the eye tracker includes one or more of: a pupil image tracker (e.g., FIG. 11A), a retinal reflux tracker (e.g., FIG. 11D), a depth sensor (e.g., FIG. 11E), or a glint tracker (e.g., FIG. 11B).

In some embodiments, the beam steerer is integrated with the light projector (e.g., in FIG. 4B, component 422 includes beam steerer 404 integrated with light projector 402).

In some embodiments, the beam steerer is integrated with the light combiner (e.g., in FIG. 4C, beam steerer 432 is integrated with combiner 410).

In some embodiments, the eye tracker is integrated with the light projector (e.g., in FIG. 4D, eye tracker 408 is integrated with light projector 402).

In accordance with some embodiments, a method providing augmented reality contents to a wearer using a head-mounted display device (e.g., display device 400 in FIG. 5A) that includes an eye tracker, a light projector, a beam steerer, and a combiner includes determining a position of a pupil of an eye with the eye tracker (e.g., position of pupil 406 is determined by eye tracker 408 in FIG. 4A). The method also includes projecting, with the light projector, light for rendering images based at least on the augmented reality contents and changing, with the beam steerer, a direction of the light from the light projector based on the position of the pupil (e.g., beam steerer 404 changes the direction of beam 414-1 directed toward pupil 406 at a first position in FIG. 5A so that beam 414-2 is directed toward pupil 406 at a second position as shown in FIG. 5B). The method further includes combining, with the combiner, the light from the light projector and light from an outside of the head-mounted display device for providing an overlap of the rendered image and a real image that corresponds to the light from the outside of the head-mounted display device (e.g., combiner 410 combines rays 414-1 and 416 in FIG. 5A).

In some embodiments, the method includes projecting, with the light projector, the light over an area that is within a 6 mm×6 mm square area on a plane of the pupil of the eye of the wearer.

In some embodiments, the method includes projecting, with the light projector, the light over an area with a characteristic dimension of at least 3 mm.

In some embodiments, the combiner does not include a grating coupled with a waveguide.

In some embodiments, the light projector includes one or more adjustable focus lenses.

In some embodiments, the light projector includes the light projector is coupled with an aperture and one or more lenses.

In accordance with some embodiments, a method for providing images to a wearer using a head-mounted display device including a light projector and a beam shifter (e.g., display device 500 includes light projector 402 and actuator 502 in FIG. 5C) includes projecting, with the light projector, light for rendering images (e.g., light 514-1) based at least on virtual reality contents and/or augmented reality contents and changing, with a beam shifter, a path of the light projected from the light projector based on a position of a pupil (e.g., pupil 406) of an eye of the wearer.

In some embodiments, the beam shifter is mechanically coupled with the light projector and changing the path of the light from the light projector includes moving, with the beam shifter, the light projector in a direction that is non-parallel to an optical axis of the light projector. For example, actuator 502 is mechanically coupled with light projector 402 and moving the light projector 402 changed the direction of light 514-1 in FIG. 5C).

In some embodiments, the method includes moving the light projector in a first direction that is non-parallel to the optical axis of the light projector at a first time, and moving the light projector in a second direction that is non-parallel to the first direction and the optical axis of the light projector at a second time. For example, light projector 402 in FIG. 5C is moved, non-parallel to the optical axis of light projector 402, to a second position indicated with light projector 402 in FIG. 5C).

In some embodiments, the head-mounted display device includes a reflector configured to receive the light from the light projector and direct the light toward the pupil of the eye of the wearer. The beam shifter is mechanically coupled with the reflector, and changing the path of the light includes moving, with the beam shifter, the reflector. For example, scanning reflector 515 includes adjustable mirror 516 mechanically coupled with actuator 502, and by moving scanning reflector 515 with actuator 502 changes the direction of light projected by light projector 402 in FIG. 5F.

In some embodiments, the light projected from the light projector has a cross-section that is characterized by a first dimension and a second dimension that is shorter than the first dimension (e.g., cross-section 528 has a longitudinal shape in Section B of FIG. 5I). Moving the reflector includes tilting the reflector about a first axis without tilting the reflector about a second axis that is non-parallel to the first axis (e.g., cross-section 528 in Section B of FIG. 5I is moved in one dimension by tilting adjustable mirror 516 in FIG. 5G in only one direction).

In some embodiments, moving the reflector includes tilting the reflector about a first axis at a first time and tilting the reflector about a second axis that is non-parallel to the first axis at a second time (e.g., cross-section 526-A in Section A of FIG. 5I is moved in two dimensions by tilting adjustable mirror 516 in FIG. 5G in two directions).

In some embodiments, the method includes determining, with an eye tracker (e.g., eye tracker 408 in FIG. 5C) coupled with the head-mounted display device, a position of the pupil of the eye of the wearer.

In accordance with some embodiments, a head-mounted display device for providing images to a wearer includes a light projector configured to project light for rendering images based at least on virtual reality contents and/or augmented reality contents and a beam shifter configured to change a path of the light projected from the light projector based on a position of a pupil of an eye of the wearer (e.g., FIG. 5C).

In some embodiments, the beam shifter is mechanically coupled with the light projector, and the beam shifter is configured to change the path of the light from the light projector by moving the light projector in a direction that is non-parallel to an optical axis of the light projector (e.g., FIG. 5C).

In some embodiments, the beam shifter is configured to move the light projector in a first direction that is non-parallel to the optical axis of the light projector at a first time (e.g., FIGS. 5C and 5D). The beam shifter is also configured to move the light projector in a second direction that is non-parallel to the first direction and the optical axis of the light projector at a second time.

In some embodiments, the beam shifter is configured to move the light projector in a direction that is parallel to the optical axis of the light projector (e.g., light projector 402 at a second position in FIG. 5D is moved, parallel to the optical axis of light projector 402, to a third position 402-3 of light projector 402 shown in FIG. 5E).

In some embodiments, the head-mounted display device includes a lens optically coupled with the light projector, and the device further includes a beam shifter configured to move the lens in a direction that includes a component parallel to the optical axis of the light projector (e.g., one or more lenses 412 at a first position in FIG. 5C is moved, parallel to light projector 402, to a second position in FIG. 5D).

In some embodiments, the device includes a holographic combiner configured to receive the light projected from the light projector and direct the light toward the pupil of the eye of the wearer. The holographic combiner includes a holographic optical element located on a transparent substrate (e.g., holographic combiner 700 includes holographic optical element 702 on substrate 708 in FIG. 7A). The holographic optical element includes a first portion (e.g., portion 706-1) configured to direct a light (e.g., ray 704-1), from the light projector, impinging on the first portion of the holographic optical element in a first direction (e.g., toward pupil 406). The holographic optical element also includes a second portion (e.g., portion 706-2) configured to direct a light (e.g., ray 704-2), from the light projector, impinging on the second portion of the holographic optical element in a second direction (e.g., toward pupil 406) that is distinct from the first direction. The holographic optical element further includes third portion (e.g., portion 706-3) configured to direct a light (e.g., ray 704-3), from the light projector, impinging on the third portion of the holographic optical element in a third direction (e.g., toward pupil 406) that is distinct from the first direction, the second direction, and the third direction.

In some embodiments, the head-mounted display device includes a reflector (e.g., adjustable mirror 516-1 in FIG. 5G) configured to receive the light from the light projector and direct the light toward the pupil of the eye of the wearer. The beam shifter (e.g., actuator 502) is mechanically coupled with the reflector, and the beam shifter is configured to change the path of the light by moving the reflector.

In some embodiments, the light projected from the light projector has a cross-section that is characterized by a first dimension and a second dimension that is shorter than the first dimension (e.g., FIG. 5G and FIG. 5I). The beam shifter is configured to move the reflector by tilting the reflector about a first axis without tilting the reflector about a second axis that is non-parallel to the first axis.

In some embodiments, the beam shifter is configured to move the reflector by tilting the reflector about a first axis at a first time and tilting the reflector about a second axis that is non-parallel to the first axis at a second time (e.g., FIG. 5G and FIG. 5I).

In some embodiments, the head-mounted display device is coupled with an eye tracker configured to determine a position of the pupil of the eye of the wearer (e.g., eye tracker 408 in FIG. 5G).

In some embodiments, the beam shifter includes a tunable waveguide (e.g., tunable waveguide 600 in FIGS. 6A-6C). The tunable waveguide includes a waveguide (e.g., waveguide 602) configured to receive the light projected from the light projector (e.g., light 606). The waveguide also includes a plurality of individually-addressable control regions located adjacent to the waveguide along the waveguide (e.g., tunable optical elements 604-1 and 604-2). A respective region of the plurality of individually-addressable control regions is configured to have a first optical thickness under a first operating condition and a second optical thickness that is distinct from the first optical thickness under a second operation condition that is distinct from the first operating condition (e.g., tunable optical element 604-1 has a first optical thickness in FIG. 6A and a second optical thickness in FIG. 6C). The tunable waveguide is configured to propagate the received light through the waveguide at a location that corresponds to the respective region while the respective region has the first optical thickness (e.g., in FIG. 6A, light 606 is propagates through waveguide 602 after impinging on tunable optical element 604-1 with the first optical thickness) and emit at least a portion of the received light from the waveguide at the location that corresponds to the respective region while the respective region has the second optical thickness (e.g., in FIG. 6C, light 606 is emitted from waveguide 602 after impinging on tunable optical element 604-1 with the second optical thickness).

In some embodiments, the beam shifter includes a holographic combiner (e.g., holographic combiner 710 includes waveguide 714 in FIG. 7B). The holographic combiner includes a waveguide configured to receive the light projected from the light projector. The holographic combiner also includes one or more holographic optical elements (e.g., holographic optical element 702) located adjacent to the waveguide and one or more tunable prisms (e.g., prism 712) located adjacent to the one or more holographic optical elements.

In some embodiments, the one or more tunable prisms include one or more of: a liquid prism or a liquid crystal prism (e.g., prism 712 in FIG. 7B).

In accordance with some embodiments, a head-mounted display device (e.g., display device 100 in FIG. 1) for providing augmented reality contents to a wearer includes a first light projector configured to project light for rendering images based at least on the augmented reality contents (e.g., light projector 402 in FIG. 4A), and a first Fresnel combiner (e.g., Fresnel combiner 900 in FIG. 6A) configured to combine the light from the first light projector (e.g., rays 910-1, 910-2, and 910-3 in FIG. 6A) and light from an outside of the head-mounted display device (e.g., light 416 in FIG. 6A) for providing an overlap of the rendered image and a real image that corresponds to the light from the outside of the head-mounted display device.

In some embodiments, the first Fresnel combiner includes a first optically transparent substrate having a first surface and a second surface that is opposite to the first surface (e.g., Fresnel combiner 900 includes substrate 902 with surface 902-1 and 902-2 in FIG. 6A). The first Fresnel combiner includes a plurality of Fresnel structures on the second surface (e.g., surface 902-2 includes Fresnel structures defined by slope facets 904-1, 904-2, and 904-3, and adjacent draft facets 912-1, 912-2, and 912-3).

In some embodiments, the first Fresnel combiner has no Fresnel structure on the first surface (e.g., surface 902-1 is a smooth and flat surface in FIG. 9A).

In some embodiments, the first Fresnel combiner is configured to reflect the light from the first light projector and transmit the light from the outside of the head-mounted display device (e.g., rays 910-1, 910-2, and 910-3 emitted by light projector 402 are reflected at surface 902-2 and light 416 from the outside of the head-mounted display 416 is transmitted through Fresnel combiner 900 in FIG. 9A).

In some embodiments, the first light projector is positioned away from a path of the light, from the outside of the head-mounted display device, transmitted through the first Fresnel combiner (e.g., light projector 402 is positioned away from light 416 in FIG. 9A).

In some embodiments, the first light projector is located away from an optical axis of the first Fresnel combiner (e.g., light projector 402 is located away from an optical axis of Fresnel combiner 900 in FIG. 9A).

In some embodiments, the first Fresnel combiner includes one or more wavelength-selective optical coatings on at least a portion of the second surface (e.g., slope facets 904-1, 904-2, and 904-3 of Fresnel combiner 900 include optical coatings in FIG. 9A).

In some embodiments, the one or more wavelength-selective optical coatings include at least one optical coating that has a first index of refraction for light of a first color and a second index of refraction, distinct from the first index of refraction, for light of a second color that is distinct from the first color so that the first Fresnel combiner reflects the light of the first color projected from the first light projector and forgoes reflecting the light of the second color projected from the first light projector. For example, in FIG. 9A optical coating of slope facet 904-1 has a selective index of refraction for first wavelength range (e.g., red color) and thereby reflects light within the first wavelength range while transmitting light with wavelength outside the first wavelength range. Optical coating of slope facet 904-2 has a selective index of refraction for a second wavelength range (e.g., green color) and thereby reflects light within the second wavelength range while transmitting light with wavelength outside the second wavelength range.

In some embodiments, the first Fresnel combiner includes a second optically transparent substrate having a third surface and a fourth surface that is opposite to the third surface, and the first Fresnel combiner includes a plurality of Fresnel structures on the third surface (e.g., substrate 922 includes surface 922-1 and surface 922-2, which has a plurality of Fresnel structures in FIG. 9B).

In some embodiments, the first Fresnel combiner has no Fresnel structure on the fourth surface (e.g., surface 922-1 is smooth and flat surface in FIG. 9B).

In some embodiments, the plurality of Fresnel structures on the third surface is configured to mate with the plurality of Fresnel structures on the second surface (e.g., surface 922-2 is configured to mate with surface 902-2 in FIG. 9B).

In some embodiments, the first optically transparent substrate and the second optically transparent substrate are made of a first material having a first index of refraction (e.g., substrates 902 and 922 in FIG. 9B). The plurality of Fresnel structures on the second surface is separated from the plurality of Fresnel structures on the third surface (e.g., surfaces 902-2 and 922-2 define a spacing between them). A spacing between the plurality of Fresnel structures on the second surface and the plurality of Fresnel structures on the third surface is filled with a second material having a second index of refraction that is less than the first index of refraction (e.g., in some embodiments, the spacing defined by surfaces 902-2 and 922-2 is filled with an optically transparent material with different index of refraction than the index of refraction of substrates 902 and 922 in FIG. 9C).

In some embodiments, the first Fresnel combiner is configured to reflect the light from the first light projector by total internal reflection within the first optically transparent substrate.

In some embodiments, the first Fresnel combiner is configured to transmit the light from the outside of the head-mounted display device (e.g., light 416 in FIG. 9B) through the first optically transparent substrate, the second material in the spacing between the plurality of Fresnel structures on the second surface and the plurality of Fresnel structures on the third surface, and the second optically transparent substrate.

In some embodiments, the head-mounted display device further includes one or more prisms optically coupled with the first surface of the first Fresnel combiner (e.g., Fresnel combiner 940 includes prism 942-2 optically coupled with surface 902-1 in FIG. 9D).

In some embodiments, the head-mounted display device further includes one or more prisms optically coupled with the fourth surface of the first Fresnel combiner (e.g., Fresnel combiner 940 includes prism 942-1 optically coupled with surface 922-1 in FIG. 9D).

In some embodiments, the head-mounted display device further includes an eye tracker (e.g., eye tracker 408 in FIG. 4A) configured to determine a position of a pupil of an eye of the wearer (e.g., pupil 406), and a beam steerer (e.g., beam steerer 404 in FIG. 4A) configured to change a direction of the light from the first light projector based on the position of the pupil.

In some embodiments, the first light projector is configured to project light of a first color. In such embodiments, the head-mounted display device further includes a second light projector configured to project light of a second color for rendering images based at least on the augmented reality contents the second color being distinct from the first color (e.g., light projector 402 includes one or more light sources, and projects ray 910-2 with first color and ray 910-4 with second color in FIG. 9E), and a second Fresnel combiner configured to combine the light from the second light projector and light from the outside of the head-mounted display device for providing an overlap of the rendered image and the real image (e.g., Fresnel combiner 902 combines ray 910-4 and light 416 from the outside of the head-mounted display device in FIG. 9E).

In some embodiments, the head-mounted display device further includes a third light projector configured to project light of a third color for rendering images based at least on the augmented reality contents. The third color is distinct from the first color and the second color. The head-mounted display device also includes a third Fresnel combiner configured to combine the light from the third light projector and light from the outside of the head-mounted display device for providing an overlap of the rendered image and the real image.

In accordance with some embodiments, a method providing augmented reality contents to a wearer using a head-mounted display device that includes a first light projector (e.g., light projector 402 in FIG. 9A) and a first Fresnel combiner (e.g., Fresnel combiner 900) includes projecting, with the first light projector, light for rendering an image based at least on the augmented reality contents (e.g., rays 910-1, 910-2, and 910-3) and combining, with the first Fresnel combiner, the light from the first light projector and light from an outside of the head-mounted display device (e.g., light 416) for providing an overlap of the rendered image and a real image that corresponds to the light from the outside of the head-mounted display device.

In accordance with some embodiments, a head-mounted display device for providing augmented reality contents to a wearer includes a light projector and a pancake combiner (e.g., light projector 402 and pancake combiner 1000 in FIG. 10A). The light projector is configured to project a light having a first polarization for rendering images based at least on the augmented reality contents (e.g., ray 1008-1 projected by light projector 402 is polarized). The pancake combiner is configured to combine the light from the light projector (e.g., ray 1008-1) and light from an outside of the head-mounted display device (e.g., light 416) for providing an overlap of the rendered image and a real image that corresponds to the light from the outside of the head-mounted display device. The pancake combiner is also configured to direct the light from the light projector toward a pupil of an eye the wearer (e.g., pupil 406).

In some embodiments, the light projector (e.g., light source 402 in FIG. 10A) includes a light source coupled with a polarizer. In some embodiments, the light projector includes a light source emitting polarized light (e.g., a light source including one or more LEDs).

In some embodiments, the pancake combiner includes a first partial reflector, a first polarizer, and a second partial reflector (e.g., pancake combiner 1000 includes partial reflector 1002, polarizer 1004, and partial reflector 1006 in FIG. 4A).

In some embodiments, the first polarizer is configured to receive the light having the first polarization and convert the light having the first polarization to a light having a second polarization (e.g., polarizer 1004 receives ray 1008-1 with a linear polarization in the z-direction and converts it to ray 1008-1 with a right-handed circular polarization in FIG. 10A) and to receive a light having a third polarization and convert the light having the third polarization to a light having a fourth polarization (e.g., polarizer 1004 receives ray 1008-1 with a left-handed circular polarization and converts it to ray 1008-1 with a linear polarization in the x-direction 1). The first partial reflector is configured to transmit at least a portion of the light having the first polarization and to reflect at least a portion of the light having the fourth polarization (e.g., partial reflector 1002 transmits ray 1008-1 with the linear polarization in the z-direction and reflects ray 1008-1 with the linear polarization in the x-direction). The second partial reflector is configured to reflect at least a portion of the light having the second polarization and to reflect at least a portion of the light having the third polarization (e.g., partial reflector 1006 reflects ray 1008-1 with the right-handed circular polarization and ray 1008-1 with the left-handed circular polarization).

In some embodiments, the first polarizer is a quarter-wave plate (e.g., polarizer 1004 is a quarter-wave plate in FIG. 10A).

In some embodiments, the first partial reflector is configured to transmit a portion of a light directed to the first partial reflector and to reflect a portion of the light directed to the first partial reflector independent of a polarization of the light directed to the first partial reflector (e.g., partial reflector 1002 is a 50/50 mirror in FIG. 10A). The second partial reflector is configured to transmit a portion of a light directed to the second partial reflector and to reflect a portion of the light directed to the second partial reflector independent of a polarization of the light directed to the second partial reflector (e.g., partial reflector 1006 is a 50/50 mirror).

In some embodiments, the first partial reflector is a first polarization dependent mirror configured to transmit the light having the first polarization and to reflect the light having the fourth polarization (e.g., partial reflector 1002 is a polarization dependent mirror transmitting light with a linear polarization in the z-direction and reflecting light with a linear polarization in the x-direction in FIG. 10A). The second partial reflector is a second polarization dependent mirror configured to reflect the light having the second polarization and to transmit light having the first polarization (e.g., partial reflector 1006 is a polarization dependent mirror reflecting light with a right-handed circular polarization and transmitting light with a linear polarization).

In some embodiments, the light having the first polarization has a first wavelength, and the second partial reflector is a wavelength dependent reflector configured to reflect the light having the first polarization having the first wavelength and to transmit light having a second wavelength that is distinct from the first wavelength (e.g., ray 1008-1 has a first wavelength, and partial reflector 1006 is a wavelength-selective mirror reflecting ray 1008-1 with the first wavelength and transmitting light with other wavelengths in FIG. 10A).

In some embodiments, the light having the first polarization has a first wavelength, a second wavelength distinct from the first wavelength, and a third wavelength distinct from the first wavelength and the second wavelength (e.g., ray 1008-1 includes light with three distinct wavelengths, such as blue, green and red in FIG. 10A. The second partial reflector is a wavelength dependent reflector configured to reflect the light having the first polarization at the first wavelength, the second wavelength, and the third wavelength, and to transmit light having a fourth wavelength that is distinct from the first wavelength, the second wavelength, and the third wavelength (e.g., partial mirror 1006 is a wavelength-selective mirror reflecting light with the three distinct wavelengths of ray 1008-1 and transmitting light with other wavelengths).

In some embodiments, the first polarization is a linear polarization oriented in a first direction (e.g., a linear polarization in the z-direction in FIG. 10A), the second polarization is a first circular polarization (e.g., a right-handed circular polarization), the third polarization is a second circular polarization that is distinct from the first circular polarization (e.g., a left-handed circular polarization), and the fourth polarization is a linear polarization oriented in a second direction that is distinct from the first direction (e.g., a linear polarization in the x-direction).

In some embodiments, the second partial reflector is curved (e.g., partial reflector 1006 is curved in FIG. 10A).

In some embodiments, the second partial reflector includes a parabolic reflective surface (e.g., partial reflector 1006 includes a parabolic reflective surface in FIG. 10A).

In some embodiments, the second partial reflector is configured to change a direction of the light projected by the light projector based on the position of the pupil of the eye of the wearer by modifying a position and/or an orientation of the parabolic partial mirror (e.g., in FIG. 10B, position of pancake combiner 1000 is modified to change the direction of ray 1008-2 so that ray 1008-2 is directed toward pupil 406 at a second gaze direction).

In some embodiments, the pancake combiner is configured to allow at least a portion of the light from the outside of the head-mounted display device transmit through the pancake combiner (e.g., pancake combiner 1000 allows at least a portion of light 416 transmit through in FIG. 10A).

In some embodiments, the light projector is positioned away from a path of the light, from the outside of the head-mounted display device, transmitted through the pancake combiner (e.g., light projector 402 is positioned away from a path of light 416 in FIG. 10A).

In some embodiments, the light projector is positioned away from an optical axis of the pancake combiner (e.g., light projector 402 is positioned away from an optical axis of pancake combiner 1000 in FIG. 10A).

In some embodiments, a beam steerer configured to change a direction of the light from the light projector based on the position of the pupil of the eye of the wearer (e.g., beam steerer 404 is configured to change a direction of light 414-1 based on position of pupil 406 in FIG. 4A).

In accordance with some embodiments, a method providing augmented reality contents to a wearer using a head-mounted display device including a light projector and a pancake combiner (e.g., light projector 402 and pancake combiner 1000 in FIG. 10A) includes projecting, with the light projector, a light having a first polarization (e.g., ray 1008-1) for rendering an image based at least on the augmented reality contents and combining, with the pancake combiner, the light from the light projector (e.g., ray 1008-1) and light from an outside of the head-mounted display device (e.g., light 416) for providing an overlap of the rendered image and a real image that corresponds to the light from the outside of the head-mounted display device. The pancake combiner is configured to direct the light from the light projector toward a pupil of an eye the wearer (e.g., pupil 406).

In some embodiments, the pancake combiner includes a first partial reflector, a first polarizer, and a second partial reflector (e.g., partial reflector 1002, polarizer 1004, and partial reflector 1006 in FIG. 10B). The method further includes transmitting through the first partial reflector at least a portion of the light having the first polarization, transmitting through the first polarizer at a first time the light having the first polarization from the first partial reflector, and reflecting, with the second partial reflector, at least a portion of the light transmitted through the first polarizer for the first time toward the first polarizer. The method also includes transmitting through the first polarizer at a second time the light reflected by the second partial reflector, and reflecting, with the first partial reflector, at least a portion of the light transmitted through the first polarizer at the second time toward the first polarizer. The method also includes transmitting through the first polarizer at a third time the light reflected by the first partial reflector, reflecting, with the second partial reflector, at least a portion of the light transmitted through the first polarizer at the third time, transmitting through the first polarizer at a fourth time the light reflected by the second partial reflector, and transmitting, through the first partial reflector, at least a portion of the light transmitted through the first polarizer at the fourth time toward the pupil of the eye of the wearer.

In accordance with some embodiments, a head-mounted display device (e.g., display device 400 in FIG. 4A) for providing augmented reality contents to a wearer includes a light projector (e.g., light projector 402) configured to project light for rendering images based at least on the augmented reality contents, an eye tracker (e.g., eye tracker 408) configured to determine a position of a pupil of an eye of the wearer, and a beam steerer (e.g., beam steerer 404) configured to change a direction of the light from the light projector based on the position of the pupil.

In some embodiments, the eye tracker is integrated with the light projector to form an integrated combination of the eye tracker and the light projector, and the beam steerer is optically coupled with the integrated combination of the eye tracker and the light projector. For example, component 442 includes eye tracker 408 integrated with light projector 402 in FIG. 4D. Component 442 is optically coupled with beam steerer 404.

In some embodiments, the device further includes one or more lenses optically coupled with the integrated combination of the eye tracker and the light projector (e.g., one or more lenses 412 are optically coupled with component 442 in FIG. 4D). The light projected by the light projector and the light reflected from the eye of the wearer is detected by the infrared detector are both transmitted by the one or more lenses (e.g., light 414-1 and ray 444-1 are both transmitted by one or more lenses 412).

In some embodiments, the one or more lenses are adjustable focus lenses (e.g., one or more lenses 412 are adjustable focus lenses).

In some embodiments, the device further includes a combiner configured to combine the light from the light projector and light from an outside of the head-mounted display device for providing an overlap of the rendered image and a real image that corresponds to the light from the outside of the head-mounted display device (e.g., combiner 410 combines light 414-1 projected from light projector 402 and ray 418 from an outside of display device 400 in FIG. 4A).

In some embodiments, the combiner is optically coupled with the integrated combination of the eye tracker and the light projector (e.g., combiner 410 is optically coupled with component 442 in FIG. 4D).

In some embodiments, the light projector is configured to project light over an area that is within 6 mm×6 mm square area on a plane of the pupil of the eye of the wearer (e.g., light projector 402 projects light, such as light 414-1, over an area that is within 6 mm×6 mm square area on reference plane 407-1 of pupil 406 in FIG. 4A), and the direction of the light from the light projector is adjusted by the beam steerer (e.g., beam steerer 404 adjusts the direction of light 414-1), based on the position of the pupil determined by the eye tracker.

In some embodiments, the eye tracker includes a camera configured to obtain an image of the pupil of the eye of the wearer (e.g., eye tracker 408-1 includes a camera that captures an image of eye 1100 in FIG. 11A).

In some embodiments, the light projector includes an infrared light source configured to project infrared light toward at least a portion of a retina of the eye of the wearer, and the eye tracker includes an infrared detector configured to detect reflection of the infrared light from the retina of the eye of the wearer. In some embodiments, the infrared detector is a photodiode. For example, eye tracker 408-3 includes an IR light source that projects ray 1114 toward the retina of eye 1100 and eye tracker 408-3 includes an IR detector (e.g., a photodiode) that detects ray 1116 reflected on the retina of eye 1100 in FIG. 11D.

In some embodiments, the eye tracker includes a sensor configured to determine a distance to a surface on the eye of the wearer for determination of the position of the pupil of the eye of the wearer (e.g., eye tracker 408-4 includes a depth sensor, which determines a distance, such as distance 1116-1, to surface of eye 1100 for determination of the position of pupil 406 in FIG. 11E).

In some embodiments, the sensor is configured to determine the position of the pupil of the eye of the wearer by scanning a predefined area that includes the pupil of the eye of the wearer and obtaining a contour profile of the surface of the eye of the wearer. For example, in FIG. 11E, a predefined area including pupil 406 of eye 1100 is scanned by rays having distances 1116-1, 1116-2, and 1116-3 for obtaining a contour profile of the surface of eye 1100. As another example, in FIG. 11F, a predefined area including pupil 406 of eye 1100 is scanned by one ray in a pattern for obtaining a contour profile of the surface of eye 1100. In some embodiments, scanning the predefined area that includes the pupil of the eye of the wearer comprises scanning in a raster pattern. In some embodiments, the contour profile of the surface of the eye of the wearer comprises a low resolution profile of the surface of the eye of the wearer.

In some embodiments, the light projector is configured to project a patterned light to the eye of the wearer, and the eye tracker is a camera configured to capture an image of a reflection of the patterned light, reflected on a surface of the eye of the wearer. For example, eye tracker 408-2 includes a light projector that projects ray 1104-1 with a structured pattern (e.g., patterns in FIG. 11C) to eye 1100 and eye tracker 408-2 includes a camera that captures an image of ray 1104-2 reflected from the surface of eye 1100 in FIG. 11B.

In some embodiments, the light projector is configured to provide a light to the eye of the wearer (e.g., eye tracker 408-2 includes a light projector for providing rays 1104-1 and 1106-2 to eye 1100 in FIG. 11B), and produce a reflection on a surface the eye of the wearer. At least a portion of the light produces a first reflection on a peripheral surface of a cornea of the eye of the wearer (e.g., ray 1104-2) and at least a portion of the light produces a second reflection on a surface of a lens of the eye of the wearer (e.g., ray 1106-2). The eye tracker is configured detect a first intensity of the first reflection and a second intensity of the second reflection, and to determine, based on the first intensity and the second intensity, the position of the pupil of the eye of the wearer (e.g., pupil 406 of eye 1100).

In accordance with some embodiments, a method for providing augmented reality contents to a wearer using a head-mounted display device (e.g., display device 400 in FIG. 4A) that includes an eye tracker (e.g., eye tracker 408), a light projector (e.g., light projector 402), and a beam steerer (e.g., beam steerer 404) includes determining, with the eye tracker, a position of a pupil of an eye of the wearer (e.g., pupil 406) and projecting, with the light projector, light (e.g., light 414-1) for rendering images based at least on the augmented reality contents. The method also includes changing, with the beam steerer, a direction of the light (e.g., direction of light 414-1) from the light projector based on the position of the pupil.

In some embodiments, determining, with the eye tracker, the position of the pupil of the eye of the wearer includes obtaining an image of the pupil of the eye of the wearer. For example, eye tracker 408-1 captures an image of eye 1100 to determine position of pupil 406 in FIG. 11A).

In some embodiments, determining, with the eye tracker, the position of the pupil of the eye of the wearer includes providing an infrared light (e.g., ray 1114 in FIG. 11D) to the eye of the wearer, and detecting, by an infrared detector, a light reflected from a retina of the eye of the wearer (e.g., ray 1116 in FIG. 11D).

In some embodiments, determining, with the eye tracker, the position of the pupil of the eye of the wearer includes determining a distance to a surface on the eye of the wearer (e.g., FIG. 11E).

In some embodiments, determining the distance to the surface on the eye of the wearer includes scanning, with a sensor, a predefined area that includes the pupil of the eye of the wearer and obtaining a contour profile of the surface of the eye of the wearer (e.g., FIG. 11E and FIG. 11F).

In some embodiments, determining, with the eye tracker, the position of the pupil of the eye of the wearer includes projecting, with the light projector, a patterned light to the eye of the wearer, and capturing, with a camera, an image of a reflection of the patterned light, reflected on the surface of the eye of the wearer (e.g., FIG. 11B and FIG. 11C).

In some embodiments, determining, with the eye tracker, the position of the pupil of the eye of the wearer includes providing, with the light projector, a light to the eye of the wearer and producing a reflection on a surface the eye of the wearer. At least a portion of the light produces a first reflection on a peripheral surface of a cornea of the eye of the wearer and at least a portion of the light produces a second reflection on a surface of a lens of the eye of the wearer. Determining, with the eye tracker, the position of the pupil of the eye further includes detecting, with the eye tracker, a first intensity of the first reflection and a second intensity of the second reflection, and determining, based on the first intensity and the second intensity, the position of the pupil of the eye of the wearer (e.g., FIG. 11B).

In accordance with some embodiments, a method for providing augmented reality contents to a wearer using a head-mounted display device that includes an eye tracking sensor, a light projector, a beam steerer, and a combiner, includes determining, with the eye tracking sensor, a position of a pupil of an eye of the wearer and projecting, with the light projector, light for rendering images based at least on the augmented reality contents. The method also includes changing, with the beam steerer, a direction of the light from the light projector based on the position of the pupil. The light from the beam steerer is directed toward the combiner, and the light from the beam steerer and light from an outside of the head-mounted display device are combined, by the combiner, to provide an overlap of a rendered image and a real image that corresponds to the light from the outside of the head-mounted display device. For example, display device 400 includes eye tracker 408, light projector 402, beam steerer 404 and combiner 410 in FIG. 4A. Eye tracker 408 is configured to determine a position of pupil 406. Light projector is configured to project light 414-1 for rendering images based at least on the augmented reality contents and beam steerer 404 is configured to change a direction of light 414-1 based on the position of pupil 406. Beam steerer directs light 414-1 to combiner 410, which reflects light 414-1 toward pupil 406 and combines light 414-1 with light 416 coming from the outside display device 400.

In some embodiments, the eye tracking sensor includes a light source configured for providing an eye tracking light and a detector configured for receiving the eye tracking light that has been reflected from the eye. For example, eye tracker 408-5 includes light source 1121 and detector 1123 in FIG. 11G. Determining, with the eye tracking sensor, the position of the pupil of the eye of the wearer includes providing the eye tracking light from the light source toward the eye (e.g., ray 1120 emitted by light source 1121 toward eye 1100 in FIG. 11G) and detecting, with the detector, the eye tracking light that has been reflected from the eye (e.g., reflected ray 1122 is detected by detector 1123 in FIG. 11G). Determining the position of the pupil of the eye of the wearer also includes determining distance information from the eye tracking sensor to the eye based on timing information represented by the eye tracking light from the light source and the detected eye tracking light, and determining the position of the pupil of the eye of the wearer based on the distance information. For example, FIG. 11I illustrates time information for pulsed light 1120-1 emitted by light source 1121 at time T0, and pulses 1122-1 and 1122-2 detected by detector 1123 at times T1 and T2, respectively. Position of pupil 406 in FIG. 11G and FIG. 11H is determined based respective optical distances travelled by the pulses during their time-of-flights T1-T0 and T2-T1.

In some embodiments, determining the timing information based on a first time that corresponds to a time when the eye tracking light is provided from the light source toward the eye (e.g., time T1 in FIG. 11I) and a second time that corresponds to a time when the eye tracking light, reflected from the eye, is detected by the detector (e.g., time T1 in FIG. 11I).

In some embodiments, determining the second time with an avalanche photodiode (e.g., detector 1123 is an avalanche photodiode in FIG. 11G).

In some embodiments, the eye tracking sensor includes a light source configured for providing an eye tracking light (e.g., light source 1124 in the inset of FIG. 11J) and a detector configured for receiving at least the eye tracking light that has been reflected from the eye (e.g., detector 1126 in the inset of FIG. 11J). Determining, with the eye tracking sensor, the position of the pupil of the eye of the wearer includes providing the eye tracking light from the light source toward the eye (e.g., ray 1128 in FIG. 11J) and determining the position of the pupil of the eye of the wearer based on phase information represented by the eye tracking light from the light source and the eye tracking light reflected from the eye (e.g., a position of pupil 406 is determined based on interference between ray 1130 reflected by a surface of eye 1100 and reference ray 1132-3 reflected by mirror 1134 in the inset of FIG. 11J).

In some embodiments, determining the phase information represented by the eye tracking light from the light source and the eye tracking light reflected from the eye includes determining a phase difference between the eye tracking light from the light source and the eye tracking light reflected from the eye (e.g., a position of pupil 406 is determined based on a phase difference between ray 1130 reflected by a surface of eye 1100 and reference ray 1132-3 reflected by mirror 1134 in the inset of FIG. 11J).

In some embodiments, the eye tracking sensor is a low-resolution image sensor or a single-pixel sensor (e.g., eye trackers 408-5 and 408-6 include a low-resolution image sensor or a single-pixel sensor in FIG. 11G and FIG. 11J, respectively).

In some embodiments, the eye tracking sensor includes a light source configured for providing an eye tracking light and a detector configured for receiving the eye tracking light that has been reflected from the eye (e.g., eye tracker 408-3 includes a light source providing ray 1114 toward eye 1100 and a detector detecting ray 1116 that has been reflected by a surface of eye 1100 in FIG. 11D). Determining, with the eye tracking sensor, the position of the pupil of the eye of the wearer includes providing the eye tracking light from the light source toward the eye, detecting, with the detector, the eye tracking light that has been reflected from the eye, and determining the position of the pupil of the eye of the wearer based on a polarization difference between the eye tracking light from the light source and the eye tracking light that has been reflected from the eye. For example, in FIG. 11D, polarizer 1115 is positioned on the optical path of ray 1114 or on the optical path of reflected ray 1116, so that light detected by detector of eye tracker 408-3 is polarized. When ray 1114 enters pupil 406 and is reflected by the retina of eye 1100, eye tracker 408-3 detects ray 1116 as an image with a distinguishable pattern due to birefringence properties of the retina of eye 1100.

In some embodiments, the eye tracking light provided toward the eye is polarized and the method includes transmitting the eye tracking light that has been reflected from the eye through one or more polarizing elements (e.g., ray 1116 is polarized by polarizer 1115 in FIG. 11D).

In some embodiments, the method includes transmitting the eye tracking light from the light source through one or more polarizing elements (e.g., ray 1114 is polarized by polarizer 1115).

In accordance with some embodiments, a head-mounted display device for providing augmented reality contents to a wearer, the device includes an eye tracking sensor configured to determine a position of a pupil of an eye of the wearer, a light projector configured to project light for rendering images based at least on the augmented reality contents, a beam steerer configured to change a direction of the light from the light projector based on the position of the pupil, and a combiner configured to combine the light from the light projector and light from an outside of the head-mounted display device for providing an overlap of the rendered image and a real image that corresponds to the light from the outside of the head-mounted display device (e.g., display device 400 in FIG. 4A).

In some embodiments, the eye tracking sensor includes a light source configured to provide the eye tracking light toward the eye and a detector configured to receive the eye tracking light that has been reflected from the eye (e.g., FIG. 11G). The device is configured to determine distance information from the eye tracking sensor to the eye based on timing information represented by the eye tracking light from the light source and the received eye tracking light. The device is also configured to determine the position of the pupil of the eye of the wearer based on the distance information.

In some embodiments, the device is configured to determine the timing information based on a first time that corresponds to a time when the eye tracking light is provided from the light source toward the eye and a second time that corresponds to a time when the eye tracking light, reflected from the eye, is detected by the detector (e.g., FIG. 11I).

In some embodiments, the eye tracking sensor includes an avalanche photodiode configured to determine the second time (e.g., detector 1123 is an avalanche photodiode in FIG. 11G).

In some embodiments, the eye tracking sensor includes a light source configured to provide the eye tracking light toward the eye and a detector configured to receive the eye tracking light that has been reflected from the eye (e.g., the inset of FIG. 11J). The device is configured to determine the position of the pupil of the eye of the wearer based on phase information represented by the eye tracking light from the light source and the eye tracking light reflected from the eye.

In some embodiments, the device is configured to determine the phase information represented by the eye tracking light from the light source and the eye tracking light reflected from the eye includes determining a phase difference between the eye tracking light from the light source and the eye tracking light reflected from the eye (e.g., the inset of FIG. 11J).

In some embodiments, the eye tracking sensor is a low-resolution image sensor or a single-pixel sensor (e.g., eye trackers 408-5 and 408-6 in FIG. 11G and FIG. 11J, respectively).

In some embodiments, the eye tracking sensor includes a light source configured to provide an eye tracking light toward the eye and a detector configured to receive the eye tracking light that has been reflected from the eye. The device is configured to determine the position of the pupil of the eye of the wearer based on a polarization difference between the eye tracking light from the light source and the eye tracking light that has been reflected from the eye (e.g., FIG. 11D).

In some embodiments, the device includes one or more polarizing elements configured for transmitting the eye tracking light that has been reflected from the eye. The eye tracking light provided toward the eye is polarized (e.g., polarizer 1115 in FIG. 11D).

In some embodiments, the device includes one or more polarizing elements configured for transmitting the eye tracking light from the light source (e.g., polarizer 1115 in FIG. 11D).

In accordance with some embodiments, a head-mounted display device for providing images to a wearer includes a focus-supporting light projector (e.g., a combination of light projector 402 and lens 412 coupled to actuator 502, as shown in FIG. 12A) configured to project light for rendering images based at least on virtual reality contents and/or augmented reality contents. The light projected from the focus-supporting light projector corresponds to an image plane that is selected based at least in part on a position of a pupil of an eye of the wearer. The device also includes a beam steerer configured to change a path of the light projected from the focus-supporting light projector based on the position of the pupil of the eye of the wearer.

In some embodiments, the focus-supporting light projector includes: a light source (e.g., light source 402 in FIG. 12A) configured to project an image; one or more lenses (e.g., one or more lenses in FIG. 12A) optically coupled with the light source to transmit the image projected from the light source; and one or more actuators (e.g., actuator 502 in FIG. 12A) mechanically coupled with the one or more lenses and configured to move the image plane that corresponds to the light projected from the focus-supporting light projector.

In some embodiments, the focus-supporting light projector includes: a light source configured to project an image; and one or more lenses optically coupled with the light source to transmit the image projected from the light source, the one or more lenses including a multi-focal lens (e.g., a high-speed tunable lens configured to provide different focal lengths for different regions of a display).

In some embodiments, the focus-supporting light projector includes: a light source configured to project an image; one or more spatial light modulators (e.g., spatial modulator 1202 in FIG. 12C) optically coupled with the light source to modify the image projected from the light source; and one or more lenses optically coupled with the one or more spatial light modulators to transmit the image modified by the one or more spatial light modulators.

In some embodiments, the focus-supporting light projector includes: a light source configured to project an image; one or more lenses optically coupled with the light source to transmit the image projected from the light source; and one or more actuators (e.g., actuator 502 in FIG. 12B) mechanically coupled with the light source and configured to move the light source so that the image plane that corresponds to the light projected from the focus-supporting light projector is moved.

In some embodiments, the focus-supporting light projector includes a lens selected from a group consisting of an electro-wetting lens, a liquid lens, and a liquid crystal lens.

In some embodiments, the focus-supporting light projector includes: a light source configured to project an image; a blocker defining an aperture (e.g., blocker 1206 in FIG. 12E), the blocker optically coupled with the light source to transmit the image projected by the light source through the aperture; and one or more focusing elements configured to focus the image transmitted through the aperture.

In some embodiments, the device includes an eye tracker (e.g., eye tracker 408 in FIG. 12A) configured to determine the position of the pupil of the eye of the wearer.

In some embodiments, the device includes a first eye tracker (e.g., eye tracker 408-1 in FIG. 12F) configured to determine a position of a pupil of a first eye of the wearer; a second eye tracker (e.g., eye tracker 408-2 in FIG. 12F) configured to determine a position of a pupil of a second eye, of the wearer, that is distinct from the first eye of the wearer; and one or more processors configured to determine a vergence based on the position of the pupil of the first eye of the wearer and the position of the pupil of the second eye of the wearer. The light projected from the focus-supporting light projector corresponds to an image plane that is selected based on the position of the pupil of the eye of the wearer and the determined vergence (e.g., an image of object 1270 corresponds to an image plane selected based on the determined vergence).

In some embodiments, the one or more processors are configured to select the image plane based on the position of the pupil of the eye of the wearer and the determined vergence (e.g., the one or more processors identify an object the eyes are gazing at, and select an image plane that corresponds to the object the eyes are gazing at).

In accordance with some embodiments, a method for providing images to a wearer is performed using a head-mounted display device that includes a focus-supporting light projector and a beam steerer. The method includes projecting, with the focus-supporting light projector, light for rendering images based at least on virtual reality contents and/or augmented reality contents. The light projected from the focus-supporting light projector corresponds to an image plane that is selected based at least in part on a position of a pupil of an eye of the wearer. The method also includes changing, with the beam steerer, a path of the light projected from the focus-supporting light projector based on the position of the pupil of the eye of the wearer.

In some embodiments, the focus-supporting light projector includes: a light source configured to project an image; one or more lenses optically coupled with the light source to transmit the image projected from the light source; and one or more actuators mechanically coupled with the one or more lenses and configured to move the image plane that corresponds to the light projected from the focus-supporting light projector. The method includes causing the one or more actuators to move the image plane to a first location at a first time and causing the one or more actuators to move the image plane to a second location, that is distinct from the first location, at a second time that is distinct from the first time.

In some embodiments, the focus-supporting light projector includes: a light source configured to project an image; and one or more lenses optically coupled with the light source to transmit the image projected from the light source, the one or more lenses including a multi-focal lens. The method includes causing the multi-focal lens to move the image plane to a first location at a first time and causing the multi-focal lens to move the image plane to a second location, that is distinct from the first location, at a second time that is distinct from the first time.

In some embodiments, the focus-supporting light projector includes: a light source configured to project an image; one or more spatial light modulators optically coupled with the light source to modify the image projected from the light source; and one or more lenses optically coupled with the one or more spatial light modulators to transmit the image modified by the one or more spatial light modulators. The method includes causing the one or more spatial light modulators to move the image plane to a first location at a first time and causing the one or more spatial light modulators to move the image plane to a second location, that is distinct from the first location, at a second time that is distinct from the first time.

In some embodiments, the focus-supporting light projector includes: a light source configured to project an image; one or more lenses optically coupled with the light source to transmit the image projected from the light source; and one or more actuators mechanically coupled with the light source and configured to move the light source so that the image plane that corresponds to the light projected from the focus-supporting light projector is moved. The method includes causing the one or more actuators to move the image plane to a first location at a first time and causing the one or more spatial light modulators to move the image plane to a second location, that is distinct from the first location, at a second time that is distinct from the first time.

In some embodiments, the focus-supporting light projector includes a tunable lens selected from a group consisting of an electro-wetting lens, a liquid lens, and a liquid crystal lens. The method includes causing the tunable lens to move the image plane to a first location at a first time and causing the tunable lens to move the image plane to a second location, that is distinct from the first location, at a second time that is distinct from the first time.

In some embodiments, the focus-supporting light projector includes: a light source configured to project an image; a blocker defining an aperture, the blocker optically coupled with the light source to transmit the image projected by the light source through the aperture; and one or more focusing elements configured to focus the image transmitted through the aperture.

In some embodiments, the method includes determining, with an eye tracker, the position of the pupil of the eye of the wearer.

In some embodiments, the method includes: determining, with a first eye tracker, a position of a pupil of a first eye of the wearer; determining, with a second eye tracker, a position of a pupil of a second eye, of the wearer, that is distinct from the first eye of the wearer; and determining, with one or more processors, a vergence based on the position of the pupil of the first eye of the wearer and the position of the pupil of the second eye of the wearer. The light projected from the focus-supporting light projector corresponds to an image plane that is selected based on the position of the pupil of the eye of the wearer and the determined vergence.

In some embodiments, the method includes selecting, with the one or more processors, the image plane based on the position of the pupil of the eye of the wearer and the determined vergence.

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A head-mounted display device for providing augmented reality contents to a wearer, the device comprising:
    an eye tracking sensor configured to determine a position of a pupil of an eye of the wearer;
    a light projector configured to project light for rendering images based at least on the augmented reality contents;
    a beam steerer configured to change a direction of the light from the light projector based on the position of the pupil; and
    a combiner configured to combine the light from the light projector and light from an outside of the head-mounted display device for providing an overlap of the rendered image and a real image that corresponds to the light from the outside of the head-mounted display device, wherein:
    the eye tracking sensor includes:
        a light source configured to provide eye tracking light toward the eye; and
        a detector configured to receive the eye tracking light that has been reflected from the eye;
    the device is configured to determine distance information from the eye tracking sensor to the eye based on timing information represented by the eye tracking light from the light source and the received eye tracking light; and
    the device is configured to determine the position of the pupil of the eye of the wearer based on the distance information.

2. The device of claim 1, wherein:
    determining, with the eye tracking sensor, the position of the pupil of the eye of the wearer includes determining a location of an iris of the eye.

3. The device of claim 1, wherein:
    the device is configured to determine the timing information based on a first time that corresponds to a time when the eye tracking light is provided from the light source toward the eye and a second time that corresponds to a time when the eye tracking light, reflected from the eye, is detected by the detector.

4. The device of claim 3, wherein:
    the eye tracking sensor includes an avalanche photodiode configured to determine the second time.

5. A head-mounted display device for providing augmented reality contents to a wearer, the device comprising:
    an eye tracking sensor configured to determine a position of a pupil of an eye of the wearer;

a light projector configured to project light for rendering images based at least on the augmented reality contents;

a beam steerer configured to change a direction of the light from the light projector based on the position of the pupil; and a combiner configured to combine the light from the light projector and light from an outside of the head-mounted display device for providing an overlap of the rendered image and a real image that corresponds to the light from the outside of the head-mounted display device, wherein:

the eye tracking sensor includes:

a light source configured to provide eye tracking light toward the eye; and a detector configured to receive the eye tracking light that has been reflected from the eye; and the device is configured to determine the position of the pupil of the eye of the wearer based on phase information represented by the eye tracking light from the light source and the eye tracking light reflected from the eye.

6. The device of claim 5, wherein:

determining the phase information represented by the eye tracking light from the light source and the eye tracking light reflected from the eye includes determining a phase difference between the eye tracking light from the light source and the eye tracking light reflected from the eye.

7. A head-mounted display device for providing augmented reality contents to a wearer, the device comprising:

an eye tracking sensor configured to determine a position of a pupil of an eye of the wearer;

a light projector configured to project light for rendering images based at least on the augmented reality contents;

a beam steerer configured to change a direction of the light from the light projector based on the position of the pupil; and a combiner configured to combine the light from the light projector and light from an outside of the head-mounted display device for providing an overlap of the rendered image and a real image that corresponds to the light from the outside of the head-mounted display device, wherein the eye tracking sensor includes an avalanche photodiode.

8. A head-mounted display device for providing augmented reality contents to a wearer, the device comprising:

an eye tracking sensor configured to determine a position of a pupil of an eye of the wearer;

a light projector configured to project light for rendering images based at least on the augmented reality contents;

a beam steerer configured to change a direction of the light from the light projector based on the position of the pupil; and a combiner configured to combine the light from the light projector and light from an outside of the head-mounted display device for providing an overlap of the rendered image and a real image that corresponds to the light from the outside of the head-mounted display device, wherein:

the eye tracking sensor includes:

a light source configured to provide an eye tracking light toward the eye; and a detector configured to receive the eye tracking light that has been reflected from the eye; and the device is configured to determine the position of the pupil of the eye of the wearer based on a polarization difference between the eye tracking light from the light source and the eye tracking light that has been reflected from the eye.

9. The device of claim 8, including:

one or more polarizing elements configured for transmitting the eye tracking light that has been reflected from the eye, wherein the eye tracking light provided toward the eye is polarized.

10. The device of claim 9, including:

one or more polarizing elements configured for transmitting the eye tracking light from the light source.

* * * * *